United States Patent [19]
Benham et al.

[11] Patent Number: 6,021,033
[45] Date of Patent: Feb. 1, 2000

[54] ELECTRICAL SHOCK PREVENTION SYSTEM

[75] Inventors: Ralph E. Benham, Orlando, Fla.; Charles E. Wade, 22807 Chardonnay Dr., #1, Diamond Bar, Calif. 91765

[73] Assignee: Charles E. Wade, Diamond Bar, Calif.

[21] Appl. No.: 09/098,185

[22] Filed: Jun. 16, 1998

[51] Int. Cl.⁷ ..................................................... H02H 3/00
[52] U.S. Cl. .................................. 361/42; 361/78; 361/1; 361/91.1; 361/103; 362/276
[58] Field of Search ..................... 361/42, 78, 93, 361/102–103, 101, 91, 111, 1, 91.1; 362/276; 315/119

[56] References Cited

U.S. PATENT DOCUMENTS

| | | |
|---|---|---|
| 4,216,411 | 8/1980 | Ehret et al. ............................. 315/118 |
| 5,050,052 | 9/1991 | Wade . |

*Primary Examiner*—Michael J. Sherry
*Attorney, Agent, or Firm*—Boniard I. Brown

[57] ABSTRACT

Hazardous electrical shocks are prevented in an electrical system, such as a swimming pool lighting system having submerged pool lights, by periodically testing for all potential hazardous electrical shock conditions associated with the system and blocking electrification of the system in response to the detection of any shock condition.

57 Claims, 13 Drawing Sheets

FUNCTIONAL BLOCK DIAGRAM

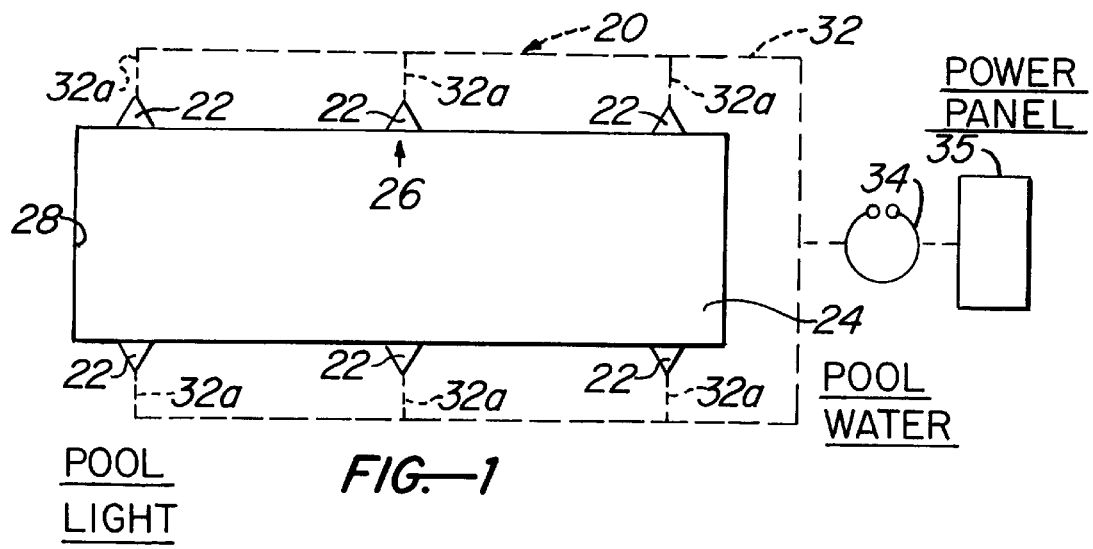
FIG.—1
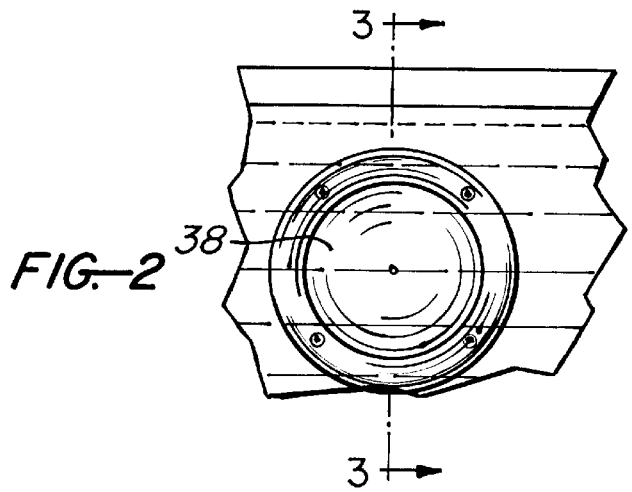
FIG.—2
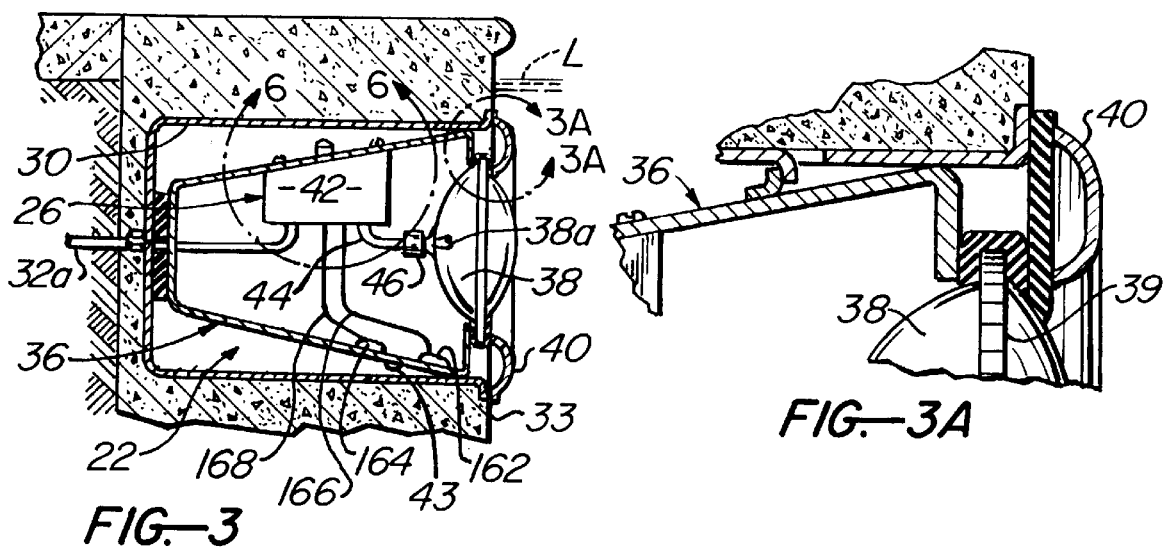
FIG.—3
FIG.—3A

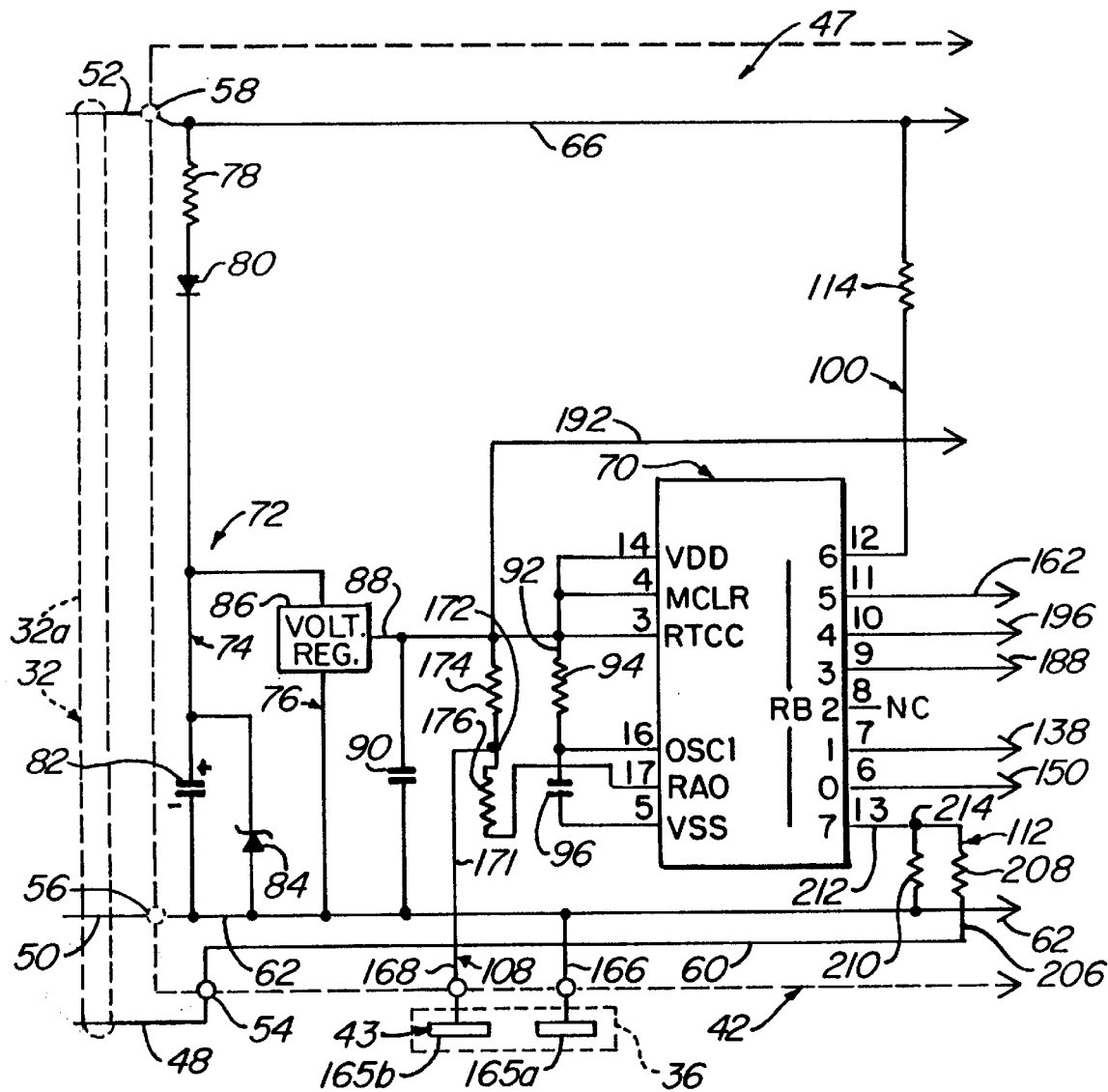
FIG.—4A

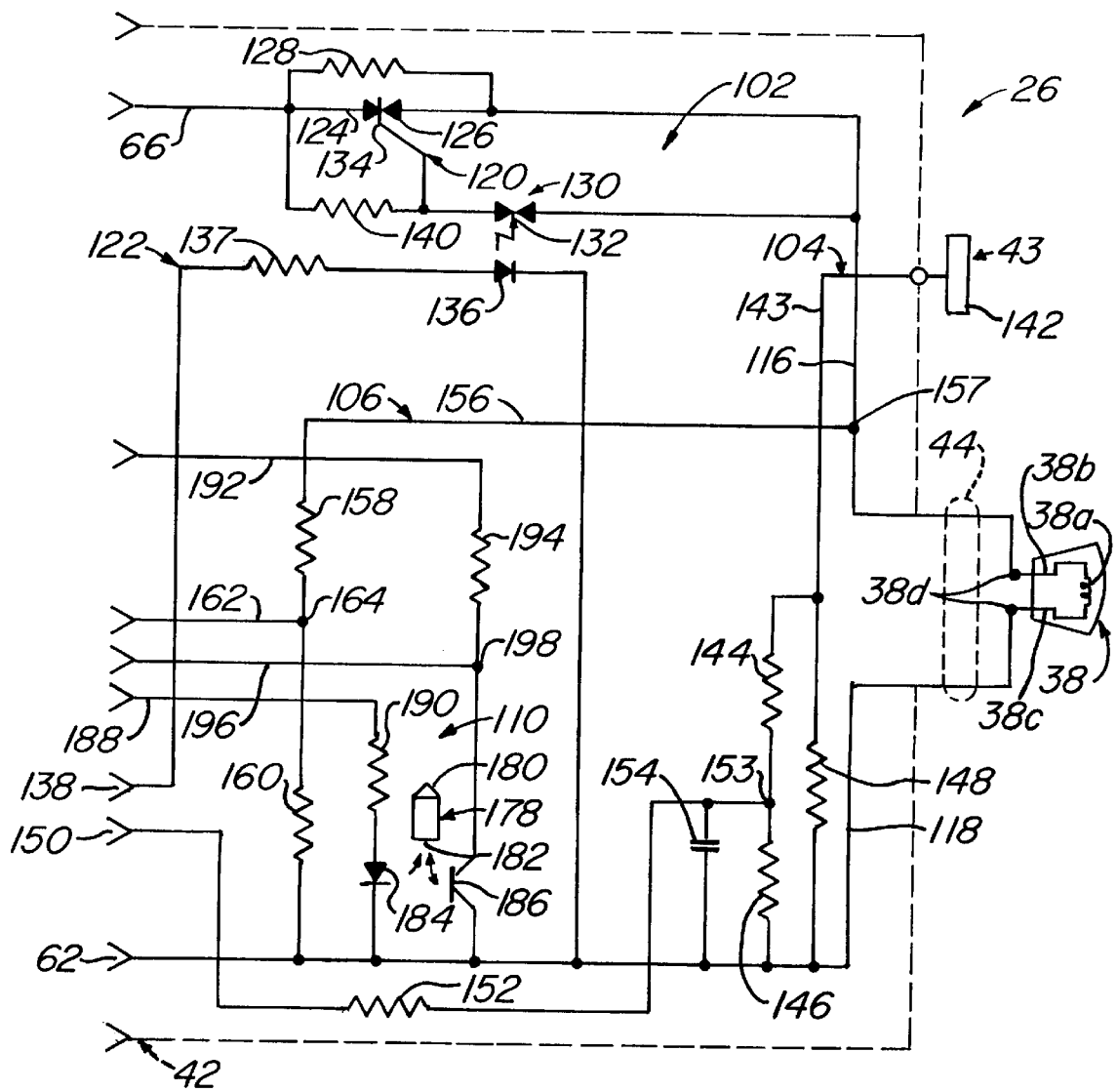
FIG.—4B

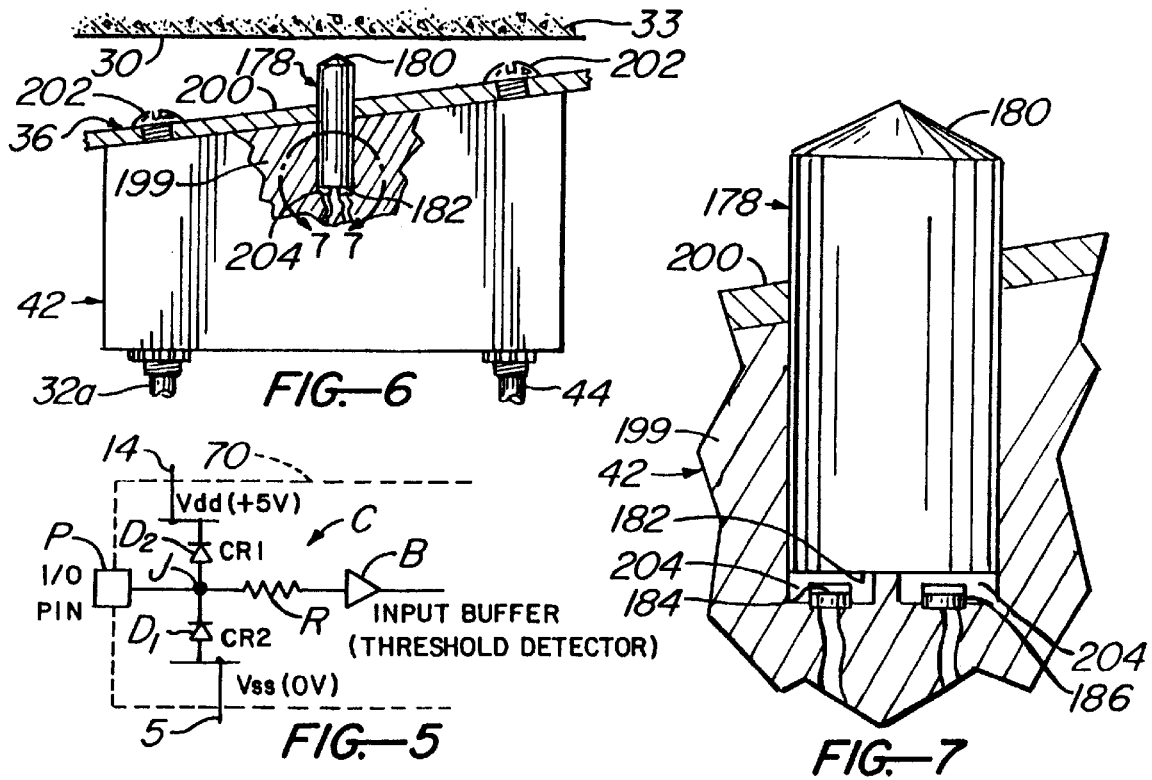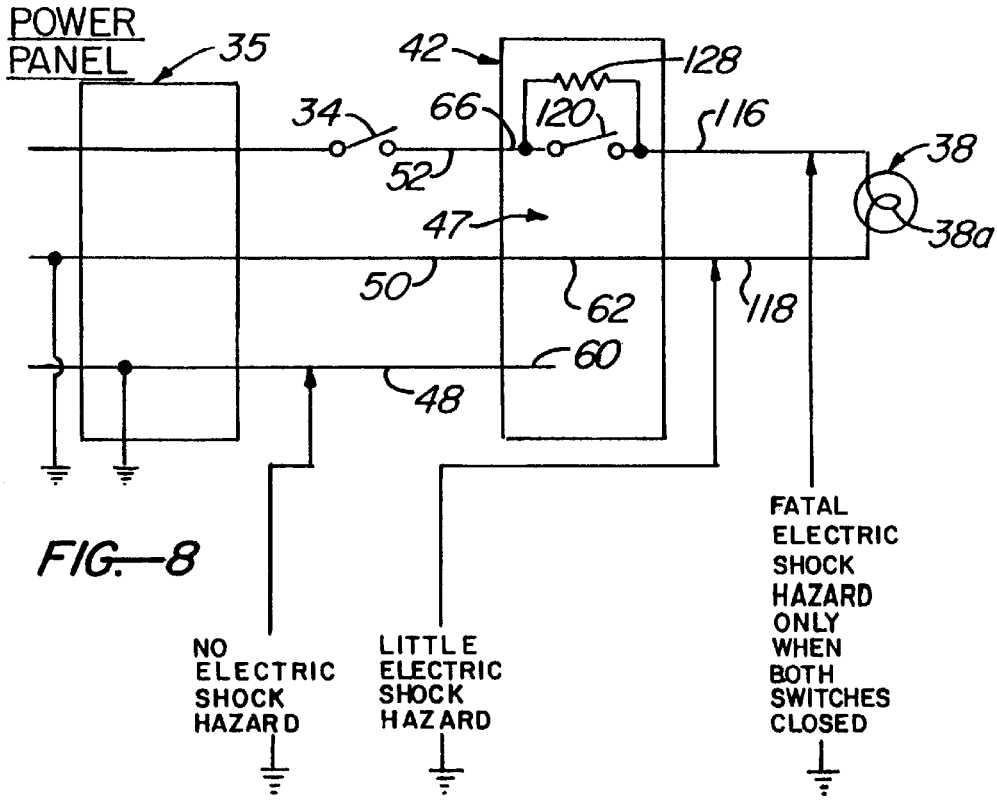

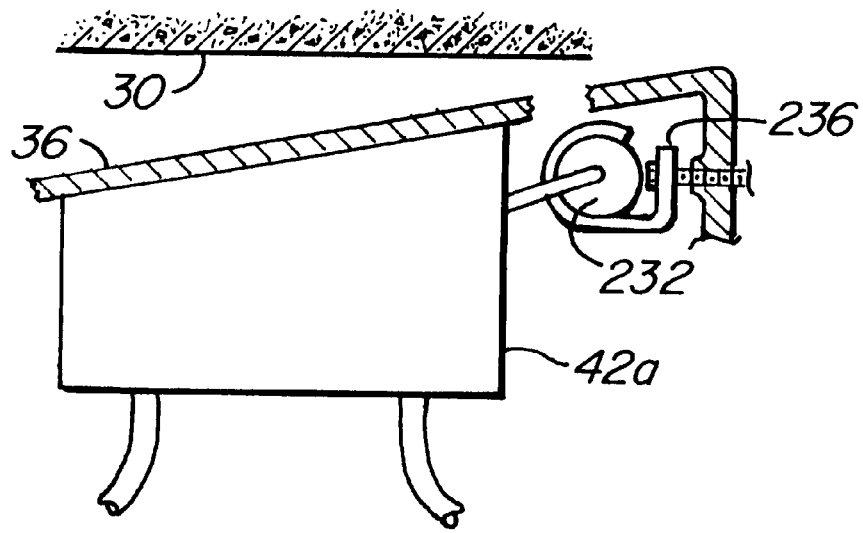
FIG.—11
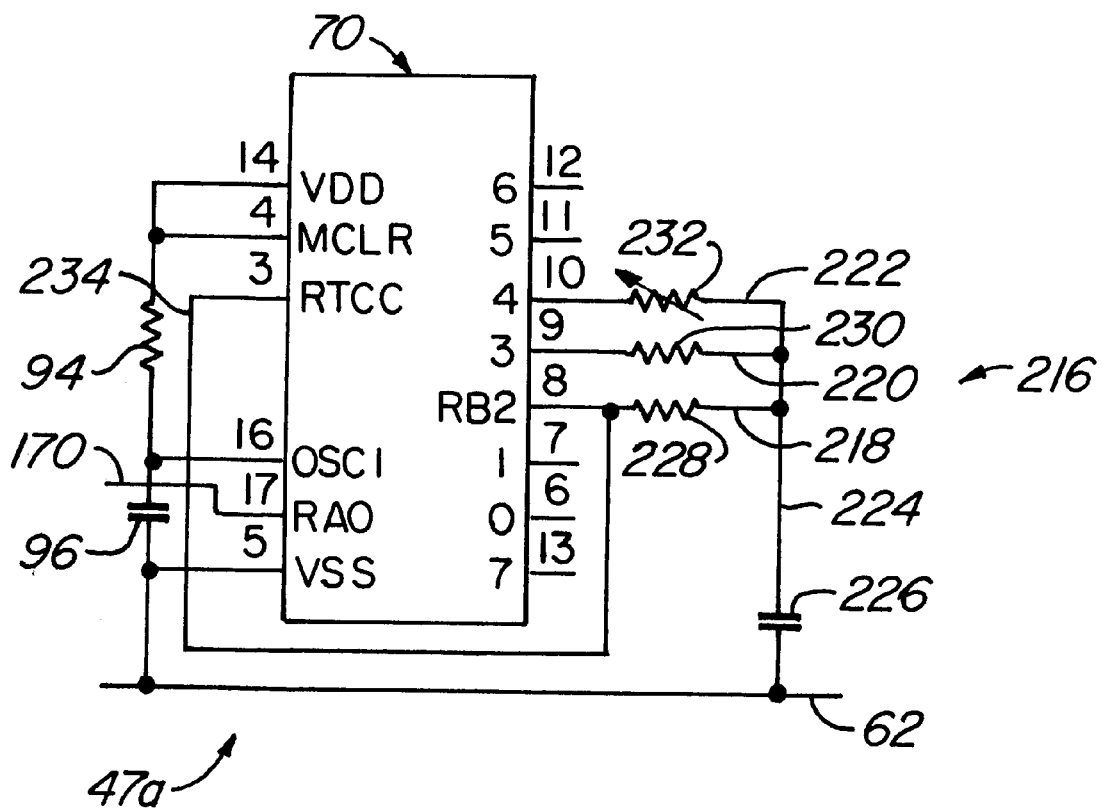
FIG.—12

FUNCTIONAL BLOCK DIAGRAM

SAFETY MODULE FIRMWARE FLOWCHART

ELECTRICAL SHOCK PREVENTION SYSTEM

BACKGROUND OF THE INVENTION

1. Field of the Invention

This invention relates generally to electrically powered systems of the kind which may present various hazardous electrical shock risk conditions when operating in their intended environment. The invention relates more particularly to an electrical shock prevention method and system for preventing electrification of such an electrical system when any one or more of its associated electrical shock risk conditions exist.

2. Discussion of the Prior Art

As will become evident from the ensuing description, the present shock prevention invention may be utilized in a variety of electrical systems of the character described. The intended use of the invention, however, is in a swimming pool underwater lighting system for preventing hazardous electrification of the pool water. The invention will be described in this context.

Simply stated, a conventional swimming pool lighting system comprises a plurality of pool lights mounted in cavities in the pool side wall below the normal water level in the pool and an electrical circuit for electrifying these lights. Each light includes a generally cup-shaped lamp housing having an open front end, and a replaceable lamp, typically a 100 to 500 watt lamp, mounted within the open front end of the housing and sealed about its perimeter to the housing. Each lamp housing is removably fixed within its recess in the pool side wall, typically by means of a mounting ring which seats against and is secured to the front end of the lamp housing and to the pool side wall.

Electrical power is supplied to the several pool lights from an incoming power panel through a main power switch and an underground power cable having branches which enter and are sealed to the lamp housings. The cable contains three wire leads which are terminated within the interior of each lamp housing at the rear of the lamp in the housing. These three leads include a black high voltage lead, a white common lead, and a green ground safety lead which is grounded to earth in the power panel. The ground lead termination within each lamp housing is grounded to the housing if it is metallic or to some other metallic part of the pool light assembly. The black (high voltage) and white (common) terminations in each lamp housing are connected to the respective lamp through a short connector cable within the housing terminating in an electrical socket for receiving a coupling "plug" on the rear of the lamp. This plug consists of two electrical prongs connected to wire supports within the lamp which are connected to and support the ends of the lamp filament.

A swimming pool lighting system of this kind presents several potential shock risk conditions capable of electrifying the pool water at a lethal electrification level. These shock risk conditions include (1) a broken pool lamp, (2) a water leak in a lamp housing, (3) low pool water level, and (4) faulty wiring of the lighting system involving reversal of high voltage and common connections at some point in the system..

These shock risk conditions will be discussed in detail later. Suffice it to say at this point that shock risk condition (1) (broken lamp) involves breakage of the glass envelope of a pool lamp with resultant direct contact of the pool water with the lamp filament and its conductive supports. While the filament would certainly burn out or break upon contact with the water or air, the "high voltage" filament support, that is the filament support connected to the high voltage lead of the underground power cable, would directly contact and thus electrify the pool water. Shock risk condition (2) (water leak in a lamp housing) may occur due to leakage of the seal between a lamp housing and its lamp or to melting of a plastic lamp housing as a result of overheating of the housing. In either case, pool water entering the housing may contact an electrified conductor in the housing with resultant potentially lethal electrification of the pool water. Regarding shock risk condition (3) (low pool water level), swimming pool lights are designed to operate submerged in pool water which continuously cools their lamps and lamp housings. If the pool lights are left on for even a relatively brief period of time when the surface of the pool water is below the level of the lights, the heat generated by a pool lamp can easily overheat its housing. Such overheating can melt the lamp housing if it is constructed of plastic or damage the housing seals. In either case, the overheating damage may permit flooding of a lamp housing and thus create a potentially lethal shock risk when the pool is later filled to its normal level above the pool lights. Shock risk condition (4) (faulty wiring of the pool lighting system) involves inadvertent reversal of the high voltage and common lead connections at some point in the wiring system, such as at a pool light, thereby electrifying the common lead in one or all of the pool lights at a potentially lethal electrification level.

BRIEF DESCRIPTION OF THE INVENTION

According to its broader aspects, this invention provides an electrical shock prevention system and method for use with an electrical system which is designed for operation in an environment in which the electrical system may present one or more hazardous electrical shock risk conditions. The invention involves monitoring these shock risk conditions and preventing or terminating electrification of the electrical system in response to any one or more of such shock risk conditions.

The presently preferred embodiment of the invention described herein is an electrical shock prevention system for a swimming pool lighting system and comprise a separate electrical shock prevention circuit for each individual pool light. Each pool light shock prevention circuit includes a normally open light switch through which the respective pool lamp is electrified at full line voltage (the full A.C. voltage input to the shock prevention circuit) and shock risk sensing and control circuitry responsive to certain shock risk conditions associated with the respective pool light for operating the light switch. Each pool light shock prevention circuit is activated by closure of the main power switch for the overall pool lighting system and operates to: (a) retain the respective pool light switch in its normal open state and thereby prevent electrification of the pool light at full line voltage if one or more shock risk conditions exist, (b) close the light switch to electrify the respective pool light at full line voltage when no shock risk condition exists, and (c) cutoff electrical power to the pool light in response to subsequent detection of one or more shock risk conditions.

As will become evident from the ensuing description, the objectives of the invention may be achieved by making the shock prevention circuit for each pool light responsive to various detectable shock risk conditions associated with the respective light which reliably indicate a potential shock risk. The presently preferred swimming pool shock prevention system described herein is responsive to the following shock risk conditions (1)–(6):

(1) Electrification of the pool water above a safe electrification level.

(2) A broken pool lamp. A broken lamp creates the risk of lethal electrification of the pool water by contact of the water with the electrified lamp filament or its supports.

(3) Water in the lamp housing. Water in the lamp housing indicates a leak in the housing which creates the risk of lethal electrification of the pool water by contact of the water with an electrified conductor in the housing.

(4) Faulty wiring of the pool lighting system involving inadvertent reversal of high voltage and common lead connections at some point at some point in the pool lighting. Faulty wiring creates the risk of lethal electrification of the pool water by contact of the water with the common lead in a pool light.

(5) A low water level in the swimming pool below the level of the pool lights. A low water level creates the risk of over heating of a lamp housing by its pool lamp and thereby loss of the water tight integrity of the housing and resulting lethal electrification of the pool water by flooding of the housing when the pool is later refilled to its normal level.

(6) Over heating of a lamp housing by its pool lamp. Over heating of a lamp housing may result in loss of its water tight integrity and thereby lethal electrification of the pool water by flooding of the housing when the pool is later refilled to its normal level.

The shock prevention circuit for each pool light comprises a a light switch for controlling electrical power to the pool lamp, shock risk sensing circuits responsive to the shock risk conditions of concern, and a microcontroller having input/output (I/O) ports connected to the light switch and to the sensing circuits. This microcontroller embodies firmware which is programmed to (a) retain the light switch open if a shock risk condition exists, (b) close the light switch to electrify the pool lamp at a full line voltage if no shock conditions exist, and (c) open the light switch to cut power to the pool lamp in response to subsequent detection of a shock risk condition.

The preferred lamp switch is a TRIAC and the preferred microcontroller is an EPROM based 8 bit CMOS microcontroller or microcomputer marketed by Microchip Technology Inc. under the trade designation PIC16C54A. In the preferred shock prevention system described herein, the sensing circuit responsive to shock risk condition (1) above (pool water electrification) detects pool water electrification directly by sensing the electrical potential, if any, of a sensor electrode in contact with the water. The sensing circuit responsive to shock risk condition (2) (broken lamp) detects a lamp break indirectly by detecting whether the lamp filament is broken (a break in the glass envelope of the lamp will result in burnout or breakage of the filament). This is accomplished by electrifying the lamp at a safe low current level (less than 5 ma) and sensing the resulting voltage applied to the lamp which will be full line voltage if the lamp filament is broken and less than full line voltage if the filament is intact. The sensing circuit responsive to shock risk condition (3) (water in the lamp housing) detects water in the lamp housing directly by sensing current flow, if any, between a pair of sensor electrodes positioned within a lower portion of the lamp housing so that any water within the housing will conduct electrical current between these electrodes. The sensing circuit responsive to shock risk condition (4) (faulty wiring) detects reversal of high voltage and common lead connections in the pool lighting system indirectly by sensing the electrical potential, if any, of the A.C. common (A.C. common lead of the shock prevention circuit) relative to ground. The sensing circuit responsive to shock risk condition (5) (low pool water level) utilizes an electro-optical detector on the lamp housing to sense the pool water level relative to the lamp housing. The sensing circuit responsive to shock risk condition (6) (over heated lamp housing) utilizes a temperature responsive sensor to directly sense the housing temperature.

As will appear from the ensuing description, shock risk conditions (5) and (6) above are both concerned with a common basic shock risk condition which is a low pool water level such that the pool light is not fully under water. The pool light is then not properly cooled by the water and as a result is subject to loss of its water tight integrity by overheating which presents a potential shock risk hazard when the pool is refilled to its normal level. One described embodiment of the invention is responsive to shock risk conditions (1)–(5), and a second described embodiment is responsive to shock risk conditions (1)–(4) and (6).

According to the preferred practice of the invention, the pool light switch is periodically triggered into its conducting state to turn on the pool light at near full line voltage except when a shock risk condition is detected. In the preferred inventive embodiments described herein, the pool light is turned on 1.2 milliseconds after the start of each positive and negative half cycle and remains on until the end of that half cycle of the A.C. power input to the shock prevention system.

The preferred microcontroller of each pool light shock prevention circuit is firmware programmed to periodically perform the following functions (P) in a series of repetitive sequences during each positive half cycle of the A.C. line voltage and perform the following functions (N) in a series of repetitive sequences during each negative half cycle of the line voltage: (P) initialize the microcontroller, activate the shock risk sensing circuits in a predetermined sequence, turn on the pool light if no shock risk conditions exist, and perform certain timing functions; (N) turn on the pool light if no shock risk conditions exist and perform certain timing functions. The entire preferred shock risk sensing circuit, except for certain sensors of the shock risk sensing circuits but including the pool light switch and microcontroller, is sealed in a compact water-tight safety module to be mounted directly within the respective lamp housing.

BRIEF DESCRIPTION OF THE DRAWINGS

FIG. 1 is a plan view of a swimming pool having a lighting system including a present shock prevention system;

FIG. 2 is an enlarged view looking at a pool light in the direction of the arrow 26 in FIG. 1;

FIG. 3 is an enlarged section through a pool light taken on line 3—3 in FIG. 2;

FIG. 3A is an enlargement of the area encircled by the arrow 3A—3A in FIG. 3;

FIGS. 4A, 4B taken together illustrate a circuit diagram of a preferred shock prevention circuit of the invention embodied in each swimming pool light of FIG. 1;

FIG. 5 is an equivalent circuit diagram of an I/O circuit embodied within a microcontroller included in the shock prevention circuit of FIGS. 4A, 4B;

FIG. 6 is an enlargement of the area encircled by the arrow 6—6 in FIG. 3 with a portion broken away for clarity;

FIG. 7 is an enlargement of the area encircled by the arrow 7—7 in FIG. 6;

FIG. 8 diagrammatically illustrates a properly wired swimming pool lighting system embodying a shock prevention circuit according to the invention;

FIG. 11 is a view similar to FIG. 6 showing a modification of the invention embodying a pool light housing temperature sensing arrangement;

FIG. 12 is a circuit diagram of certain temperature sensing circuitry embodied in the light housing temperature sensing arrangement of FIG. 11;

DESCRIPTION OF THE PREFERRED EMBODIMENTS

Figure 9:
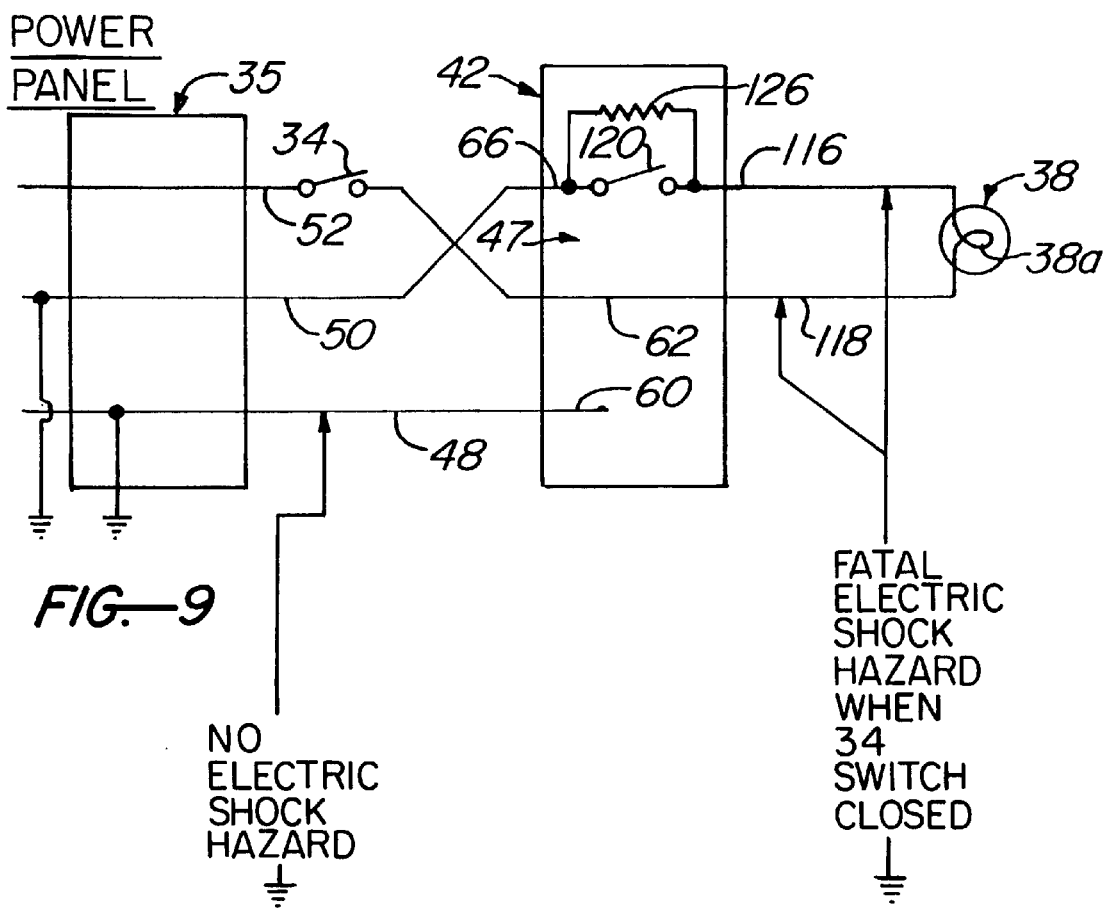
FIGS. 9 and 10 diagramatically illustrate two different possible faulty wiring errors which can be made in the pool lighting system depicted in FIG. 8.

Turning now to the drawings and first to FIGS. 1–3, there is illustrated an electrical system 20 including electrical devices 22 for operation in an environment in which the system may present various hazardous electrical shock risk conditions, and an electrical shock prevention system 26 according to this invention associated with each electrical device. The shock prevention system for each electrical device operates to detect or check for the electrical shock risk conditions associated with the electrical system and to prevent or terminate electrification of the device in response to detection of any one or more of these shock risk conditions.

As mentioned earlier, the electrical shock prevention system of this invention may be used in a variety of electrical systems of the character described. However, the invention is intended for use in a swimming pool lighting system and will be described in this context. In this use, each electrical device 22 is a light for a swimming pool 28 mounted within recesses 30 in the pool side wall 33 a distance below the normal level L of water 24 in the pool. Each pool light 22 includes its own shock prevention system 26.

Except for the individual pool light shock prevention systems 26, the swimming pool lighting system 20 is conventional and hence need not be described in elaborate detail. Suffice it to say that in addition to the pool lights 22, the lighting system includes a buried electrical power cable 32 having parallel branches 32a connected to the individual pool light shock prevention systems for supplying electrical power to the lights and a main power switch 34 through which the cable is electrically connected to main A.C power panel 35.

Each pool light 22 is conventional except as noted below and is mounted within its pool sidewall cavity 30 in any conventional way. Referring to FIG. 3, each pool light 22 includes a generally cup-shaped lamp housing 36 which may be constructed of metal or plastic and has an open front end closed by a replaceable lamp 38. Lamp housing 36 is fixed within its sidewall cavity, and lamp 38 is removably secured within the open front end of and sealed about its perimeter to the lamp housing by a seal ring 39 and a mounting ring 40 in such a way that the pool light 22 (i.e. lamp housing and lamp) forms a sealed water tight lamp enclosure except for a break or discontinuity for limited admission of water. Lamp 38 is typically a 100 watt to 500 watt lamp having a filament 38a attached at its ends to a pair of filament supports 38b, 38c (FIG. 4B). These filament supports are electrically connected to projecting prong-like terminals 38d on the rear side of the lamp. Mounting ring 40 encircles the lamp 33 and the front end of the lamp housing 36 and is removably secured by screws to the housing with the rear side of the ring abutting the pool side wall about the sidewall cavity 30 in such a way that ring firmly secures the lamp in sealing relation to the housing. When the pool water 24 is at its normal water level L, the water floods the recess about and cools the lamp housing. As described to this point, each pool light 22 and its mounting arrangement are conventional and hence need not be discussed in any more detail.

The individual shock prevention systems 26 for the pool lights 22 are identical. Accordingly, a description of the shock prevention system for one pool light will suffice for all. The shock prevention system to be described is that for the pool light shown in FIG. 3. This shock prevention system 26 includes a sealed electrical safety module 42 mounted within the lamp housing 36 and sensors 43 which are located externally of the safety module and electrically connected to circuitry within the module. Safety module 42 will be described presently. Suffice it to say at this point that the corresponding branch 32a of the power cable 32 enters and is sealed to the rear end of the housing 36 of the pool light 22 and is electrically connected to externally accessible terminals on the safety module 42. The safety module, in turn, is electrically connected to the pool lamp 38 through a short connector cable 44 having an electrical coupling socket 46 releasably receiving the electrical terminals or prongs 38d (FIG. 4B) on the rear side of the lamp.

Pool lighting system 20 and each pool light 22 present certain potential hazardous electrical shock risk conditions when operating at normal full line voltage. The shock prevention system 26 for each pool light 22 is responsive to these shock risk conditions and prevents or terminates electrification of the corresponding pool light when any one or more of these conditions exist. The presently preferred inventive embodiments illustrated in the drawings are responsive to the following potential shock risk conditions of a swimming pool lighting system:

(1) Electrification of the pool water 24. Electrification of the pool water indicates electrical current leakage between the light and the pool water and hence a potentially lethal shock risk.

(2) A broken pool lamp 38. A lamp break permits contact of the pool water 24 with an electrified lamp filament 38a and its supports 38b, 38c and thereby potentially lethal electrification of the pool water even if the filament is broken.

(3) Water in the pool light lamp housing 36. Water in the lamp housing indicates a leak in the housing and thereby potentially lethal electrification of the swimming pool water 24 by contact with an electrified conductor in the housing.

(4) Low water level in the pool below the level of the pool light 22. A low water level results in the lamp housing 36 being partially or totally out of cooling contact with the pool water 24. This creates a risk of damage to the lamp housing due to overheating and potentially lethal electrification of the pool water by flooding of the housings when the pool is later refilled to its normal level.

(5) High temperature of the lamp housing. Excessive lamp housing temperature indicates the housing is out of the pool water due to the pool water level being below its normal water level, or the leaving of the lamp housing on a pool deck overnight, etc. Excessive housing temperature can destroy the housing seal or melt the housing, thereby creating a leak in the housing which may result in potentially lethal electrification of the pool water when the pool is later refilled to its normal level.

(6) Faulty wiring of the pool lighting system. The lamp 38 of each pool light 22 is electrified through a single switch at the main power panel and a pool light switch in the shock prevention system 26 for the respective pool light so that inadvertent reversal of a high voltage wire lead and an A.C. common lead at some point between the lamp and the main power panel may result in high voltage electrification of the common lead at the pool lamp and thereby potentially lethal electrification of the pool water by contact with an electrified A.C. common conductor even though the switch for the individual pool light is open.

Refer now to FIGS. 4A, 4B which illustrate a schematic circuit diagram of the shock prevention system 26 for the pool light 22 in FIG. 3. This shock prevention system comprises a shock prevention circuit 47 which is sealed within the safety module 42 except for the shock risk sensors 43 which are located externally of the safety module. The portions of the shock prevention circuit 47 within the safety module 42 are encapsulated in plastic or otherwise sealed to prevent contact of these internal circuit portions with any water which enters the lamp housing 36. The A.C. power cable branch 32*a* which connects to the shock prevention system 26 has three wire leads including a green safety ground lead 48, a white common lead 50, and a black high voltage lead 52. The green earth ground lead 48 is grounded to earth in the power panel 35.

The shock prevention circuit 47 has ground, common, and high voltage terminals 54, 56, 58, respectively, which are accessible externally of the safety module 42 for connection to the ground, common, and high voltage leads 48, 50, 52, respectively, of the power cable 32. Connected to the ground, common, and high voltage terminals 54, 56, 58 are a ground lead 60 (herein ground), a common lead (herein A.C. common) 62, and a high voltage lead 66, respectively, of the shock prevention circuit 47 within the safety module 42.

A primary component of the shock prevention circuit 47 of the safety module 42 is a microcontroller 70 embodying firmware which is programmed to perform certain functions necessary to accomplish the objectives of this invention. The preferred microcontroller is an EPROM based 8 bit CMOS microcontroller or microcomputer marketed by Microchip, Inc. under the trade designation PIC16C54A and described in a publication by Microchip Technology Inc. dated 1994 and entitled EPROM Based 8 Bit CMOS Microcontroller. This publication is incorporated herein by reference.

The preferred microcontroller 70 has a plurality of internal ports and corresponding externally accessible terminals or pins by which these ports may be connected to other components of the shock prevention circuit 47. For clarity of understanding, these ports and terminal pins are designated in the patent drawings by the same reference numerals and characters as the corresponding ports and pins of the actual microcontroller.

With this in mind, the microcontroller 70 has the following external terminal pins and corresponding internal input/output (I/O) ports: A pin 14 and port VDD which are configured as a primary power input for the microcontroller. A pin 4 and port MCLR which are configured as a master clear input through which a reset signal is supplied to the microcontroller to periodically reset or initialize its internal registers. A pin 3 and port RTCC which are normally configured as an input for a real time clock counting function in the microcontroller that is not utilized in this invention. In this invention, pin 3 and port RTCC are biased at +5 volts in accordance with the manufacturer's recommendation, as described later. A pin 5 and port VSS which are configured as a return from the microcontroller to ground. The microcontroller 70 has the following additional I/O ports and associated pins: port RA0 and its pin 17, and ports RB0 through RB7 and their pins RB6 through RB13, respectively, which are configured by the microcontroller firmware as either inputs or outputs depending upon the microcontroller programming. Persons versed in the art can readily develop appropriate programming, given the schematic, component values and software flowchart. Similar microcontrollers are produced by well-known manufacturers. In the present invention, these additional ports are configured in the manner explained below by the microcontroller firmware.

Each of the I/O ports RA0 and RB0 through RB7 includes the input/output circuit (I/O circuit) C illustrated in FIG. 5. This I/O circuit includes a junction J connected to the corresponding microcontroller pin P, to an input buffer (threshold detector) B through a resistor R, and to the cathode and anode, respectively, of input protection diodes D1, D2. As indicated in FIG. 5, the anode of diode D1 is connected internally of the microcontroller to its pin 5 (return port VSS). The cathode of diode D2 is connected internally of the microcontroller to its pin 14 (regulated voltage input port VDD). The circuit C has a low output impedance as an output and a high impedance as an input. The input buffer B has a certain transition threshold voltage level and provides a logic 0 voltage to the internal microcontroller firmware when the voltage on the pin P is equal to or less than this transition threshold voltage. The buffer provides a logic 1 voltage to the internal microcontroller firmware when the voltage on the pin P is greater than the transition threshold voltage.

From the preceding description, it will be understood that the microcontroller 70 reads the logic state of each I/O port RA0 and RB0 through RB7 of the microcontroller 70 as a logic 0 input when the voltage on the corresponding microcontroller pin is less than the buffer transition threshold voltage and as a logic 1 input when the voltage on the pin is greater than this transition threshold voltage. In the preferred embodiment of the invention described herein, the transition threshold voltage of the buffer is 2 volts, the logic 0 voltage of the buffer B to the microcontroller firmware is zero volts, and the logic 1 voltage of the buffer to the microcontroller firmware is 5 volts. The protection diodes D1, D2 protect the integrated circuit chip of the microcontroller 70 against an over voltage on the $\frac{1}{10}$ pin P (greater than 5 volts in the preferred embodiments) and act to short to the microcontroller power input port VDD a voltage on the pin P greater than the permissible maximum voltage and short to the microcontroller return port VSS a voltage less than the voltage at the microcontroller return pin 5.

In addition to the microcontroller 70, the shock prevention circuit 47 includes a regulated low voltage power supply 72 for the microcontroller including a half wave rectification circuit 74 and a regulated power supply circuit 76. The half wave rectification circuit 74 comprises a resistor 78, a diode 80 functioning as a half wave rectifier, and a capacitor 82 connected in series between the high voltage lead 66 and the A.C. common 62 of the safety module 42. A Zener diode 84 is connected across the capacitor 82 in a direction to limit the maximum voltage on this capacitor. The resistor 78 and diode 80 rectify and limit current flow to the capacitor 82 to charge the capacitor 82 to a maximum charge limited to the Zener voltage of the Zener diode 84 during positive half cycles of the line voltage to the safety module. This maximum charge on the capacitor 82 is preferably 20 volts.

Referring to FIG. 4A, the power supply circuit 76 comprises a linear voltage regulator 86 connected across the capacitor 82. The preferred regulator is a low power (preferably 5 volt) linear voltage regulator marketed by National Semiconductor Inc. under the trade designation LM78LO5. The output of the linear voltage regulator 86 is connected to pins 14 (port VDD), 4 (port MCLR), and 3 (port RTCC)of the microcontroller 70 through a lead 88. The output of the linear voltage regulator 86 is connected to the A.C. common 62 through a capacitor 90 connected between the leads 62, 88. Microcontroller pin 14 and its port VDD are configured as a primary power input through which the regulated output voltage (5 volts) from the power supply circuit 76 is supplied to the microcontroller firmware. Pin 4 and its port MCLR are configured as a master clear input through which the regulated output voltage from the circuit 76 is supplied to the microcontroller to reset or initialize its internal registers whenever power to the microcontroller is interrupted and then again applied to the microcontroller.

From the foregoing description of the low voltage power supply 72 for the microcontroller 70, it will be understood that the capacitor 82 of the half wave rectification circuit 74 is charged during the positive half cycles of the A.C. voltage input to the shock prevention circuit 47 and stores its charge during the negative half cycles of the input voltage. The linear regulator 86 utilizes the electrical charge stored in the capacitor 82 to provide the current and stabilized voltage necessary for proper operation of the microcontroller 70. The capacitor 90 stores the stabilized output from the linear regulator 86 and provides a low impedance source of regulated voltage to the microcontroller input pins 3, 4, 14 for powering the microcontroller and resetting or initializing its internal registers.

Connected between the A.C. common 62 and the output lead 88 of the voltage regulator 86 is a lead 92 containing a resistor 94 and capacitor 96 in electrical series. Pin 16 (port OSC1) of the microcontroller 70 is connected to the lead 92 between the resistor 94 and the capacitor 96. Port OSC1 is configured as an input through which electrical power is supplied to an internal clock oscillator within the microcontroller. The values of the resistor 94 and capacitor 96 are selected to effect generation by the internal oscillator of an internal clock of desired frequency, preferably about 1.0 MHz, for timing measurements. Pin 5 (port VSS) of the microcontroller is connected to the A.C. common 62 through the lead 92. Port VSS is configured as a return through which current flow occurs from the microcontroller to the A.C. common.

Pin 17 (port RA0), pin 5 (port VSS) and pins 6 through 13(ports RB0 through RB7) of the microcontroller are connected to certain additional circuits in the shock risk sensing circuit 47. These additional circuits include an A.C. power phase sensing circuit 100 (FIG. 4A) for monitoring the instantaneous phase and zero crossings of the A.C. line voltage to the shock prevention circuit 47, a pool lamp switching circuit 102 (FIG. 4B), and electrical shock risk sensing circuits for detecting the electrical shock risk conditions mentioned earlier. These shock risk sensing circuits include a pool water electrification sensing circuit 104 (FIG. 4B) for detecting electrification of the swimming pool water 24 in the vicinity of the pool light 22; a broken lamp sensing circuit 106 (FIG. 4B) for detecting a break in the pool lamp 38; a leak sensing circuit 108 (FIG. 4A) for detecting a leak in the lamp housing 36; a low water level sensing circuit 110 (FIG. 4B) for detecting a low water level in the swimming pool 28 below the level of the pool light 22; and a faulty wiring sensing circuit 112 (FIG. 4A) for detecting faulty wiring or miswiring of the pool lighting system involving reversal of high voltage and common lead connections at some point in the system.

As explained in more detail later, the firmware of microcontroller 70 is programmed to perform the following functions with respect to each pool light 22 in response to electrification of the pool lighting system 20 by closure of its main power switch 34: (a) initially activate or monitor the faulty wiring sensing circuit 112 to check for or detect reversal of high voltage and common lead connections at some point in the lighting system, (b) retain the switching circuit 102 in its OFF or non-conducting state to block electrification of the pool lamp 38 at full line voltage if faulty wiring is detected, (c) activate or monitor the shock risk sensing circuits 104, 106, 108, 110, to check for or detect their respective shock risk conditions, and (d) operate the pool light switching circuit 102 to its ON or conducting state to turn the pool lamp 38 on at near full line voltage in the absence of all shock risk conditions.

In the preferred practice of the invention, the above shock risk sensing functions are performed during each cycle to monitor the respective shock risk conditions. The pool light switching circuit 102 is activated to its conducting state to turn on the pool lamp 38 at near full line voltage for each cycle in which no shock risk conditions exist. In the preferred inventive embodiments described herein, the switching circuit 102 is thus activated to its conducting state to turn on voltage to the pool lamp 1.2 milliseconds after the start of each positive and negative half cycle and remains on until the end of that half cycle of the A.C. power input or wave form to the shock risk prevention circuit 47.

Referring to FIG. 4A, the A.C. phase sensing circuit 100 produces a continues A.C. phase related input to pin 12 (port RB6) of the microcontroller 70 which the microcontroller reads as a logic 1 input from the phase sensing circuit during a major portion of each positive half cycle of the A.C. input to terminals 56, 58 of the shock prevention circuit 47. The microcontroller reads this input as a logic 0 input during a minor portion of each positive half cycle and during each entire negative half cycle of the line voltage. To this end, the phase sensing circuit 100 comprises a resistor 114 connected in series between the high voltage lead 66 and the microcontroller pin 12 (port RB 6).

Port RB6 is configured as an input having the equivalent I/O circuit C of FIG. 5. Even though the line voltage applied to the resistor 114 has a positive peak of 168 volts and a negative peak of −168 volts, the voltage on this pin 12 (port RB 6) will be limited to approximately +5.7 volts during the positive half cycle and −0.7 volts during the negative half cycle due to the clamping action of diodes D1 and D2 in FIG. 5. During the time when the line voltage is between −0.7 volts and +5.7 volts the voltage on the pin is equal to the line voltage. When the line voltage is above or below these levels, then the voltage on the pin is limited to these values, as long as the current through the diodes is limited to less than their rated maximum current of 500 micro amps. Resistor 114 limits current flow into the input protection diodes D1, D2 of the circuit C to protect these diodes. Phase sensing circuit 100 is used to determine whether the A.C.

input to the shock prevention system 26 is in a positive or negative half cycle and to detect the zero crossings between half cycles. In this regard, it will be understood from the earlier description of FIG. 5 that the buffer B of microcontroller port RB6 provides a logic 0 input (0 volts) to the internal microcontroller firmware when the voltage on the microcontroller pin 12 is less than the buffer transition threshold voltage (i.e. less than 2 volts in the preferred embodiments). The buffer provides a logic 1 input (5 volts) to the internal microcontroller circuitry when the voltage on the microcontroller pin 12 is greater than this buffer transition threshold voltage. Thus, the microcontroller 70 reads the voltage on the pin 12 as a logic 1 input during a major portion of each positive half cycle of the line voltage and as a logic 0 during a minor portion of each positive half cycle and during each entire negative half cycle. As explained in more detail later, the microcontroller 70 embodies firmware which is programmed to utilize these inputs for detecting the start of each positive and negative half cycle of the A.C. input to the microcontroller and performing certain shock risk sensing and pool lamp control functions during positive and negative half cycles of the A.C. input.

One terminal 38d of the pool lamp 38 is connected to the high voltage A.C. lead 66 through a lead 116 and the pool lamp switching circuit 102. The other lamp terminal is connected to A.C. common 62 through a lead 118. The switching circuit 102 is operated between its ON or conducting state and its OFF or non-conducting state by the microcontroller 70 to turn the pool lamp 38 on and off. Simply stated, switching circuit 102 comprises a lamp switch 120 proper connecting the high voltage A.C. input lead 66 to the lamp terminal lead 116 and means 122 connecting the microcontroller 70 to the lamp switch 120 for operation of this switch between its non-conducting state and its conducting state by the microcontroller.

The preferred lamp switch 120 illustrated is a TRIAC having a main terminal 124 connected to the high voltage A.C. input lead 66 and a main terminal 126 connected to the lamp terminal lead 116, and a resistor 128 connected in parallel with the TRIAC. The means 122 for operating the TRIAC 120 comprises an OPTO-TRIAC 130 for triggering the TRIAC 120. This OPTO-TRIAC includes a photosensitive TRIAC detector 132 connecting the main terminal 126 and gate 134 of the TRIAC 120 and a light emitting diode (LED) 136. LED 136 is connected in series with a resistor 137 in a lead 138 connecting pin 7 (port RB1) of the microcontroller 70 to the A.C. common 62. TRIAC gate 134 is connected to the main terminal 124 of the TRIAC 120 through a resistor 140.

As explained in more detail later, the microcontroller port RB1 is configured as an output. The firmware of the microcontroller 70 is responsive to the A.C. phase input from the phase detection circuit 100 and to the shock risk sensing inputs or signals from the shock risk sensing circuits 104–112 and is programmed to normally retain the microcontroller port RB1 in a certain low voltage state during each positive and negative half cycle of the A.C. input to the shock prevention circuit 47 in which at least one shock risk condition exists. During each half cycle in which no shock risk conditions exist, the firmware places the port RB1 in a certain high voltage state for 100 microseconds starting at 1.2 milliseconds after the start of each cycle.

When microcontroller port RB1 is in its low voltage state, the current flow through and hence the intensity of the LED 136 are low, and the resulting impedance across the TRIAC detector 132 is high. The TRIAC resistor 140 then keeps the gate 134 of TRIAC 120 biased OFF. When microcontroller port RB1 is in its high voltage state, the current flow through and hence the intensity of the LED 136 is high, and the resulting impedance across the TRIAC detector 132 is low. The gate 134 of TRIAC 120 is then triggered ON, i.e. electrified, and the TRIAC 120 is made conductive, thereby applying the full A.C. line voltage to the shock prevention circuit 47 to the terminals 38d of pool lamp 38. Once the TRIAC 120 is thus triggered to its ON or conducting state, it remains in this conducting state to maintain the pool lamp electrified at full line voltage until the zero voltage crossing at the end of each half cycle. The triac, once triggered on by 100 microsecond pulse, will remain on until the current through it is reduced to near zero, at which time the triac turns off.

As indicated in the foregoing description and will be explained in more detail later, the microcontroller 70 causes a trigger voltage to be applied to the gate of the triac 120 for a brief period of time near the start of each positive and negative half cycle of the A.C. power input to the shock prevention circuit 47 in which no shock risk conditions are detected by the shock risk sensing circuits 104–112. This causes the triac to conduct and it remains in the on state until the end of the half cycle, causing the pool lamp 38 to be electrified at near the full A.C. line voltage applied to the shock prevention circuit 47.

Whenever the TRIAC 120 is OFF, the pool lamp 38 is electrified through the parallel resistor 128 of the switching circuit 102. Current flow through this parallel resistor and the intact lamp filament 38a then produces a voltage division resulting in a voltage across the filament which will be less than the full line voltage if the filament is intact and full line voltage if the filament is broken. As explained in more detail later in connection with the broken lamp sensing circuit 106, the voltage across the filament is sensed at the start of each positive half cycle of the line voltage and prior to operation of the TRIAC 120 to its ON state to detect a break in the pool lamp 38. The resistor 128 is selected to limit current flow to the lamp to a safe, i.e. non-lethal, current level, preferably less than 5 ma., when the TRIAC 120 is OFF.

Pool water electrification sensing circuit 104 produces a pool electrification sensing input or signal to pin 6 (port RB0) of the microcontroller 70 which is read by the microcontroller as a SAFE input or signal when the electrification level, if any, of the pool water 24 is within a certain safe range (12 volts or less in the preferred embodiments) and as an UNSAFE input or signal if the pool water electrification level exceeds this safe range. To this end, the sensing circuit 104 comprises a pool electrode 142 which constitutes one of the sensors 43 referred to earlier. Electrode 142 is mounted on the swimming pool side wall 32 close to the respective pool light 22 and may comprise the pool lamp mounting ring 40 (FIG. 3) if this ring is metallic. This electrode is connected to the A.C. common 62 through two resistors 144, 146 in series and a third parallel resistor 148. A lead 150 containing a resistor 152 connects a junction 153 between the series resistors 144, 146 to the microcontroller pin 6 (port RB0). A capacitor 154 in parallel with the resistor 146 is connected between A.C. common 62 and lead 150.

The resistances of the resistors 144, 146 are selected to provide a voltage division such that the voltage at the junction 153, and hence the voltage applied to the microcontroller pin 6 (port RB0), with the pool electrode 142 electrified at the positive peak of the safe maximum 12 volt A.C. voltage level, is slightly greater than the transition threshold voltage (2 volts) of the I/O circuit C of the microcontroller port RB0. Accordingly, the I/O circuit C of the microcontroller port. RB0 provides a logic 0 voltage (0 volts) or SAFE input to the microcontroller firmware if the voltage on the electrode 142 relative to the A.C. common is within a safe range (0–12 volts or slightly less) and a logic 1 voltage (5 volts) or UNSAFE input to the microcontroller if the electrode voltage exceeds this safe pool water electrification range. It should be noted here that a 12 volt threshold electrification test potential is selected for the preferred embodiments because it is currently regarded as being a safe threshold test potential for a swimming pool. This threshold potential may be varied by changing the resistances of the resistors 144, 146.

Resistor 148 is selected to provide a low impedance load between the electrode 142 and the A.C. common 62 for the following reason. Many of today's swimming pools have non-conductive plumbing with the result that the pool water has a limited conductive path to earth ground. In this case, the pool water becomes an antenna which may be capacitively coupled to a variety of extraneous voltage sources ranging from radio frequencies in the air to the power lines used to power the pool equipment, such as pool pump motors. These extraneous voltage sources are high impedance sources, and even though the magnitude of such voltages would be sufficient to present an apparent safety problem, sufficient current would not be available to create a safety problem. Resistor 148 drops the potential across the high impedance extraneous voltage source and thereby prevents a false indication of a dangerous electrification of the pool water.

The microcontroller port RB0 is normally configured by the microcontroller firmware as an output port forcibly set to 0 volts in order to eliminate excessive current drain during the intervals between the periods of checking the pool electrification level. Port RB0 is reconfigured by the firmware for pool electrification testing after a certain period of time (typically 4.5 msec) following each positive zero crossing of the A.C. input to the pool lighting system. Then, after a certain period of time (typically 450 usec) to allow charging of the capacitor 154, the logic state (logic voltage) of the port RB0 is read to provide a pool electrification shock risk sensing signal to the microcontroller.

The broken lamp sensing circuit 106 is operative to detect a break in the pool lamp 38 which creates the risk of lethal electrification of the pool water by contact with the electrified lamp filament 38a and/or its supports 38b, 38c. The broken lamp sensing circuit 106 produces a broken lamp sensing input or signal to pin 11 (port RB5) of the microcontroller 70 which the microcontroller reads as a SAFE signal if the lamp is intact and an UNSAFE signal if the lamp is broken. Operation of this broken lamp sensing circuit 106 involves detecting a break in the lamp filament 38a and is based on the rational that any break in the glass envelope of the lamp will result in burnout or breakage of the lamp filament by contact of the filament with air, water, or solids, whereby a broken or open filament indicates a broken lamp.

Broken lamp sensing circuit 106 comprises a lead 156 connected at one end to a junction 157 in the high voltage pool lamp terminal lead 116 between the pool lamp 38 and the switching circuit 102 and at the other end to the A.C. common 62. Lead 156 contains two resistors 158, 160 in electrical series. A lead 162 connects pin 11 (port RB5) of the microcontroller 70 to a junction 164 in lead 156 between the two series resistors 158, 160. Microcontroller port RB5 is configured as an input by the microcontroller firmware, and the firmware is programmed to sense the voltage at this input (i.e. the logic voltage from the I/O circuit C of the port RB5) at the start of each positive half cycle of the line voltage applied to the shock prevention circuit, as detected by the phase sensing circuit 100, and prior to operation of the switching TRIAC 120 to its ON state.

The filament resistance of a typical 100 watt pool lamp ranges from a few ohms with no power applied to about 144 ohms at full voltage. From the above description of the broken lamp sensing circuit 106 and the earlier description of the switching circuit 102, it will be understood that pool lamp 38 is always connected to the A.C. input terminals 56, 58 of the shock prevention system 47 through the parallel resistor 128 of the switching circuit 102. This resistor is selected to limit maximum current flow to the lamp to a safe non-lethal value (less than 5 ma). If the lamp filament 38a is intact at the start of each positive half cycle of the A.C. line voltage to the shock prevention system, this safe current will flow through the filament and resistor 128 to produce a safe voltage (about 0.7 volts) less than the full line voltage across the filament, and hence across the series resistors 158, 160. On the other hand, if the lamp filament is broken, the full line voltage to the shock risk prevention circuit 47 will exist across the filament and hence across the series resistors 158, 160. Resistors 158, 160 are selected to provide a voltage divider action such that the voltage (preferably about 1 volt) applied to the microcontroller pin 11 (port RB5) when the lamp filament 38a is intact is less than the transition threshold voltage level (2 volts) of the I/O circuit C for the port RB5, and the voltage applied to the pin 11 (port RB5) when the filament is broken is greater than this transition threshold voltage level. Accordingly, the I/O circuit C for the microcontroller port RE5 provides a SAFE logic 0 voltage (0 volts) to the microcontroller firmware in response to a SAFE input signal (1 volt) from the broken lamp sensing circuit 106 when the lamp filament 38a is intact. This port produces an UNSAFE logic 1 voltage (5 volts) to the microcontroller firmware in response to an UNSAFE input signal (full line voltage) from the broken lamp sensing circuit when the filament 38a is broken.

The lamp housing leak sensing circuit 108 produces a water leak sensing input or signal to pin 17 (port RA0) of the microcontroller 70 which the microcontroller reads as a logic 0 UNSAFE input if the lamp housing 36 contains water and as logic 1 SAFE input if the lamp housing is dry. To this end, the sensing circuit 108 comprises a pair of electrodes 165a, 165b located in close proximity to one another within the bottom of the lamp housing 36. These electrodes are two of the sensors 43 mentioned earlier. The lamp housing itself, if metallic, may provide one of these electrodes. Electrode 165a is electrically connected by a lead 166 to the A.C. common 62. Electrode 165b is connected by lead 168 at the junction 172 of resistor 174 and 176. Resistor 174 also connects at one end to the regulated voltage output lead 88 from the regulated 5 volt power supply 86 and resistor 176 also connects to pin 17 (port RA0) of the microcontroller.

When the interior of the lamp housing 36 is dry, an open circuit exists between the electrodes 165a, 165b, and current flow occurs through the series resistor 174, junction 172 and resistor 176 to microcontroller pin 17 (RA0). Hence, the voltage applied to this port is greater than the transition threshold voltage (2 volts) of the port I/O circuit C as shown in FIG. 5. This voltage constitutes a SAFE water leak sensing input or signal from the water leak sensing circuit 108 and being greater than the transition threshold voltage of the port RA0, places this port in its logic 1 state. In this state, the port RA0 produces a logic 1 input or voltage (5 volts) to the microcontroller which is read by the microcontroller firmware as a SAFE input from the lamp housing leak sensing circuit 108 indicating a water tight lamp housing 36. On the other hand, water within the lamp housing creates a conductive path between the electrodes 165a, 165b which places the circuit junction 172 and hence the microcontroller pin 17 at the near ground potential of the A.C. common 62. This potential is less than the transition threshold voltage level (2 volts) of the I/O circuit C for the port RA0. This port then produces a logic 0 input or voltage (0 volts) to the microcontroller which is read by the microcontroller firmware as an UNSAFE leak sensing input from the leak sensing circuit indicating a flooded lamp housing.

The low water level sensing circuit 110 produces a low water level sensing input or signal to pin 10 (port RB4) of the microcontroller 70. The microcontroller firmware reads this signal as an UNSAFE low water level signal if the pool water 24 is below the level of the lamp housing 36 and as a SAFE water level signal if the pool water is above the level of the lamp housing. In this regard, it will be recalled from the earlier discussion that each swimming pool light 22 must operate submerged in the pool water 24 in order to enable the water to cool its lamp housing 36 and thereby prevent overheating of the housing which may melt the housing if it is constructed of plastic or otherwise destroy its water-tight integrity. The low water level sensing circuit 110 comprises an optical water sensor 178 (FIGS. 4B, 6 and 7) which constitutes one of the sensors 43 referred to earlier. The illustrated optical sensor is an optically transparent light pipe having a 90 degree conically tapered tip 180 (i.e. 45 degree included angle between the longitudinal axis of the light pipe axis and its conical surface) and an opposite transverse planar end face 182 at the base of the light pipe. Situated opposite the light pipe end face 182 are a light emitting diode (LED) 184 and a photosensitive transistor 186. As described below in connection with FIGS. 6 and 7, the LED 184 and the photosensitive transistor 186 are mounted in fixed positions opposite the light pipe end face 182 in a manner such that light from the LED 184 propagates through the light pipe toward its conical tip 180, and the photosensitive transistor 186 receives any such light which is reflected back from the light pipe tip.

Referring to FIG. 4B, the anode of the LED 184 is connected to pin 9 (port RB3) of the microcontroller 70 through a lead 188 containing a resistor 190 in series with the LED. The cathode of the LED 184 is connected to the A.C. common 62. The collector of photosensitive transistor 186 is connected to the output lead 88 from the linear voltage (5 volt) regulator 86 through a lead 192 containing a series resistor 194. A lead 196 connects pin 10 (port RB4) of the microcontroller 70 to the lead 192 at a junction 198 between the photosensitive transistor 186 and the resistor 194. The emitter of photosensitive transistor 186 is connected to A.C. common 62.

Referring to FIGS. 6 and 7, it will be seen that the safety module 42 has a watertight body 199 in which the shock prevention circuit 47 including the low water level sensing circuit 110 are sealed against contact of water with the circuit, as by encapsulation of the circuit in plastic. This safety module is mounted within the upper portion of the pool lamp housing 36 in contact with the inner side of the upper wall 200 of the housing and is fixed to the housing wall in any convenient way, as by screws 202 sealed against water leakage into the housing. The light pipe 178 is situated at the upper side of the safety module body 199 and has its base end fixed within and sealed to the body, as shown. The tapered end of the light pipe extends upwardly beyond the upper side of the module body and through an opening in the wall 200 of the lamp housing 36 into the pool side wall cavity 30 which contains the housing. The conically tapered tip 180 of the light pipe is situated and exposed within this cavity, as shown. The light pipe may be removable from its opening in the lamp housing side wall 200 to permit removal and replacement of the safety module 42 and is sealed to the wall in any convenient way to prevent water leakage into the housing through the opening.

Within the body 199 of the safety module 42 opposite the end face 182 of the light pipe 178 are cavities 204 (FIG. 7) which contain the LED 184 and the photosensitive transistor 186, respectively. The LED is situated at one side of the longitudinal axis of the light pipe to emit light toward the pipe parallel to its axis. This light passes longitudinally through the pipe to its conically tapered tip 180. The light pipe is made of an optically transparent material whose refractive index is approximately the same as that of pool water but substantially different than that of air. The preferred material of the light pipe is Lucite. Accordingly, if light pipe tip 180 is surrounded by air, the tip acts as an internal corner reflector which receives light from the LED 184 through the pipe and reflects this light back through the pipe to the photosensitive transistor 186. On the other hand, if the tip of the light pipe is surrounded by water, the tip is effectively optically transparent to the light from the LED so that this light passes through the tip into the surrounding water rather than being reflected back to the photosensitive transistor.

Assume now that the pool water 24 is at its normal level L and thus fills the pool side wall cavity 30 in which the pool light 22 is mounted. In this regard, it will be understood that the side wall cavity is not sealed against entrance of water into the cavity and hence will be flooded when the water level is higher than the cavity. Under these conditions, the tapered tip 180 of the light pipe 178 is submerged in the water within the cavity, and light from the LED 184, rather than being reflected back through the light pipe, passes through the pipe tip into the water. The photosensitive transistor 186 then assumes its OFF or non-conductive state. The full output voltage (5 volts) of the linear voltage regulator 86 is then applied to pin 10 (port RB4) of the microcontroller 70 through leads 192, 196. This voltage is greater than the transition threshold voltage (2 volts) of the I/O circuit C for the port RB4, and this port provides the microcontroller firmware with a logic 1 SAFE input or voltage (5 volts). The microcontroller firmware reads this input voltage as a SAFE water level sensing input or signal from the low water level sensing circuit 110 which indicates that the lamp housing 36 is submerged in pool water and hence protected against overheating. On the other hand, if the water level in the pool is below the pool light wall cavity 30, the tip 180 of the light pipe 178 is surrounded by air. Light from the LED 184 is then reflected from the light pipe tip back to the photosensitive transistor 186 and triggers the transistor to its ON or conductive state. The near ground potential of the A.C. common 62 is then applied to pin 10 (port RB4) of the microcontroller through the lead 186. This potential is less than the transition threshold voltage of the I/O circuit C for the port RB4 so that this port produces the microcontroller with logic 0 UNSAFE input or voltage (0 volts) and is read by the microcontroller as a logic 0 UNSAFE low water level sensing input or signal from the low water level sensing circuit 110 indicating that at least an upper portion of the lamp housing is above the water and in danger of overheating.

The current required to illuminate the LED 186 is about 25 ma. This current, if drawn continuously, would cause an excess load on the regulated power supply circuit 76. In order to avoid this drain, the microcontroller firmware is programmed to momentarily illuminate the LED and check the water level only at the peak of each positive half cycle of the A.C. input power to the shock prevention system. This technique reduces the average current required for low water level sensing to about 0.15 ma. but results in periodic current pulses from the power supply circuit 76. This circuit can best recover from these current pulses by timing the pulses to occur at the positive peak of the A.C. power input.

Figure 10:
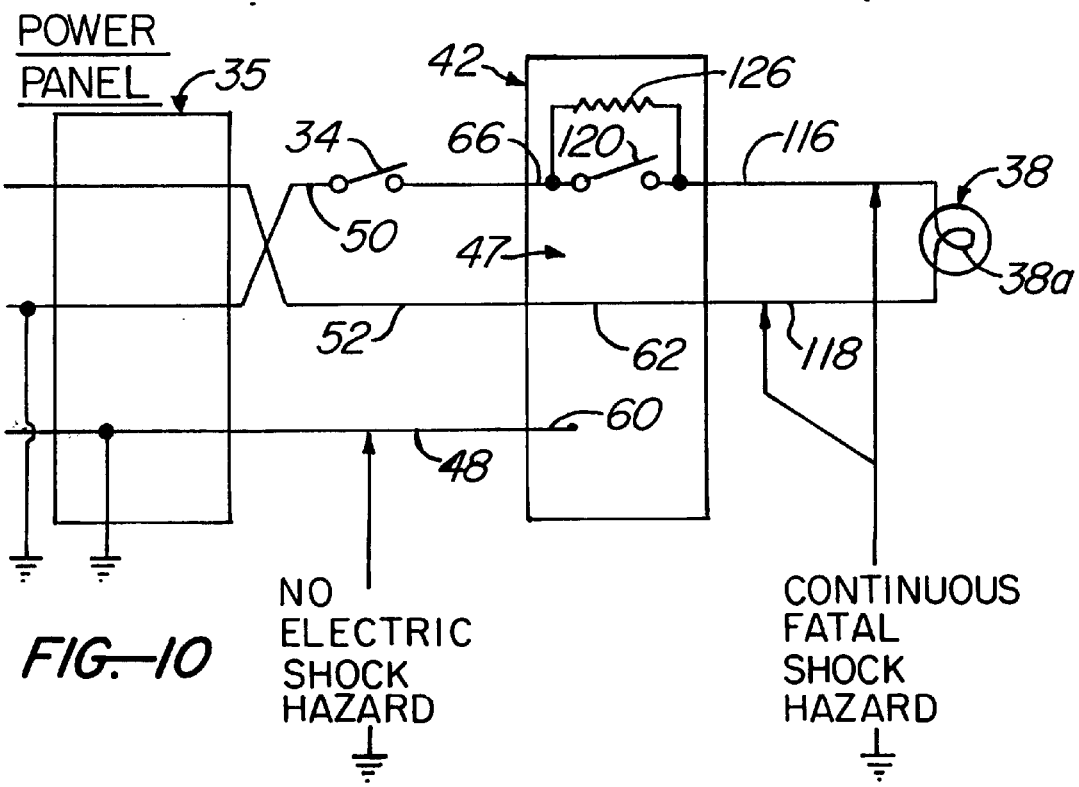

The faulty wiring sensing circuit 112 produces an input to pin 13 (port RB7) of the microcontroller 70 which the microcontroller reads as a logic 0 UNSAFE faulty wiring input from the sensing circuit if high voltage and A.C. common connections are reversed at some point in the pool lighting system 20 and as a logic 1 SAFE wiring input from the faulty wiring sensing circuit in the absence of such faulty wiring. Before describing this sensing circuit, turn to FIGS. 8–10 which illustrate, in diagrammatic fashion, a properly wired lighting system (FIG. 8) and two types of faulty wiring (FIGS. 9 and 10). In the properly wired system of FIG. 8, the main ground lead 48, common lead 50, and high voltage lead 52 from the power panel 35 for the pool lighting system are properly connected to the ground lead 60, common lead 62, and high voltage lead 66, respectively, of the shock prevention circuit 47. As indicated by the legends in this figure, only the high voltage leads 66, 116 of the circuit 47 present an electrical shock hazard and only when the main lighting switch 34 and pool lamp switch 120 are closed.

FIG. 9 illustrates an improperly wired pool lighting system in which the miswire exists between the main lighting switch 34 and a pool light safety module 42. In this case, the high voltage A.C. power lead 52 from power panel 35 is improperly connected to the common lead 62 of the safety module 42 between the safety module 42 and the main lighting switch 34. The common lead 50 from the power panel is improperly connected to the high voltage lead 66 of the safety module. The improperly wired system of FIG. 10 is similar to that of FIG. 9 except that the common lead 50 from the power panel 35 is connected through the main lighting switch 34 to the high voltage lead 66 of the safety module 42, and the high voltage lead 52 from the power panel is connected to the common lead 62 of the safety module. As indicated by the legends in FIGS. 9 and 10, both of these miswires present potentially lethal electrical shock hazards.

When the manual pool lamp switch 34 (FIG. 9) is closed, the common wire 118, both connections to the lamp and wire 116, present potentially fatal shock hazard when touched by anyone electrically grounded. Switch 120 when closed will only cause wire 116 to be grounded and will have no further protection. In FIG. 10, this same hazard exists continually, even when 34 is open.

Referring now to FIG. 4A, the faulty wiring sensing circuit 112 comprises a lead 206 connecting ground 60 and A.C. common 62 of the shock prevention circuit 47 and containing two resistors 208, 210 in electrical series. A lead 212 connects pin 13 (port RB7) of the microcontroller 70 to the lead 206 at a junction 214 between the resistors 208, 210. If the lighting system is properly wired, as in FIG. 8, ground 60 and A.C. common 62 will be at the same or nearly the same potential. In this case, the voltage, if any, applied to the microcontroller pin 13 (port RB7} will be less than the transition threshold voltage (2 volts) of the I/O circuit C for the port RB7, and this port produces a logic 0 input or voltage (0 volts) to the microcontroller firmware which the firmware reads as a logic 0 SAFE input or signal from the faulty wiring sensing circuit 112 indicating the absence of faulty wiring. On the other hand, if the lighting system is miswired in either of the ways shown in FIGS. 9 and 10, substantially full line voltage will exist between the ground 60 and A.C. common 62. The resistors 208, 210 are selected to provide, in this case, a voltage division which applies to the microcontroller pin 13 (port RB7) a voltage greater than the transition threshold voltage of the I/O circuit C for the port RB7. This port then provides the microcontroller firmware with an UNSAFE logic 1 input or voltage (5 volts) which is read by the microcontroller as an UNSAFE faulty wiring input or signal from the faulty wiring sensing circuit 112 indicating the existence of faulty wiring.

FIG. 11 illustrates a modified shock prevention safety module 42a according to the invention mounted in the pool light lamp housing 36 in place of the safety module 42 described above. Safety module 42a is identical to the safety module 42 and includes a shock prevention circuit 47a (shown in fragmentary fashion in FIG. 12) which is identical to the shock prevention circuit 47 of FIGS. 4A, 4B except as follows. Module 42a and its shock prevention circuit 47a include a temperature responsive low water level sensing circuit 216 in place of the electro-optical water sensing circuit 110 of safety module 42 and its shock prevention circuit 47. Also, safety module 42a and its shock prevention circuit 47a utilize the RTCC (real time clock counter) function of the microcontroller 70. Temperature responsive sensing circuit 216 senses the pool water level indirectly by sensing the pool lamp housing temperature. In this regard, it will be understood from the description to this point that when the pool lighting system 20 is turned on with the pool water 24 at or above its normal level L, the pool lights 22 will be cooled by the water sufficiently to maintain the lights within a safe temperature range such that their lamp housings and seals will not suffer thermal damage. If the pool water drops to some intermediate level of or below level of the pool lights, the pool light temperatures will increase and in the worst case will increase sufficiently to cause thermal damage to and create a leak in the lights with resultant flooding of the lamp housings 36. Accordingly, an increase in the temperature of a pool light 22a above its safe temperature when the lamp is on is indicative of both a low water level and the existence of a potential shock risk condition.

As just mentioned, the modified shock prevention circuit 47a illustrated in FIG. 12 is identical to the shock prevention circuit 47 of FIGS. 4A, 4B except for replacement of the electro-optical water sensing circuit 110 of circuit 47 by the temperature responsive sensing circuit 216 in FIG. 12 and connection of the microcontroller real time clock counting port RTCC (pin 3) to this temperature responsive sensing circuit, as shown in FIG. 12, rather than to the regulated power supply 86, as in the shock prevention circuit 47. For this reason, only a portion of the modified shock prevention circuit 47a including microcontroller 70, the modified temperature responsive water level sensing circuit 216, and the RTCC connection is shown in FIG. 12. It will be understood that the remainder of the shock prevention circuit 47a is identical to that of the shock prevention circuit 47 of FIGS. 4A, 4B. Those circuit elements shown in FIG. 12 which are common to both shock prevention circuits 47 and 47a are designated by the same reference numerals as the corresponding circuit elements in FIGS. 4A, 4B.

Temperature sensing circuit 216 comprises three leads 218, 220, 222 connected at one end to pins 8 (port RB2), 9 (port RB3), and 10 (port RB4), respectively, of the microcontroller 70 and at their other ends to a common lead 224. In the embodiment of FIGS. 11 and 12, these three ports are configured as output ports by the microcontroller firmware.

Lead 224 connects to A.C. common 62 through a timing capacitor 226. Leads 218, 220, 222 contain a fixed current limiting resistor 228, a fixed reference resistor 230, and a variable temperature responsive resistor or sensor 232 (preferably a THERMISTOR), respectively. A lead 234 connects the microcontroller real time clock controller port RTCC (pin 3), which is configured as an input port by the firmware, to lead 218 between the microcontroller port RB2 (pin 8) and resistor 228 so as to enable the RTCC port to monitor the voltage on the timing capacitor 226. Shock prevention circuit 47a uses the real time clock counter in the microcontroller 70, rather than the I/O circuit C of FIG. 5, to monitor the voltage on the timing capacitor 226 because the real time clock counter is hardware configured as a schmitt trigger input which has a much smaller threshold variation than the I/O circuit C of FIG. 5. The shock prevention circuit 47a is otherwise identical to the shock prevention circuit 47.

Themistor 232 is utilized to sense the temperature of the pool lamp housing 36. In the inventive embodiment of FIG. 11, this is accomplished by fixing the THERMISTOR in a mounting clamp 236 attached to the front end of the housing, as shown in figure 11. The temperature at this monitoring point is hereafter referred to as the lamp housing temperature. The preferred THERMISTOR is that marketed by the Keystone Company under the trade designation RL1006-53.4K-140-D! and having typical resistance values of 100K ohms at 25 degrees C. (77 degrees F.), 16K ohms at 65 degrees C. (149 degrees F.), and 10K ohms at 75 degrees C. (167 degrees F.). Resistor 230 has a fixed resistance and is used as a reference. The timing capacitor 226 is discharged through port RTCC and the resistor 228 which limits current flow into the port during such discharge.

Reference resistor 230 is selected to have a resistance equal to the resistance of the THERMISTOR 232 at a selected maximum lamp housing temperature at which the lamp 38 of the pool light 22a is to be turned off to prevent overheating of the lamp housing 36 and its seal. This selected maximum lamp housing temperature is made slightly higher than the normal temperature to which the lamp housing is heated during normal operation of the pool light 22 at full power while fully submerged in the pool water 24 but less than the lowest temperature at which the lamp housing 36 may incur thermal damage. The preferred maximum lamp housing temperature is 65 degrees C. which corresponds to a resistance of 16K ohms in the preferred THERMISTOR 232 mentioned above.

The microcontroller firmware is programmed to sense the lamp housing temperature during each positive half cycle of the A.C. input to the shock prevention circuit 47a by performing the following sequential temperature sensing/comparing actions: (a) apply a certain output voltage (herein temperature sensing voltage) to microcontroller reference resistor port RB3 (pin 9) and simultaneously start the microcontroller real time clock counter, (b) utilize the microcontroller real time clock counter and the timing capacitor charge level input to the microcontroller real time clock counter port RTCC through the lead 234 to measure the time (herein reference charge time) required to charge the timing capacitor 226 to a certain charge level through the reference resistor 230, (c) apply the same temperature sensing voltage to microcontroller temperature sensing port RB4 (pin 10) and simultaneously start the microcontroller real time clock counter, (d) utilize the microcontroller real time clock counter and the timing capacitor input to the real time clock counter port RTCC through the lead 234 to measure the time (herein temperature charge time) required to charge the timing capacitor 226 to the same certain charge level through the temperature responsive resistor or THERMISTOR 232, (e) compare the timing capacitor reference charge time and the temperature charge time, and (f) if the temperature charge time is less than the reference charge time (as it will be if the lamp housing temperature exceeds the selected maximum safe lamp housing temperature because of the inverse relation between THERMISTOR temperature and resistance), provide an UNSAFE temperature sensing input or signal to the microcontroller firmware to turn off the pool light until the lamp housing cools below the selected maximum safe housing temperature.

The description to this point has detailed the hardware of the shock prevention system 26 for each pool light 22 and the manner in which this hardware is arranged to (a) provide shock risk sensing inputs or signals to the microcontroller 70 indicating the presence or absence of the electrical shock risk conditions associated with the respective pool light, and (b) turn the pool light on and off in response to the shock risk sensing signals. The overall operation of one pool light 22 will now be explained. It will be understood, of course, that this description will apply with equal force to each and every one of the pool lights and hence to the pool lighting system 20 as a whole.

As will appear from the following description, the firmware of the microcontroller 70 for each pool light 22 repeatedly checks or tests for the presence of the shock risk conditions mentioned earlier by repeatedly sensing or monitoring the shock risk sensing inputs or signals from the shock risk sensing circuits 104, 106, 108, 110 or 216, and 112 in a predetermined sequence during each cycle of the 60 cycle per second A.C. line voltage to the shock prevention system 47, 47a. By applying a trigger voltage to the gate of the triac 120 for a brief period of time near the start of each positive and negative half cycle of the A.C. power input to the shock prevention circuit 47, in which no shock risk conditions are detected by the shock risk sensing circuits 104–112. This causes the triac to conduct and it remains in the on state until the end of each half cycle, causing electrical line voltage to be applied to the pool lamp 38. Initiation of these shock risk tests, the sequence of the tests, interpretation of the test results, and the control functions based on the test results all occur automatically under the control of the firmware program stored in the microcontroller 70 of the shock prevention circuit.

Figure 13:
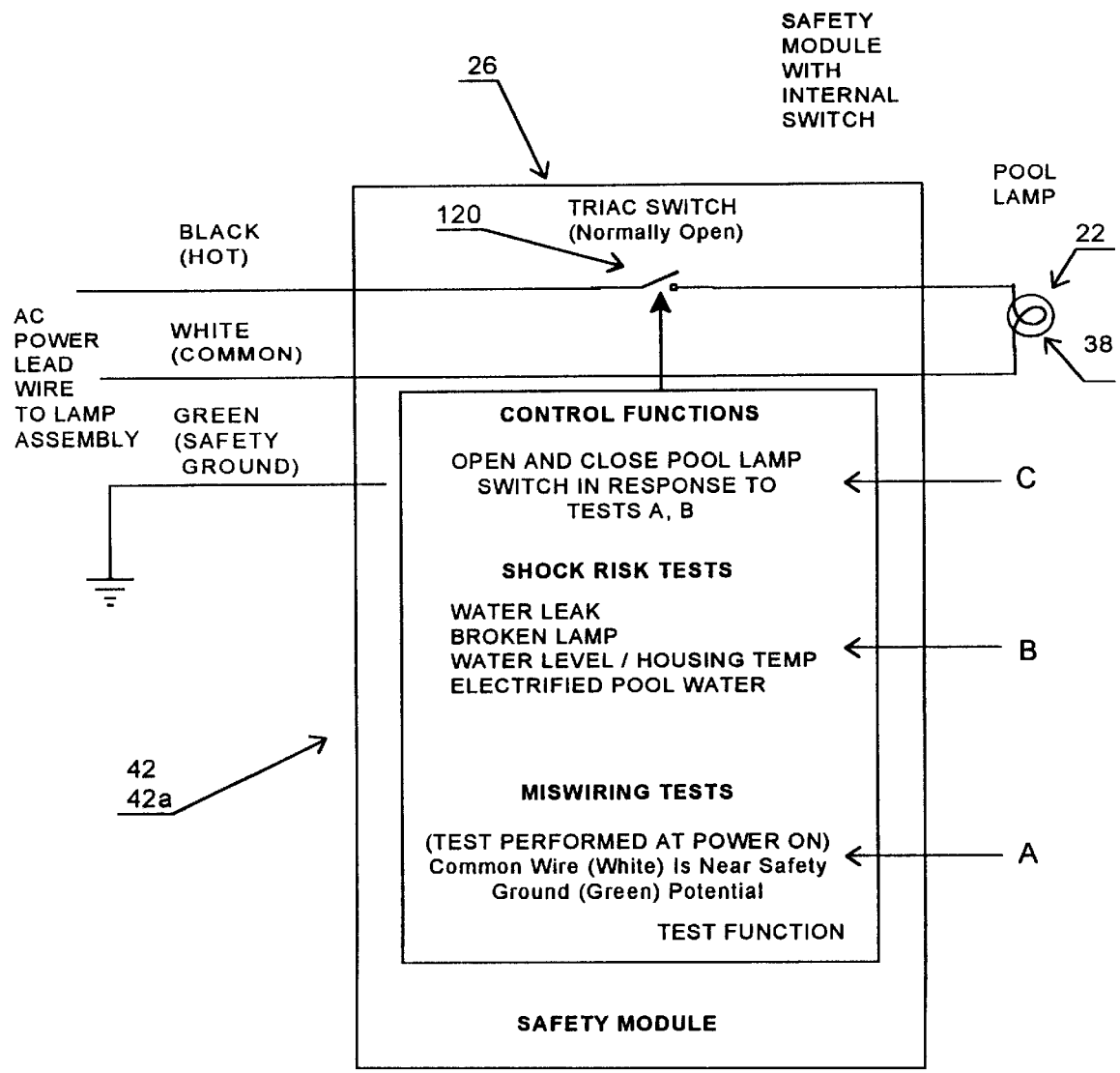
FIG. 13 is functional block diagram depicting the functions of the swimming pool shock prevention systems in FIGS. 1–12.

With the foregoing in mind, refer first to FIG. 13 which is a functional block diagram of the safety module 42, 42a of the shock prevention system 26 for one pool light 22 of the pool lighting system 20 depicting the lamp 38 of the pool light, the safety module lamp switch (TRIAC) 120, and the shock risk tests and control functions which are performed by the safety module in response to electrification of the lighting system by closure of its main power switch 34. The shock risk tests include an initial miswiring test "A" and additional shock risk tests "B". Miswiring test "A" is performed upon initial electrification of the pool lighting system 20 to test for the potentially lethal wiring errors of FIGS. 9 and 10. The additional shock risk tests "B" are performed repeatedly during each positive half cycle of the A.C. input to the safety module to test for water leak (water in lamp housing 36), broken lamp (broken lamp filament 38a), water level/housing temperature (low water level/high housing temperature), and electrified pool water 24 (high water electrification level). Control functions "C" are responsive to the shock risk tests "A" and "B" and operate the safety module lamp switch (TRIAC) 120 to turn the pool lamp 28 on in the absence of any shock risk condition. In the presently preferred embodiments described herein, electrical power is turned on to the pool lamp by the triac 120, near the start of each positive and negative half cycle and remains on until the end of each half cycle of the A.C. input to the shock prevention circuit when no shock risk conditions exist.

Figure 14:
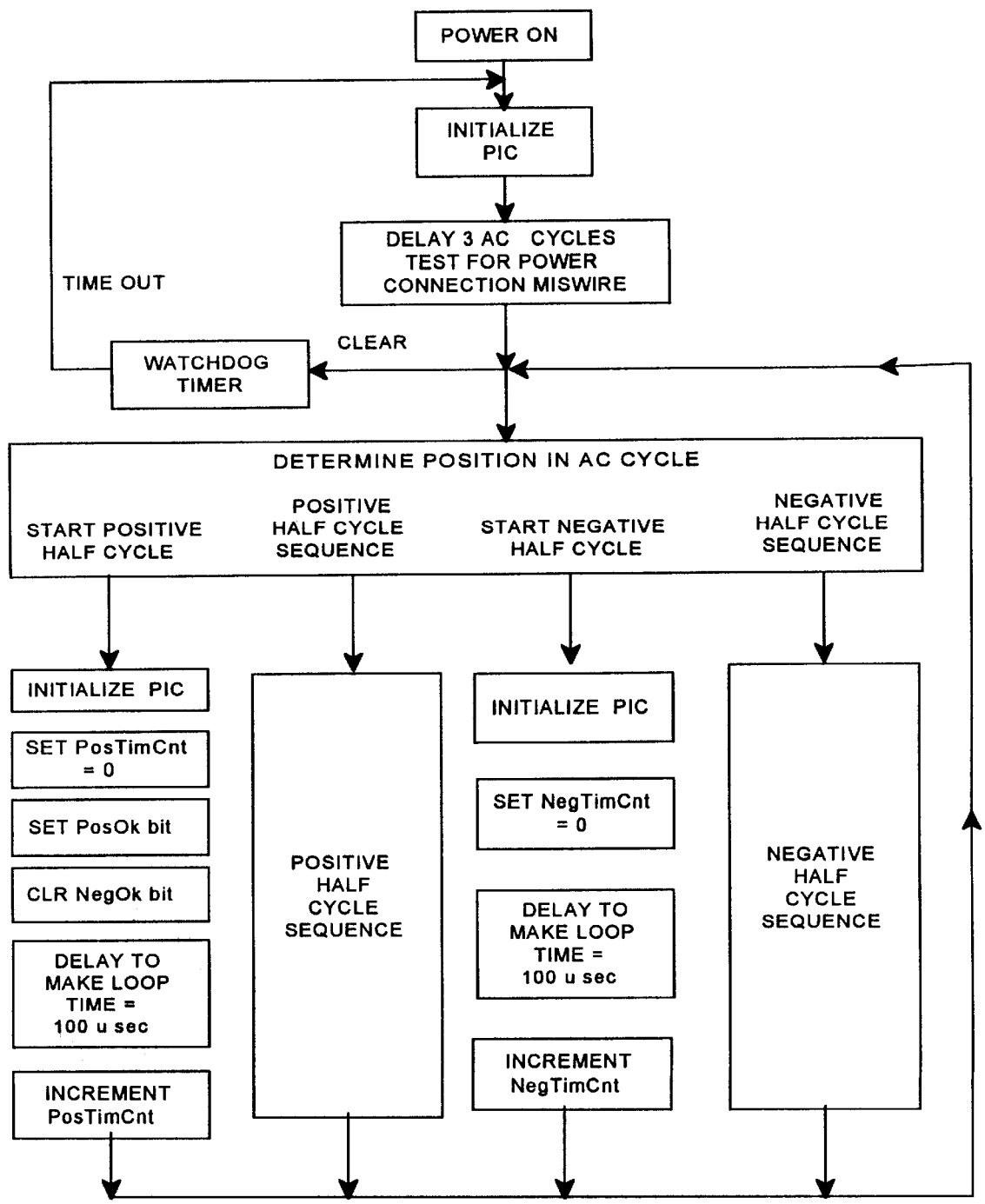
FIG. 14 is a simplified flow diagram of the firmware embodied in the microcontroller of the shock prevention circuits of FIGS. 1–12.
Figure 15:
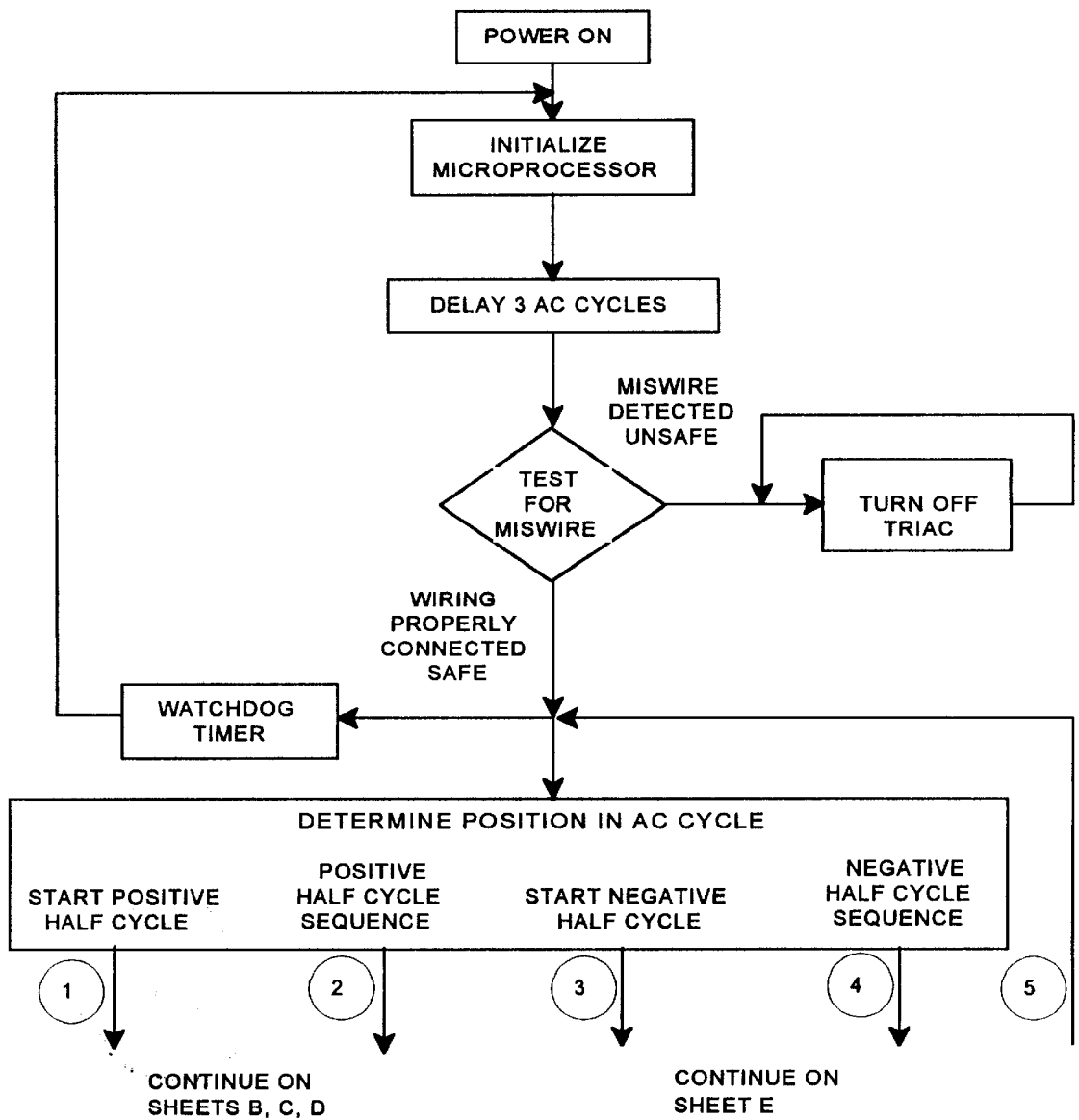
FIGS. 15A–15E taken together are a flow chart of the microcontroller firmware represented in FIG. 14 and illustrating the functions which are firmware programmed into the microcontroller of the shock prevention circuit to occur during positive and negative half cycles of the A.C.line voltage to the shock prevention circuits.
Figure 15:
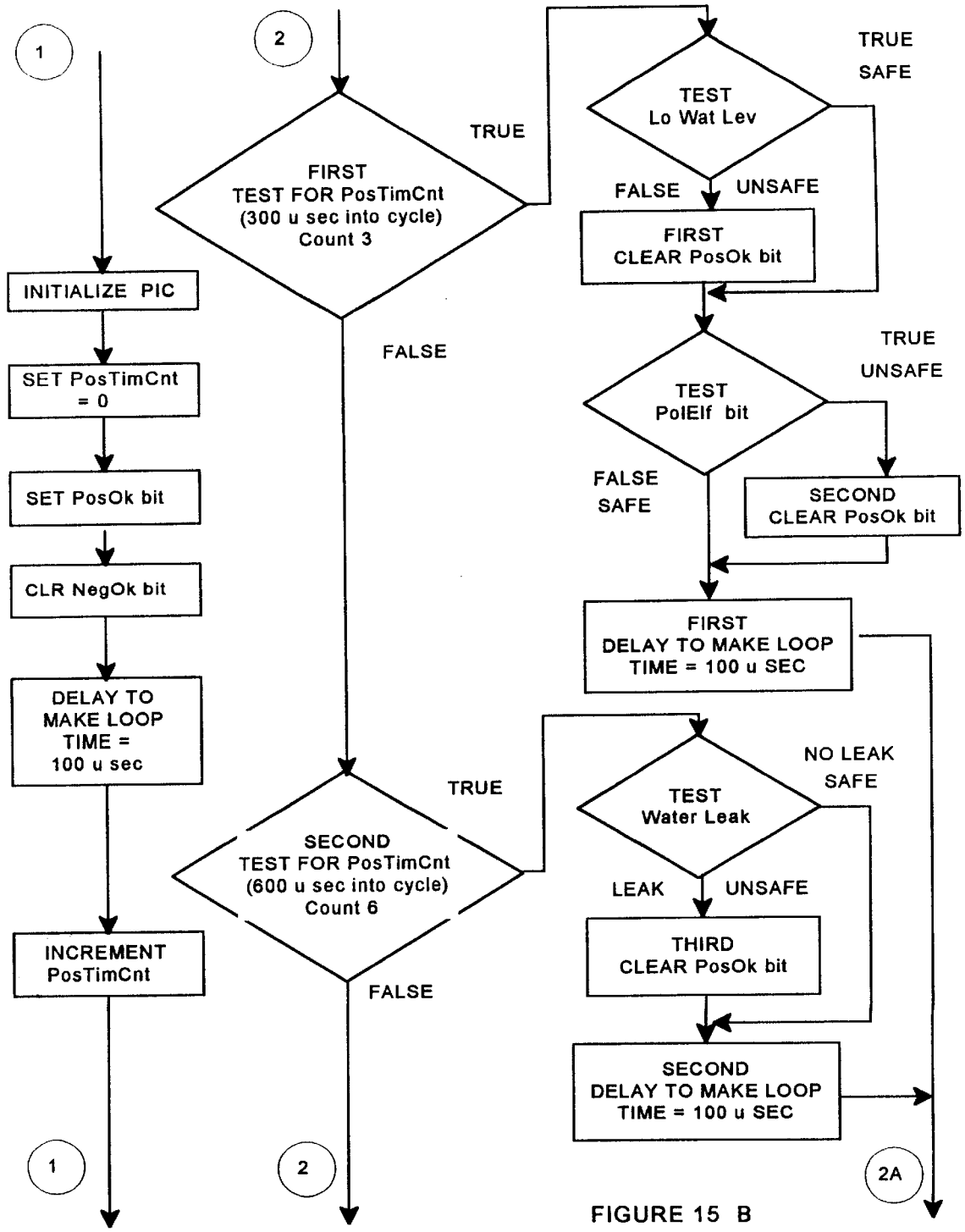
Figure 15:
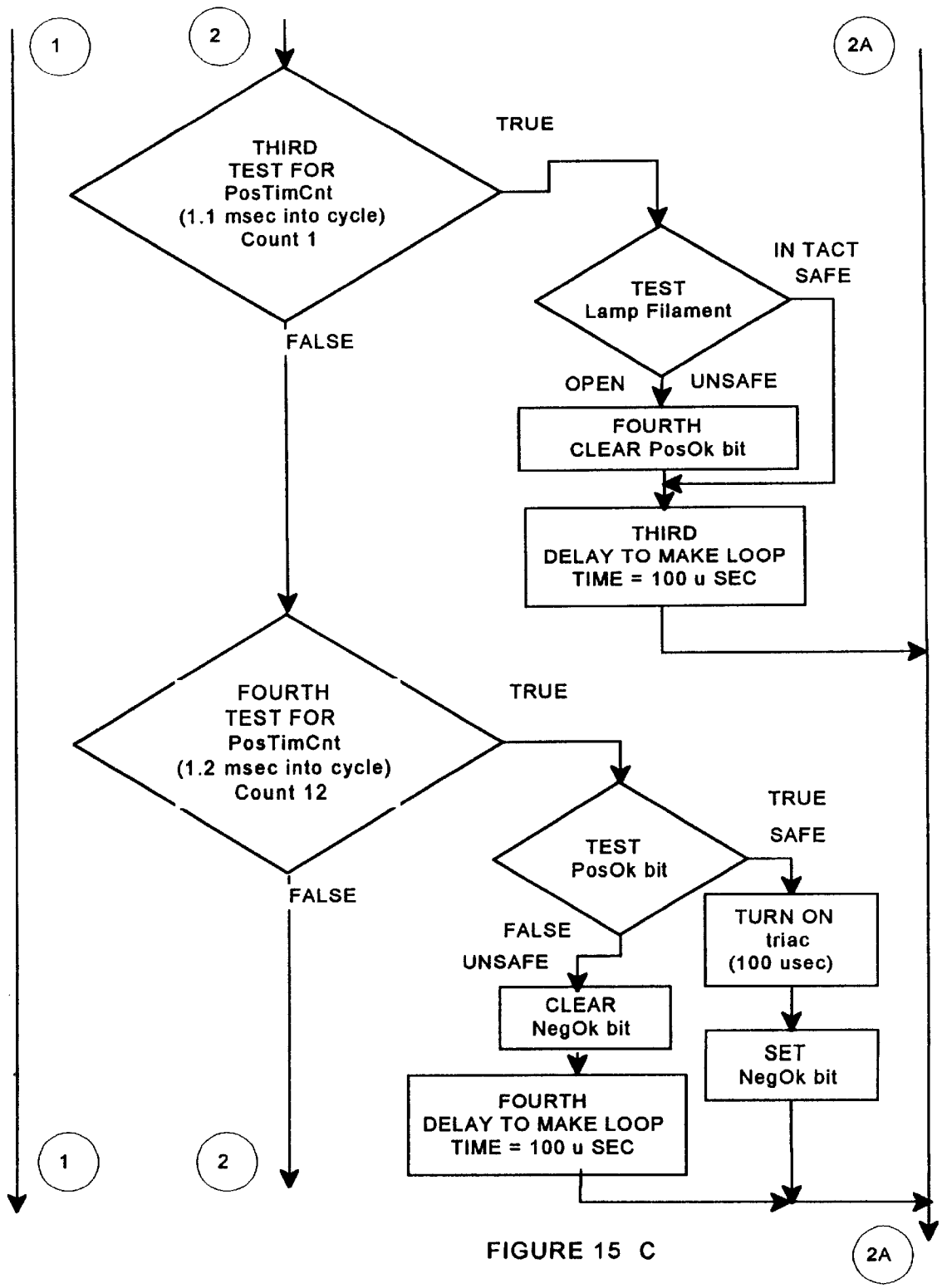
Figure 15:
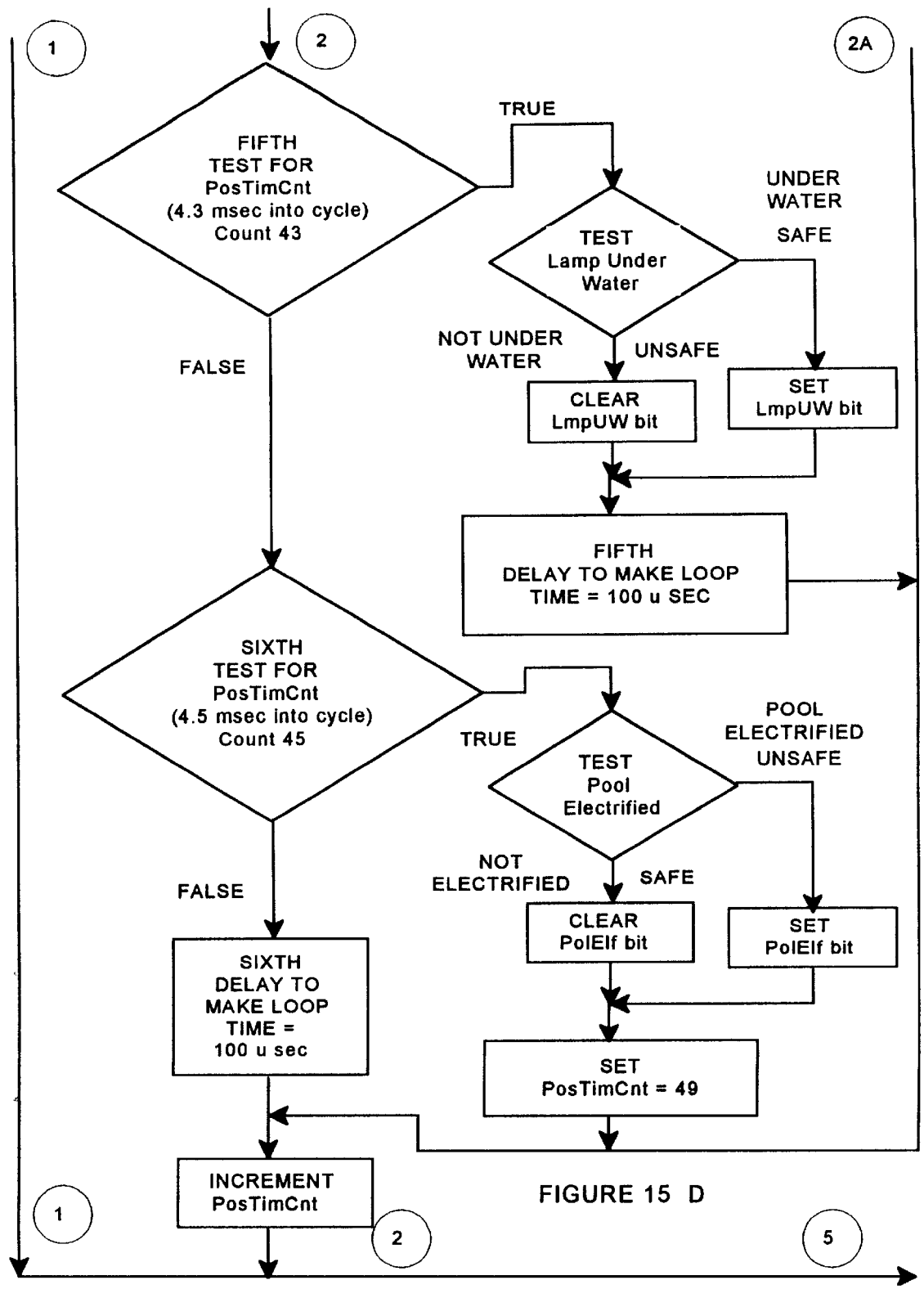
Figure 15:
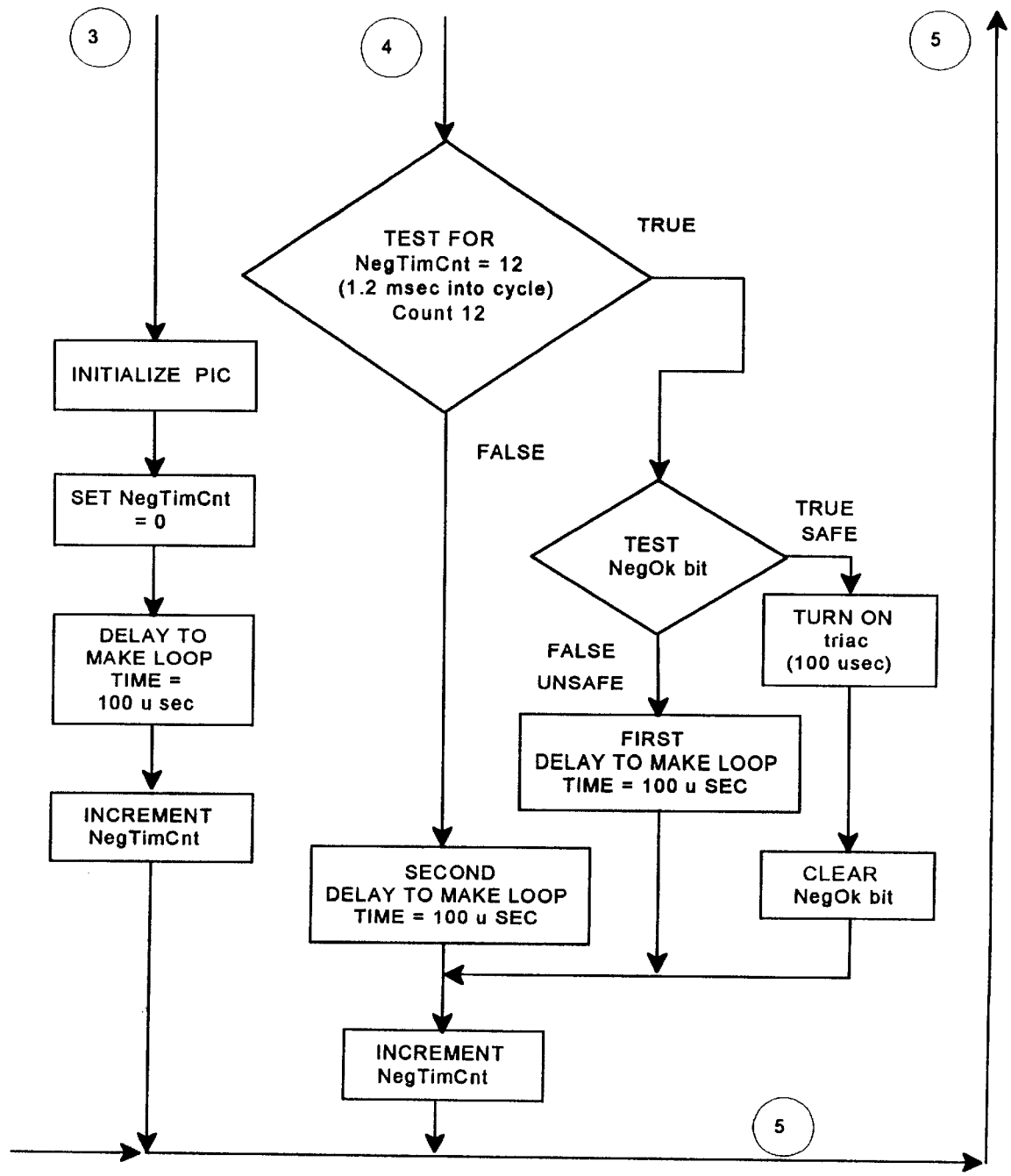

Refer next to FIG. 14 which is a simplified flow chart of a preferred firmware program stored in the microcontroller 70 to accomplish the shock risk tests "A" and "B" and control functions "C" in FIG. 13, FIG. 14 lists certain control functions and shock risk tests which occur in the shock prevention circuit 47, 47*a* under the command of the firmware program in response to initial electrification of the pool lighting system 20 by closing its main power switch 34. Following is a brief pseudocode outline of this simplified flow chart:

1. Power-on the pool lighting system.
2. Initialize the microcontroller 70.
3. Test for faulty wiring.
4. Clear and restart a watchdog timer to provide a continuous hardware check on circuit operation.
5. Determine the positive and negative zero crossings and thereby the positive and negative half cycles of the A.C. power input, and repeatedly direct the microcontroller firmware program through four successive program paths referred to herein as START POSITIVE HALF CYCLE path, POSITIVE HALF CYCLE SEQUENCE path, START NEGATIVE HALF CYCLE path, and NEGATIVE HALF CYCLE SEQUENCE path. As will appear from the following description, the firmware program effectively undergoes successive loops these four paths. Each loop is hereafter referred to by the term "loop" prefaced by the name of the respective path. All of these loops have the same predetermined time duration (loop time) which is 100 usec in the described embodiments. Each complete-cycle of the firmware program involves a single positive half cycle start loop of the program through the START POSITIVE HALF CYCLE path, a following series of successive positive half cycle sequence loops through the POSITIVE HALF CYCLE SEQUENCE path, a following single negative half cycle start loop through the START NEGATIVE HALF CYCLE path, and a final series of successive negative half cycle sequence loops through the NEGATIVE HALF CYCLE SEQUENCE path.
6. During each positive half cycle start loop of the firmware program through the START POSITIVE HALF CYCLE path, perform certain functions including the following: (a) initialize the microcontroller 70, (b) reset a positive half cycle time counter in the microcontroller to a zero positive time count (Pos Tim Cnt), (c) set a positive OK bit (Pos OK Bit) which conditions the shock prevention circuit to turn on the pool lamp, (d) clear a negative OK bit (Neg OK Bit) which, when set, conditions the shock prevention circuit to turn on the pool lamp, (e) delay the firmware program to provide the PRESET LOOP TIME (100 usec), (f) increment the positive half cycle time count by one count (0.1 msec), and (g) loop the program path back to the DETERMINE POSITION IN A.C. CYCLE program block, resetting the watchdog timer to zero on the way.
7. During successive half cycle sequence loops of the firmware program through the POSITIVE HALF CYCLE SEQUENCE path, perform the following shock risk test and pool lamp control functions in a predetermined sequence: (a) test or check for the shock risk conditions, (b) if no shock risk condition exists, electrify the pool lamp by turning on the triac 120, near the start of the positive half cycle and it will remain on until the end of half cycle, (c) delay the firmware program to provide the PRESET LOOP TIME (100 usec), (d) increment the positive half cycle time count, and (e) return the firmware path to the DETERMINE POSITION IN A.C. CYCLE program block, resetting the watchdog timer to zero on the way, to complete a positive half cycle sequence loop.
8. Perform the following functions during each negative half cycle start loop of the firmware program through the START NEGATIVE HALF CYCLE path: (a) initialize the microcontroller, (b) set a negative half cycle time counter in the microcontroller to a zero negative time count (Neg Tim Cnt), (c) delay the firmware program to provide the overall PRESET LOOP TIME (100 usec), (d) increment the negative half cycle time counter by one count (0.1 msec), and (e) return the program path back to the DETERMINE POSITION IN A.C. CYCLE program block, resetting the watchdog timer to zero on the way.
9. Perform the following negative half cycle shock risk test and pool lamp control functions during successive negative half cycle sequence loops of the firmware program through the NEGATIVE HALF CYCLE SEQUENCE path: (a) test for the negative OK bit (Neg OK Bit) to determine whether or not this bit is set in the firmware program, (b) if the Neg OK Bit is set, electrify the pool lamp by turning on the triac 120, near the start of the negative half cycle and it will remain on until the end of half cycle, clear the Neg OK Bit, increment the negative half cycle counter, and loop the firmware program path back to the DETERMINE POSITION IN A.C. CYCLE flow chart block, resetting the watchdog timer on the way, and (c) if the Neg OK Bit is not present, delay the firmware program to provide the PRESET LOOP TIME (100 usec), increment the negative half cycle counter, and loop the firmware program path back to the DETERMINE POSITION IN A.C. CYCLE flow chart block, resetting the watchdog timer on the way to complete one full shock risk test and pool lamp control cycle of the microcontroller firmware program.
10. Continuously repeat the complete shock risk test and pool lamp control cycle of 1–9 above while the lighting system 20 remains electrified from the main power panel 35.

Following is a description of the more detailed firmware flowchart of FIGS. 15A–15E which illustrates the successive functions performed during each positive and negative half cycle of the A.C. input to the shock prevention circuit 47, 47*a* by the firmware program stored in the microcontroller 70. Each paragraph of the description is referenced to the particular firmware flow chart block to which the paragraph relates.

POWER ON

Closing the main power switch 34 (FIG. 1) of the pool lighting system 20 electrifies each pool light safety module 42, 42*a* from the lighting system power source 35 and thereby electrifies the corresponding pool lamp 38 at an initial safe low current level (less than 5 ma.) through the by-pass resistor 128 of its TRIAC switch 120 and energizes the regulated power supply 76 of the safety module. The regulated A.C. output voltage (preferably 5 volts) from the energized power supply 76 is thereby applied to the primary power input port VDD (pin 14), the real time clock counter port RTCC (pin 3), and the master clear port MCLR (pin 4) of the module microcontroller 70. This regulated voltage input to the microcontroller effect the following functions in the microcontroller: (a) initializes the microcontroller utilizing power-on reset circuitry embodied in the microcontroller, (b) resets a program counter in the microcontroller to START, (c) starts the firmware program stored in the microcontroller, and (d) in the shock risk prevention circuit 47 of FIGS. 4A, 4B biases the microcontroller real time clock counter to +5 volts in accordance with the manufacturer's recommendation when this real time clock counter is not used, which it is not in shock prevention circuit 47.

INITIALIZE MICROCONTROLLER

The firmware code associated with this flowchart block performs the following functions in response to powering on the pool lighting system 20: (a) initializes internal registers within the microcontroller 70 by resetting them to the desired first state, (b) defines each microcontroller port RA0 and RB0–RB7 as an input port or an output port, and (c) defines the logic state of each output port, all in accordance with the firmware program stored in the microcontroller.

DELAY FIRMWARE PROGRAM

The firmware code associated with this flowchart block performs the following functions in response to initializing the microcontroller: (a) monitors the wave form of the A.C. input to the shock prevention circuit 47, 47a by monitoring the logic state of the microcontroller A.C. phase sensing port RB6 (pin 12) connected to the A.C. phase sensing circuit 100 (i.e. the logic voltage from the I/O circuit C for the phase sensing port RB6), and (b) delays the firmware program stored in the microcontroller for a certain number of cycles (preferably 3 cycles) of the A.C. wave form. This delay occurs in a manner such that the exit condition of the firmware program from the DELAY FIRMWARE PROGRAM block and hence the entrance condition of the firmware program into the following discussion of TEST FOR MISWIRING.

TEST FOR MISWIRING

The firmware code associated with this flowchart block performs the following functions during one complete A.C. cycle after the delay introduced by the DELAY IN FIRMWARE PROGRAM block: (a) tests for the faulty wiring types of FIGS. 9 and 10 (i.e. conducts miswiring test "A" in FIG. 13) by reading the logic state of the miswiring test port RB7 (i.e. the logic voltage from the I/O circuit C for port RB7) connected to the miswiring sensing circuit 112, and (b) either directs the firmware program to the TURN OFF TRIAC block in response to an UNSAFE miswiring logic 1 state (faulty wiring) at the miswiring test port RB7 or permits the firmware program to continue through a series of successive positive and negative half cycle sequence loops, as described below, in response to a SAFE wiring logic 0 state (no miswire) at the miswiring test port.

The WATCHDOG TIMER block and DETERMINE POSITION IN A.C. CYCLE flow chart block is always the start of a positive half cycle of the A.C. input to the microcontroller. In other words, progression of the stored firmware program from the DELAY 3 A.C. CYCLE flow chart block to the WATCHDOG TIMER block and the DETERMINE POSITION IN A.C. CYCLE flow chart block always occurs at the start of a positive half cycle of the A.C. input to the shock prevention circuit.

TURN OFF TRIAC

In response to the detection of an unsafe wiring state in the TEST FOR MISWIRING, the firmware directs the hardware to assure that the triac cannot turn on by setting the control to the triac trigger 138 (RB1) to a low safe state and repeats that procedure continuously until the power is removed by opening the main power switch 34.

This removes power from the lamp, but the system is electrically unsafe due to a potential shock hazard that cannot be remedied by the action of this pool light safety circuit. But as the pool lamp will not illuminate, it will require the pool lamp installer or electrician to correct the wiring problem, thus, removing the potential shock hazard.

WATCHDOG TIMER

The firmware code associated with this flowchart block resets a watchdog timer in the microcontroller 70 to zero in response to expiration of the program delay in the DELAY FIRMWARE PROGRAM block. This watchdog timer is an elapsed time hardware counter which operates to restart the firmware program in response to a preset elapsed time measurement by the watchdog timer. As explained below, the firmware program of the microcontroller progresses through successive positive and negative half cycle firmware program loops of equal time duration (preferably 100 usec duration), and the watchdog timer is reset to zero at the start of each loop. The purpose of the watchdog timer is as follows. The A.C. power line to which the safety module 42 is directly connected creates a very electrically noisy environment for the microcontroller which could corrupt its firmware-directed I/O port directions and/or its program counter and cause the microcontroller to operate in a very unexpected manner. The watchdog timer monitors the duration of each program loop and restarts the firmware program in response to any loop duration other than 100 usec. In this way, the watchdog timer maintains s a continuous hardware check on the microcontroller operation which minimizes the risk of continued improper operation of the safety module after corruption of its microcontroller by the noisy A.C. electrical environment. Moreover, in order to minimize the risk of improper operation of the program counter due to the noisy electrical environment, the count of this counter is periodically set to the proper count, as described later.

DETERMINE POSITION IN A.C. CYCLE

The firmware code associated with this firmware block monitors the instantaneous position in the wave form of the A.C. input to the shock prevention circuit 47, 47a by monitoring the logic state of the microcontroller A.C. phase sensing port RB6 (pin 12) (i.e. the logic voltage from the I/O circuit C for the phase sensing port RB6) connected to the A.C. phase sensing circuit 100 and effectively directs the microcontroller firmware program through the following four program paths in succession: (a) START POSITIVE HALF CYCLE path, (b) POSITIVE HALF CYCLE SEQUENCE path, (c) START NEGATIVE HALF CYCLE path, (d) NEGATIVE HALF CYCLE SEQUENCE path. As explained below, the firmware progresses through these four program paths in succession during successive positive and negative half cycles of the A.C. power input to the shock prevention circuit 47, 47a and in a manner such that the successive progressions of the firmware through the paths effectively constitute and are referred to herein as program loops or simply loops. These loops include: (a) a first program loop (herein positive half cycle start loop) through the START POSITIVE HALF CYCLE path during each positive half cycle, (b) a following series of program loops (herein positive half cycle sequence loops) through the POSITIVE HALF CYCLE SEQUENCE path during each positive half cycle, (c) a first program loop (herein negative half cycle start loop) through the START NEGATIVE HALF CYCLE path during each negative half cycle, and (d) a following series of program loops (herein negative half cycle sequence loops) through the NEGATIVE HALF CYCLE SEQUENCE path during each negative half cycle. All of these loops have the same time duration or "loop time" which is 100 usec in the described embodiments. From this it will be understood that during operation of the pool lighting system 20, the microcontroller firmware program effectively loops continuously through the four paths of the DETERMINE POSITION IN A.C. CYCLE flowchart block in an endless series of loops of the same time duration (100 usec) including, during each positive half cycle, a single positive half cycle start loop followed by a series of positive half cycle sequence loops and during each negative half cycle a single negative half cycle start loop followed by a series of negative half cycle sequence loops.

POSITIVE HALF CYCLE START LOOP

As noted above, the firmware-defined exit condition of the firmware program from the TEST FOR MISWIRING flow chart block at the end of the one cycle delay, and hence the entrance condition of the the end of the delay, and hence the entrance condition of the firmware program into the DETERMINE POSITION IN A.C. CYCLE flow chart block, is the start of a positive cycle of the A.C. input to the shock prevention circuit 47, 47a. Accordingly, the first time the firmware program advances to the DETERMINE POSITION IN A.C. CYCLE flow chart block after closure of the main power switch 34, the firmware code associated with this block directs the program through the START POSITIVE HALF CYCLE path. Associated with this flowchart path is firmware code in the microcontroller 70 which performs the following functions:(a) initializes the microcontroller 70 to eliminate any adverse effect of the noisy A.C. electrical environment on the microcontroller 70, (b) resets the microcontroller positive half cycle time counter to zero to start a new time count of the elapsed time into the first positive half cycle which continues uninterrupted throughout the entire first positive half cycle, (c) sets into the microcontroller firmware program a positive half cycle OK bit (hereafter positive OK bit or Pos OK Bit) which conditions the firmware to turn on the TRIAC 102 which remains on for the remainder of the half cycle to electrify the pool lamp 38 at near full power, during the remainder of the positive half cycle, as described below, (d) clears from the microcontroller firmware a negative half cycle OK bit (hereafter negative OK bit or Neg OK Bit) which, when set in the firmware, conditions the firmware to turn on the TRIAC 102 for the remainder of the half cycle to electrify the pool lamp 38 at near full power during the following negative half cycle, as described later, (e) delays the firmware program a period of time such that the total elapsed time from the start of the program through the START POSITIVE HALF CYCLE path to the end of the delay equals a predetermined time which is 100 usec in the described embodiments, (f) increments the positive half cycle time counter by one count (100 usec in the described embodiments), (g) activates the firmware code associated with the DETERMINE POSITION IN A.C. CYCLE flow chart block to direct the firmware program through the POSITIVE HALF CYCLE SEQUENCE path, and (g) resets the watchdog timer to zero. In this disclosure, the above progression of the firmware program through the START POSITIVE HALF CYCLE path is referred to as a positive half cycle start loop, and the above mentioned 100 usec elapsed time of this progression is referred to as the loop time of the start loop. Resetting the WATCHDOG TIMER indicates that the firmware program is functioning properly despite the noisy electrical environment in which the microcontroller operates.

POSITIVE HALF CYCLE SEQUENCE LOOPS

The remaining firmware program loops which occur during the first positive half cycle of the A.C. input to the microcontroller 70 are positive half cycle sequence loops through the POSITIVE HALF CYCLE SEQUENCE path. At this point, it is helpful to an understanding of the invention to explain that the firmware associated with the POSITIVE HALF CYCLE SEQUENCE path includes a number of positive half cycle time count tests which are responsive to different preset elapsed time counts of the positive half cycle elapsed time counter in the microcontroller 70 and initiate certain associated firmware functions when the current count of the elapsed time counter equals the preset elapsed time counts (herein preset response time counts) of the respective time count tests. Each time count test produces a TRUE output when the current elapsed time count of the counter equals the preset response time count of the respective test and a FALSE output when the current elapsed time of the counter is greater than the preset response time count of the respective test. These time count tests are performed by firmware code associated with the flow chart blocks of FIGS. 15A–15D labeled FIRST TEST FOR Pos Tim Cnt (first test for positive half cycle time count), SECOND TEST FOR Pos Tim Cnt, and so on. The preset response time counts of these time count tests increase progressively from the first test to the last test. In the preferred inventive embodiments described herein, each time count represents 0.1 msec (milliseconds) or 100 usec (microseconds), and the positive half cycle time count tests are six in number and have the following preset response time counts, respectively: 3 count (300 usec), 6 count (600 usec), 11 count (1.1 msec), 12 count (1.2 msec), 43 count (4.3 msec), and 45 count (4.5 msec).

A TRUE logic output from any time count test initiates certain firmware functions associated with the particular test including shock risk sensing functions and/or pool lamp control functions. A FALSE logic output from any given time count test effectively by-passes its associated firmwear functions and permits the following time count test to initiate its associated firmware functions when its response time count equals the current elapsed time count of the positive half cycle time counter. During each positive half cycle of the A.C. input to the shock prevention circuit 47, 47a, the positive half cycle time count tests produce their TRUE outputs, and thereby initiate their associated firmwear functions, in the same sequential order as their preset response time counts, all in such manner that the firmware program undergoes what is effectively series of successive program loops, referred to herein as positive half cycle sequence loops, through the POSITIVE HALF CYCLE SEQUENCE path. The description of the firmware flow chart will now be continued with the foregoing in mind.

FIRST POSITIVE HALF CYCLE SEQUENCE LOOP

FIRST TEST FOR Pos Tim Cnt: (First test for positive time count) The firmware code associated with this flowchart block monitors the elapsed time count of the positive half cycle time counter in the microcontroller and produces a TRUE logic output when the elapsed time count of the positive half cycle time counter equals the preset response time count of the first test (a 3 time count or 300 usec in the described embodiments) and a FALSE logic output when the elapsed time count is greater than this first preset time count. A TRUE output from this first test for positive time count (FIRST TEST FOR Pos Tim Cnt) initiates the following firmware functions:

TEST FOR Lmp Undr Wat Bit: (Test for lamp under water bit) The firmware code associated with this flow chart block or test responds to a TRUE output from the first test for the positive time count (FIRST TEST FOR Pos Tim Cnt) by testing for the presence of a lamp under water bit (Lmp Undr Wat Bit) in the microcontroller firmware which is set into the firmware during a lamp under water test, as discussed below, when the pool water is at a normal level above the pool light 22. This lamp under water bit test produces a SAFE output when the lamp under water bit is set or present in the microcontroller firmware program (pool light is under water) and an UNSAFE output when the lamp under water bit is cleared from the program (pool light is out of the pool water).

FIRST CLEAR Pos OK Bit: (First clearing of the positive OK bit) The firmware code associated with this flowchart block clears the currently set Pos OK bit in response to an UNSAFE logic output (pool light out of water) from the lamp under water bit test (TEST FOR Lmp Undr Wat Bit) to block full power electrification of the pool lamp 38 until the bit is reset in the firmware program in the manner explained below.

TEST FOR Pol Elf Bit: (Test for electrified pool water bit) The firmware code associated with this flowchart block responds to either a SAFE or UNSAFE output from the lamp under water bit test (TEST FOR Lmp Undr Wat Bit) by testing for the presence of an electrified pool water bit (Pol Elf Bit) in the microcontroller firmware which is set into the firmware program during an electrified pool water test discussed below when the pool water is electrified above a safe electrification range (above 12 volts in the disclosed embodiments). This test produces an UNSAFE logic output when the electrified pool water bit is set (pool water electrification level is above a safe electrification range) and aSAFE logic output when the electrified pool water bit is cleared.

SECOND CLEAR Pos OK Bit: The firmware code associated with this flowchart block clears the Pos OK bit, if it was not cleared by the preceding lamp under water bit test, in response to an UNSAFE logic output (unsafe pool water electrification level) from the pool electrification bit test (TEST Pol Elf Bit), to block full power electrification of the pool lamp 38 until the bit is reset into the firmware program in the manner explained below.

FIRST DELAY TO MAKE POSITIVE HALF CYCLE LOOP TIME=100 USEC: The firmware code associated with this flowchart block performs the following functions in response to either a SAFE or UNSAFE logic output from the pool water electrification bit test (TEST Pol Elf Bit): (a) reads the positive half cycle time counter to determine the actual elapsed time of the firmware program into the first positive half cycle, and (b) delays the firmware program for a period of time which provides the first positive half cycle sequence loop with the preset loop time (100 usec) from the start of this loop to the end of the delay.

INCREMENT Pos Tim Cnt; (Increment positive half cycle time counter) The firmware code associated with this flowchart block performs the following functions in response to expiration of the first delay to make the loop time equal to 100 usec (FIRST DELAY TO MAKE POSITIVE HALF CYCLE LOOP TIME=100 USEC): (a) increments the positive half cycle time counter by 1 count (100 usec), (b) activates the firmware code associated with the DETERMINE POSITION IN A.C. flow chart block to start the second positive half cycle sequence loop through the POSITIVE HALF CYCLE SEQUENCE path, and (c) activates the firmware code associated with the WATCHDOG TIMER to reset this timer to zero. Resetting the WATCHDOG TIMER indicates that the firmware program is functioning properly despite the noisy electrical environment in which the microcontroller operates.

SECOND POSITIVE HALF CYCLE SEQUENCE LOOP

FIRST TEST FOR Pos Tim Cnt: (First test for the elapsed time count into the first positive half cycle of the A.C. input) The firmware code associated with this flowchart block produces a FALSE logic output since the count of the positive half cycle elapsed time counter at this point in the firmware program is greater than the preset response time count (3 or 300 usec) of the first positive time count test (FIRST TEST FOR Pos Tim Cnt). The FALSE output from the first time count test effectively bypasses the firmware program functions associated with the first test, whereby the microcontroller firmware program effectively advances directly to the following second test for the positive time count (SECOND TEST FOR Pos Tim Cnt) without performing the lamp under water bit test (TEST Lmp Undr Wat Bit) or the electrified pool water bit test (TEST Pol Elf Bit).

SECOND TEST FOR Pos Tim Cnt: (Second test for positive time count) The firmware code associated with this flowchart block reads the time count of the positive half cycle time counter to determine the actual total elapsed time into the first A.C. half cycle. This second test produces a TRUE logic output when the elapsed time into the first A.C. half cycle (i.e. the current count of the positive half cycle time counter) equals the preset response time count of the second time count test (a 6 time count or 600 usec in the described embodiments) and a FALSE logic output when the elapsed time count is greater than this second preset response time count.

TEST Water Leak: (Test lamp housing for water leak) The firmware code associated with this flowchart block tests for a leak in the pool lamp housing 36 in response to a TRUE logic output from the second positive time count (SECOND TEST FOR Pos Tim Cnt) by reading the logic state of the leak sensing port RA0 (pin 17) of the microcontroller 70 connected to the leak sensing circuit 108. This test produces a SAFE logic output in response to logic 1 state (no leak) of the port RA0 and an UNSAFE logic output in response to logic 0 state (leak) of the port RA0.

THIRD CLEAR Pos OK Bit: (Third clear positive OK bit) The firmware code associated with this flowchart block clears the positive OK bit (Pos OK bit), if this bit has not been previously cleared, in response to an UNSAFE logic output from the water leak test (TEST Water Leak) to block full power electrification of the pool lamp 38 until the bit is reset in the manner explained below.

SECOND DELAY TO MAKE LOOP TIME=100 usec: The firmware program code associated with this firmware flow block performs the following functions in response to either a SAFE or UNSAFE logic output from the water leak test (TEST Water Leak): (a) reads the positive half cycle time counter to determine the actual elapsed time of the firmware program into the first positive half cycle of the A.C. input to the microcontroller, and (b) delays the firmware program to make the overall time duration of the second positive half cycle sequence loop, from the start of this loop to the end of the delay, equal the preset loop time (100 usec).

INCREMENT Pos Tim Cnt; (Increment positive half cycle time counter) In the second positive half cycle sequence loop, the firmware code associated with this flowchart block performs the following functions in response to expiration of the second delay to make the loop time equal the preset loop time (100 usec): (a) increments the positive half cycle time counter by 1 count (100 usec), (b) activates the firmware code associated with the DETERMINE POSITION IN A.C. CYCLE flow chart block to start a third positive half cycle sequence loop through the POSITIVE HALF CYCLE SEQUENCE path, and (c) activates the firmware code associated with the WATCHDOG TIMER to reset the timer to zero. Resetting the watchdog timer indicates that the firmware program is continuing to function properly despite the noisy electrical environment in which the microcontroller operates.

THIRD POSITIVE HALF CYCLE SEQUENCE LOOP

FIRST AND SECOND TESTS FOR Pos Tim Cnt: (First two tests for the elapsed time count into the first positive half cycle of the A.C. wave form) In this third positive half cycle sequence loop, the firmware program code associated with the first two TESTS FOR Pos Tim Cnt flowchart blocks provide FALSE logic outputs since the overall positive elapsed time count at this point in the firmware program exceeds the highest predetermined positive time count (6 time count or 600 usec) of the first two positive time count tests. The first two time count tests thus thus by-pass their associated firmware functions, and the microcontroller firmware program effectively advances through the first two positive time count tests directly to the following third positive time count test (THIRD TEST FOR Pos Tim Cnt) without performing the lamp under water bit test (TEST Lmp Undr Wat Bit), the electrified pool water bit test (TEST Pol Elf Bit), or the water leak test (TEST Water Leak).

THIRD TEST FOR Pos Tim Cnt: The firmware code associated with this flowchart block reads the actual accumulated positive half cycle time count of the positive half cycle time counter to determine the overall elapsed time into the first A.C. half cycle and produces a TRUE logic output when the overall elapsed time into the first A.C. half cycle equals the preset response time count (11 time count or 1.1 msec in the described embodiments) of the third time count test and a FALSE logic output when the elapsed time count is greater than this preset response time count.

TEST Brkn Lmp: The firmware code associated with this flowchart block tests for a broken pool lamp 38 in response to a TRUE logic output from the third test for positive half cycle time count (THIRD TEST FOR Pos Tim Cnt) by reading the logic state of the broken lamp test port RB5 (pin 11) of the microcontroller 70 connected to the broken lamp sensing circuit 106 and produces a SAFE output in response to logic 0 state (lamp unbroken) of the port RB5 and an UNSAFE logic output in response to logic 1 state (lamp broken) of the port RB5.

FOURTH CLEAR Pos OK Bit: The firmware code associated with this flowchart block clears the Pos OK bit, if it has not been previously cleared, in response to an UNSAFE logic output from the broken lamp test (TEST Brkn Lmp) to block full power electrification of the pool lamp 38 until this bit is reset into the firmware program in the manner explained below.

THIRD DELAY TO MAKE LOOP TIME=100 usec: The firmware code associated with this flowchart block reads the positive half cycle time counter in response to either a SAFE or UNSAFE output from the broken lamp test (TEST Brkn Lmp) to determine the actual elapsed time of the firmware program into the first positive half cycle and delays the firmware program to make the overall time duration of the third positive half cycle sequence loop equal the preset loop time (100 usec).

INCREMENT Pos Tim Cnt; (Increment positive half cycle time counter) In this next positive half cycle sequence loop, the firmware code associated with this flowchart block performs the following functions in response to expiration of the third delay to make loop time equal the preset loop time (100 usec): (a) increments the positive half cycle time counter by 1 count (100 usec), (b) activates the firmware code associated with the DETERMINE POSITION IN A.C. CYCLE flow chart block to start the fourth positive half cycle sequence loop through the POSITIVE HALF CYCLE SEQUENCE path, and (c) activates the firmware code associated with the WATCHDOG TIMER to reset this timer to zero. Resetting the WATCHDOG TIMER indicates that the firmware program is continuing to function properly.

FOURTH POSITIVE HALF CYCLE SEQUENCE LOOP

FIRST THREE TESTS FOR Pos Tim Cnt: (First three tests for the elapsed time count into the first positive half cycle of the A.C. input) In this third positive half cycle sequence loop, the firmware program code associated with the first three elapsed time counts produces FALSE logic outputs since the overall positive elapsed time count at this point in the firmware program exceeds the highest predetermined positive time count (11 or 1.1 msec) of the first three positive time count tests. The first three time positive count tests thus effectively by-pass their respective associated firmware functions, and the microcontroller firmware program effectively advances through the first three positive time count tests directly to the following fourth positive time count test without performing the lamp under water bit test (TEST Lmp Undr Wat Bit), the electrified pool water bit test (TEST Pol Elf Bit), the leak test (TEST Water Leak), or the broken lamp test (TEST Brkn Lmp).

FOURTH TEST FOR Pos Tim Cnt: (Fourth test for positive time count) The firmware code associated with this flowchart block reads the current time count of the positive half cycle time counter to determine the overall elapsed time into the first A.C. half cycle and produces a TRUE logic output when the overall elapsed time into the first positive half cycle of the A.C. input to the microcontroller equals a fourth preset response time count (24 time count or 2.4 msec in the described embodiments) and a FALSE logic output when the elapsed time count is greater than this fourth preset response time count.

TEST FOR Pos OK Bit: (Test for positive OK bit) The firmware code associated with this flowchart block reads the current status of the positive OK bit in response to a TRUE logic output from the fourth test for the positive time count (FOURTH TEST FOR Pos Tim Cnt) and produces a SAFE logic output if the bit is set and an UNSAFE logic output if the bit is cleared.

TURN ON TRIAC: (Turn on the pool lamp TRIAC switch) The firmware code associated with this flowchart block responds to a SAFE logic output (Pos OK Bit is set) from the positive OK bit test (TEST FOR Pos OK Bit) by placing the lamp control port RB1 (pin 7) of the microcontroller 70 in its high voltage state for a brief period equal to the common loop time (100 usec) to turn on the pool lamp 38 at full line power for this brief period or loop time during the current positive half cycle sequence loop.

SET Neg OK Bit: The firmware code associated with this flowchart block responds to a SAFE output (Pos OK Bit is set) from the test for the OK bit (Test Pos OK Bit) by setting the negative OK bit (Neg OK Bit) into the firmware program to condition the firmware to turn on the pool lamp at full line power during the following negative half cycle of the A.C.input to the shock prevention circuit 47, 47a.

CLEAR Neg OK Bit: The firmware code associated with this flowchart block responds to an UNSAFE output from the test for the positive OK bit (TEST Pos OK Bit) by clearing the negative OK bit (Neg OK Bit) to prevent full power electrification of the pool lamp 38 until this bit is reset in the manner explained below.

FOURTH DELAY TO MAKE LOOP TIME=100 USEC: The firmware code associated with this flowchart block responds to an UNSAFE output from the positive OK bit test (TEST FOR Pos OK Bit) by reading the positive half cycle time counter to determine the actual elapsed time of the firmware program into the first positive half cycle and delays the firmware program to make the overall time duration of the fourth positive half cycle sequence loop equal the preset loop time (100 usec).

INCREMENT Pos Tim Cnt; (Increment positive half cycle time counter) In the fourth positive half cycle sequence loop, the firmware code associated with this flowchart block performs the following functions in response to either setting the negative OK bit or expiration of the fourth delay to make the overall time duration of the fourth positive half cycle sequence loop equal the preset loop time (100 usec): (a) increments the positive half cycle time counter by 1 count (100 usec), (b) activates firmware code associated with the DETERMINE POSITION IN A.C. CYCLE flow chart block start a fifth positive half cycle sequence loop through the POSITIVE HALF CYCLE SEQUENCE path, and (c) activatea the firmware code associated with the WATCHDOG TIMER to reset this timer to zero. As in the previous loops, resetting the WATCHDOG TIMER indicates that the firmware program is functioning properly, i.e. following the right path, despite the noisy electrical environment in which the microcontroller operates.

FIFTH POSITIVE HALF CYCLE SEQUENCE LOOP

FIRST FOUR TESTS FOR Pos Tim Cnt: (First four tests for the elapsed time count into the first positive half cycle), In this fifth positive half cycle sequence loop, the firmware program code associated with the first four elapsed time tests provide a FALSE logic output since the overall positive half cycle elapsed time count at this point in the firmware program exceeds the highest preset response time count (24 or 24 msec) of the first four positive half cyce elapsed time count tests. The firmware code of the first four positive time count tests thus effectively by-passes their associated firmware functions, and the microcontroller firmware program thus effectively advances directly to the following fifth positive half cycle time count test (FIFTH TEST FOR Tim Cnt) without performing the first lamp under water bit test (TEST Lmp Undr Wat Bit), the electrified pool water bit test (TEST Pol Elf bit), the water leak test (TEST Water Leak), the broken lamp test (TEST Brkn Lmp), or the test for the positive OK bit (TEST Pos OK Bit).

FIFTH TEST FOR Pos Tim Cnt: The firmware code associated with this flowchart block reads the current time count of the positive half cycle time counter to determine the overall elapsed time into the first A.C. half cycle and produces a TRUE logic output when the overall elapsed time into the first A.C. positive half cycle equals a fifth preset response time count (43 or 4.3 msec in the described embodiments) and a FALSE logic output when the elapsed time count is greater than this fifth preset response time count.

TEST FOR LMP UNDR WAT: The firmware code associated with this flow chart block tests for the pool water level in response to a TRUE output from the fifth test for the positive time count (FIFTH TEST FOR Pos Tim Cnt) by reading the logic state of the water sensing port RB4 in the case of the electro-optical water sensing circuit 110 or the output of the timing capacitor charge time comparison function in the case of the pool housing temperature sensing circuit 216 and produces an UNSAFE logic output (pool light out of water) in response to a low water level signal from the water sensing circuit 110 or a high temperature signal from the lamp housing temperature sensing circuit 216 (i.e. from the timing capacitor charge time comparison function of the microcontroller 70 which utilizes the reference charge time and temperature charge time inputs from the temperature sensing circuit 216). The lamp under water test produces a SAFE logic output (pool light under water) in response to a normal water level signal from the electro-optical water level sensing circuit 110 or a normal lamp housing temperature signal from the lamp housing temperature sensing circuit 216.

SET Lmp Undr Wat Bit: (Set lamp under water bit) The firmware code associated with this flowchart block responds to a SAFE logic output (pool lamp under water) from the lamp under water test (TEST FOR LMP UNDR WAT) by setting into the firmware program a lamp under water bit (Lmp UW Bit), referred to above in connection with the first positive half cycle sequence loop, which conditions the firmware to electrify the pool lamp 38 at full power.

CLEAR Lmp Undr Wat Bit: The firmware code associated with this flowchart block clears the lamp under water bit (Lmp UW Bit) in response to an UNSAFE logic output from the lamp under water test (TEST FOR LMP UNDR WAT) to block full power electrification of the pool lamp until this bit is reset.

FIFTH DELAY TO MAKE LOOP TIME=100 USEC: The firmware code associated with this flowchart block reads the positive half cycle time counter in response to either a SAFE or UNSAFE output from the lamp under water test (TEST FOR LMP UNDR WAT) to determine the actual elapsed time of the firmware program into the first positive half cycle and delays the firmware program to make the overall time duration of the sixth positive half cycle sequence loop equal the preset loop time (100 usec).

INCREMENT Pos Tim Cnt; (Increment positive half cycle time counter) In the fifth positive half cycle sequence loop, the firmware code associated with this flowchart block performs the following functions in response to expiration of the fifth delay: (a) increments the positive half cycle time count by 1 count (100 usec), (b) activates the firmware code associated with the DETERMINE POSITION IN A.C. CYCLE flow chart block to start the sixth positive half cycle sequence loop, and (c) activates the firmware code associated with the WATCHDOG TIMER to reset this timer to zero. As in the previous loops, resetting the watchdog timer indicates that the firmware program is continuing to function properly despite the noisy electrical envionment in which the microcontroller operates.

SIXTH POSITIVE HALF CYCLE SEQUENCE LOOP

FIRST FIVE TESTS FOR Pos Tim Cnt: (First five tests for the elapsed time count into the first positive half cycle of the A.C. waveform) In this next positive half cycle sequence loop, the firmware program code associated with the first five elapsed time count tests provide FALSE logic outputs since the overall elapsed time count into the first positive half cycle at this point in the firmware program exceeds the highest preset response time count (43 or 4.3 msec) of the first five positive time count tests. The firware programe thus effectively by-passes the firmware functions associated with the first five time count tests and advances directly to the sixth positive half cycle time count test (SIXTH TEST FOR Pos Tim Cnt) without performing the lamp under water bit test (TEST Lmp Undr Wat Bit), the electrified pool water bit test (TEST Pol Elf Bit), the water leak test (TEST Water Leak), the broken lamp test (TEST Brkn Lmp), the test for the positive OK bit (TEST Pos OK Bit), or the lamp under water test (TEST Lmp Undr Wat).

SIXTH TEST FOR Pos Tim Cnt: The firmware code associated with this flowchart block reads the current time count of the positive half cycle elapsed time counter to determine the overall elapsed time into the first A.C. half cycle and produces a TRUE logic output when the overall elapsed time into the first A.C. positive half cycle equals a sixth preset time count (45 or 4.5 msec in the described embodiments) and a FALSE logic output when the elapsed time count is greater than this sixth predetermined time count.

TEST FOR Pol Elf: (Test for electrified pool water) The firmware code associated with this flowchart block tests the electrification level, if any, of the swimming pool water in the vicinity of the pool light 22 in responsive to a TRUE output from the sixth test for positive time count (SIXTH TEST FOR Pos Tim Cnt) by reading the logic state of the pool water electrification sensing port RB5 of the microcontroller 70 connected to the pool water electrification sensing circuit 106. This pool electrification test produces a SAFE logic output in response to a logic 0 state (safe electrification level) of the port RB5 and an UNSAFE logic output in response to a logic 1 state (unsafe electrification level) of the port RB5.

SET Pol Elf Bit (Set pool electrification bit) The firmware program code associated with this flow chart block responds to an UNSAFE logic output from the pool electrification test (TEST Pol Elf) by setting into the firmware program the electrified pool bit (Po Elf Bit) referred to earlier which blocks the microcontroller from turning on the pool lamp 38 at full line voltage until this bit is cleared. The firmware responds to a SAFE logic output from the electrified pool water test (TEST FOR Pol Elf) by clearing the electrified pool bit to permit electrification of the pool lamp.

SET POSITIVE TIME COUNT=49: The firmware code associated with this flowchart block sets the positive half cycle time counter to the correct elapsed time count into the first positive half cycle at this point in the firmware program which is 49 (4.9 msec) in the case of the described embodiments. This is done to correct for any count error caused by the noisy electrical environment mentioned earlier INCREMENT Pos Tim Cnt; (Increment positive half cycle time counter) In the sixth positive half cycle sequence loop, the firmware code associated with this flowchart block increments the positive half cycle time counter by 1 count (100 usec), activates the firmware associated with the DETERMINE POSITION IN A.C. CYCLE flow chart block to start the next loop, and activates the firmware code associated with the WATCHDOG TIMER to reset this timer to zero.

The START POSITIVE HALF CYCLE loop and the POSITIVE HALF CYCLE SEQUENCE loops described to this point together constitute a first complete positive half cycle shock risk responsive lamp control sequence of the shock prevention circuit 47, 47a which consumes approximately 5 msec of the approximately total 16.66 msec time duration of the first positive half cycle of the A.C. input to the shock prevention circuit. The microcontroller firmware associated with the flow chart block DETERMINE POSITION IN A.C. CYCLE is programmed to repeat this sequence during the remainder of the first positive half cycle and then start a negative half cycle start loop through the START NEGATIVE HALF CYCLE path.

NEGATIVE HALF CYCLE

NEGATIVE HALF CYCLE START LOOP

At the conclusion of the final positive half cycle sequence loop of the microcontroller firmware program, firmware code associated with the DETERMINE POSITION IN A.C. CYCLE flow chart block directs the firmware program through the START NEGATIVE HALF CYCLE path in a start negative half cycle loop. The firmware code associated with this path is programmed to perform the following functions during this start loop: (a) initialize the microcontroller 70 to eliminate any adverse effect of the noisy A.C. electrical environment on the microcontroller 70, (b) reset a negative half cycle time counter in the microcontroller to zero to start a new count of the elapsed time into the first negative half cycle of the A.C. input to the microcontroller, (c) delay the firmware program a period of time such that the total elapsed time into the first negative half cycle from the start of the start first negative half cycle loop to the end of the delay (i.e. the loop time of the start negative half cycle loop) equals the positive half cycle loop time (100 usec) mentioned earler, (d) increment the negative time counter by one count (100 usec), (e) activate the firmwear code associated with the DETERMINE POSITION IN A.C. CYCLE flow chart block to start a first negative half cycle sequence loop through the NEGATIVE HALF CYCLE SEQUENCE path, and (f) activate the firmware code associated with the WATCHDOG TIMER to reset this timer to zero. As before, resetting the WATCHDOG TIMER indicates that the firmware program is functioning properly despite the noisy electrical environment in which the microcontroller operates.

FIRST NEGATIVE HALF CYCLE SEQUENCE LOOP

TEST FOR Neg Tim Cnt: (Test for elapsed time into the first negative half cycle) The firmware code associated with this flowchart block reads the current negative half cycle elapsed time count of the negative half cycle time counter in the microcontroller 70 and produces a TRUE logic output when the elapsed time into the first negative half cycle, i.e. the current count of the negative half cycle time counter, equals a preset negative response time count (a 12 time count or 1.2 msec in the described embodiments) and a FALSE logic output when the elapsed time count is greater than this preset negative response time count.

TEST FOR Neg OK Bit: (Test for negative OK bit) The firmware code associated with this flowchart block reads the current status of the negative OK bit, discussed earlier, in response to a TRUE output from the test for the negative time count (TEST FOR Neg Tim Cnt) to determine whether this bit is currently set in or cleared from the microcontroller firmware program and produces a SAFE output if the bit is set (no shock risk conditions exist) and an UNSAFE output if the bit is cleared (shock risk conditions exist).

TURN ON TRIAC: (Turn on the pool lamp TRIAC switch) The firmware code associated with this flowchart block responds to a SAFE logic output (negative OK bit is set) from the negative OK bit test (TEST FOR Neg OK Bit) by placing the lamp control port RB1 (pin 7) of the microcontroller 70 in its high voltage state for a brief period equal to the loop time (100 usec) of the positive and negative half cycle loops to turn on the TRIAC 120 and thereby turn on the pool lamp 38 at full power for this loop time.

CLEAR Neg OK Bit: (Clear the negative OK bit) The firmware code associated with this flowchart block clears the negative OK bit at the end of the 100 usec ON time of the pool lamp 38 to block electrification of the lamp at full power until the negative OK bit is reset during the following positive half cycle of the A.C. input to the shock prevention system 47, 47a.

FIRST DELAY TO MAKE NEGATIVE HALF CYCLE LOOP TIME=100 USEC: The firmware code associated with this flowchart block performs the following functions in response to an UNSAFE logic output from the negative OK bit test (TEST Neg OK Bit): (a) reads the negative half cycle time counter to determine the current elapsed time of the firmware program into the first negative half cycle, and (b) delays the firmware program to make the overall time duration of the negative half cycle sequence loop equal the preset loop time (100 usec).

INCREMENT Neg Tim Cnt; (Increment negative half cycle time counter) The firmware code associated with this flowchart block performs the following functions in response to either clearing the negative OK bit or expiration of the delay (FIRST DELAY TO MAKE LOOP TIME=100 USEC) following the negative OK bit test (TEST Neg OK Bit): (a) increments the negative half cycle time counter by 1 count (100 usec), (b) activates the firmware code associated with the DETERMINE POSITION IN A.C. CYCLE flow chart block to start a second negative half cycle sequence loop through the NEGATIVE HALF CYCLE SEQUENCE path, (c) activates the firmware code associated with the WATCHDOG TIMER to reset this timer to zero As in the previous loops, resetting the WATCHDOG TIMER indicates that the firmware program is functioning properly despite the noisy electrical environment in which the microcontroller operates.

The START NEGATIVE HALF CYCLE loop and the NEGATIVE HALF CYCLE SEQUECE loop described above together constitute a first complete negative half cycle shock risk responsive pool lamp control sequence of the shock prevention circuit 47, 47a which consumes approximately 1.4 msec of the approximately total 16.66 msec time duration of the first negative half cycle of the A.C. input to the shock prevention circuit. The microcontroller firmware associated with the flow chart block DETERMINE POSITION IN A.C. CYCLE is programmed to repeat this negative sequence during the remainder of the first negative half cycle.

The first positive half cycle shock risk responsive pool lamp control sequence and the first negative half cycle shock risk responsive pool lamp control sequence described to this point together constitute a first full cycle shock risk responsive and pool lamp control sequence of the firmware program embodied in the microcontroller 70. The microcontroller firmware is programmed to repeat this full cycle sequence as long as the pool lighting system 20 remains electrified.

It is evident from the foregoing description that the operation of the present shock prevention circuits 47, 47a of the invention may be summarized as follows. The shock prevention circuits are activated by closing the main switch 34 of the pool lighting system 20. When thus activated, the circuits undergo repeated full cycle shock risk responsive pool light control sequences. During each full cycle sequence, the following firmware functions are performed in each circuit:

DURING EACH POSITIVE HALF CYCLE OF THE A.C. INPUT TO THE CIRCUIT (a) The micontroller in the shock prevention circuit is initialized, a faulty wiring test is conducted to block electrification of the shock prevention circuit if high voltage and A.C. common connections are reversed in the lighting system and a watchdog timer is reset and started to monitor the overall operation of the circuit.

(b) A positive OK bit (Pos OK Bit) is initially set in the microcontroller firmware program to condition the circuit to electrify the pool lamp 38, and a negative OK bit (Neg OK Bit) is initially cleared from the program to block electrification of the pool lamp during the following negative half cycle of the A.C. input to the circuit.

(c) Shock risk detection tests are conducted in sequence to detect any electrical shock risk conditions of concern (pool light under water/high lamp housing temperature electrified pool water, water leak in lamp housing, broken lamp).

(d) The Pos OK Bit is cleared in response to the existence of any shock risk conditions to block electrification of the pool lamp until the Pos OK Bit is reset during a susequent positive half cycle of the A.C. input, —or—the pool lamp is electrifed at full line voltage for a brief period of time (100 usec) during the positive half cycle if the Pos OK Bit remains set.

(e) The Neg OK Bit is either set in the absence of any shock risk conditions to permit electrification of the pool lamp in the following negative half cycle of the A.C. input to the shock prevention circuit or cleared to block electrification of the pool lamp in the following negative half cycle.

DURING EACH NEGATIVE HALF CYCLE OF THE A.C. INPUT TO THE CIRCUIT (a) The pool lamp is electrified at full line voltage if the Neg OK Bit remains set, and the Neg OK Bit is then cleared to block subsequent electrification of the pool lamp until this bit is reset in the following positive half cycle of the A.C. input.

We claim:

1. In combination:

an electrical device to be electrified at a certain full voltage and operated in an environment in which said device, when electrified at said full voltage, may present at least one hazardous electrical shock risk condition, and an electrical shock prevention system for controlling electrical power to said device including electrical power input means for receiving electrical power from an electrical power source, power output means connected to said device, shock risk sensing means mounted within a housing containing said electrical device for detecting each shock risk condition and providing an UNSAFE signal when the respective shock risk condition exists and a SAFE signal when the respective shock risk condition does not exist, electrical switch means having a conductive state in which the switch means connects said input means to said output means for electrification of said device at said full voltage by electrical power to said input means and a non-conductive state in which the switch means blocks electrification of said device at said full voltage by electrical power to said input means, and switch control means responsive to said signals for placing said switch means in its conductive state in the absence of an UNSAFE signal and placing said switch means in its non-conductive state in response to an UNSAFE signal.

2. The combination of claim 1 wherein:

said device, when electrified at said full voltage, may present a plurality of hazardous electrical shock risk conditions, said shock risk sensing means comprises a plurality of electrical shock risk sensing circuits for detecting several different shock risk conditions, respectively, whereby each shock risk sensing circuit is associated with a particular shock risk condition, each sensing circuit provides an UNSAFE signal when the shock risk condition associated with the respective sensing circuit exists, and each sensing circuit provides a SAFE signal when the shock risk condition associated with the respective sensing circuit does not exist, and said switch control means places said switch means in its conductive state in response to SAFE signals from all of said sensing circuits, and said switch control means places said switch means in its non-conductive state in response to an UNSAFE signal from at least one of said sensing circuits.

3. The combination of claim 1 wherein:

said electrical device is a swimming pool light to operate submerged in pool water and including a normally water tight lamp housing, and an electrical lamp within said lamp housing, said shock prevention system includes a high voltage lead and a common lead for connection to said power source, and an electrical ground, each shock risk condition comprises one of the following shock risk conditions: (a) electrical potential of said common lead relative to ground exceeding a certain safe potential range, (b) broken lamp, (c) lamp housing temperature exceeding a certain safe temperature range, (d) exposure of the lamp housing to air, (e) water in the lamp housing, (f) electrification of the swimming pool water exceeding a certain safe electrification range.

4. The combination of claim 2 wherein:

said electrical device is a swimming pool light to operate submerged in pool water and including a normally water tight lamp housing, and an electrical lamp within said lamp housing, said shock prevention system includes a high voltage lead and a common lead for connection to said power source, and an electrical ground, said shock risk conditions comprise certain of the following shock risk conditions: (a) electrical potential of said common lead relative to ground exceeding a certain safe potential range, (b) broken lamp, (c) lamp housing temperature exceeding a certain safe temperature range, (d) exposure of the lamp housing to air, (e) water in the lamp housing, (f) electrification of the swimming pool water exceeding a certain safe electrification range.

5. The combination of claim 1 wherein:

said shock prevention system includes a high voltage lead and a common lead for connection to said power source, an electrical ground, and a sealed safety module including said leads, said ground, said input means, said output means, said switch means, and said switch control means, said input means includes input terminals connected to said leads and accessible externally of said safety module for connection to said power source, and said output means includes output terminals accessible externally of said safety module and connected to said electrical device, and said shock risk sensing means comprises an external shock risk sensing circuit located externally of said safety module for detecting each shock risk condition and having a first state when the respective shock risk condition exists and a second state when the respective shock risk condition does not exist, and internal circuit means within said module connected to said external circuit means for producing said UNSAFE signal in response to said first state and producing said SAFE signal in response to said second state.

6. The combination of claim 2 wherein:

said shock prevention system includes a high voltage lead and a common lead for connection to said power source, an electrical ground, and a sealed safety module including said leads, said ground, said input means, said output means, said switch means, and said switch control means, said input means includes input terminals connected to said leads and accessible externally of said safety module for connection to said power source, and said output means includes output terminals accessible externally of said safety module and connected to said device, and each shock risk sensing circuit includes an external circuit located externally of said safety module for detecting the associated shock risk condition and having a first state when the associated shock risk condition exists and a second state when the associated shock risk condition does not exist, and internal circuit means within said module connected to said external circuit for producing said UNSAFE signal in response to said first state and producing said SAFE signal in response to said second state.

7. The combination of claim 5 wherein:

said electrical device is a swimming pool light to operate submerged in pool water and including a normally water tight lamp housing, and an electrical lamp within said lamp housing, said shock risk condition comprises one of the following shock risk conditions: (a) electrical potential of said common lead relative to ground exceeding a certain safe potential range, (b) broken lamp, (c) lamp housing temperature exceeding a certain safe temperature range, (d) exposure of the lamp housing to air, (e) water in the lamp housing, (f) electrification of the swimming pool water exceeding a certain safe electrification range.

8. The combination of claim 6 wherein:

said electrical device is a swimming pool light to operate submerged in pool water and including a normally water tight lamp housing, and an electrical lamp within said lamp housing, and said shock risk conditions comprise certain of the following shock risk conditions: (a) electrical potential of said common lead relative to ground exceeding a certain safe potential range, (b) broken lamp, (c) lamp housing temperature exceeding a certain safe temperature range, (d) exposure of the lamp housing to air, (e) water in the lamp housing, (f) electrification of the swimming pool water exceeding a certain safe electrification range.

9. The combination of claim 1 wherein:

said electrical device is a swimming pool light to operate submerged in the pool water and including a normally water tight lamp housing, and an electrical lamp within said lamp housing, said shock prevention system includes a high voltage lead and a common lead for connection to said power source, and an electrical ground, and said shock risk sensing means comprises at least one of the following sensing means: (a) faulty wiring sensing means including means for detecting electrical potential of said common lead relative to ground, and means for producing said SAFE signal when said electrical potential of said common lead relative to ground is within a certain safe potential range and producing said UNSAFE signal when said electrical potential of said common lead relative to ground exceeds said safe potential range, (b) broken lamp sensing means including means for briefly electrifying said lamp at a reduced voltage less than said full voltage, means for sensing current flow through said lamp while the lamp is electrified at said reduced voltage, and means for producing said SAFE signal in response to current flow through the lamp while the lamp is electrified at said reduced voltage and producing said UNSAFE signal in the absence of current flow through said lamp while the lamp is electrified at said reduced voltage, (c) lamp housing temperature sensing means including means for sensing the lamp housing temperature, and means for producing said SAFE signal when said housing temperature is within a certain safe temperature range and producing said UNSAFE signal when said lamp housing temperature exceeds said safe temperature range, (d) submerged lamp housing sensing means including optical means mounted on and projecting above said lamp housing and having a first optical characteristic when said optical means is submerged in water and a second optical characteristic when said optical means is exposed to air, and means responsive to said optical characteristic for producing said SAFE signal in response to said first optical characteristic and said UNSAFE signal in response to said second optical characteristic, (e) lamp housing leak sensing means for detecting water in said lamp housing, and means for producing said SAFE signal in the absence of water in the housing and producing said UNSAFE signal in response to water in the lamp housing, (f) pool water electrification sensing means including means for detecting an electrical potential of said pool water relative to ground, and means for producing said SAFE signal when said potential of said pool water relative to ground is within a certain safe potential range and producing said UNSAFE signal when said potential of said pool water relative to ground is above said last mentioned safe potential range range.

10. The combination of claim 9 wherein:

said lamp housing leak sensing means for detecting water in said lamp housing comprises two electrodes located within a lower portion of said lamp housing in close proximity to one another such that any water in the housing completes an electrical circuit between said electrodes, means for applying a second reduced voltage less than said full voltage to said electrodes, and means for detecting electrical current flow between the electrodes while said second reduced voltage is applied to said electrodes, and said means for detecting an electrical potential of the swimming pool water relative to ground includes a pool water electrode to be placed in contact with the pool water, and means for sensing an electrical postential between said pool water electrode and ground.

11. The combination of claim 2 wherein:

said electrical device is a swimming pool light to operate submerged in the pool water and including a normally water tight lamp housing, and an electrical lamp within said lamp housing, said shock prevention system includes a high voltage lead and a common lead for connection to said power source, and an electrical ground, and said shock risk sensing circuits comprise certain of the following sensing circuits: (a) a faulty wiring sensing circuit including means for detecting an electrical potential of said common lead relative to ground, and means for producing said SAFE signal when said electrical potential of said common lead relative to ground is within a certain safe potential range and producing said UNSAFE signal when said electrical potential of said common lead relative to ground exceeds said safe potential range, (b) a broken lamp sensing circuit including means for briefly electrifying said lamp at a reduced voltage less than said full voltage, means for sensing current flow through said lamp while the lamp is electrified at said reduced voltage, and means for producing said SAFE signal in response to current flow through the lamp while the lamp is electrified at said reduced voltage and producing said UNSAFE signal in the absence of current flow through said lamp while the lamp is electrified at said reduced voltage, (c) a lamp housing temperature sensing circuit including means for sensing the lamp housing temperature, and means for producing said SAFE signal when said housing temperature is within a certain safe temperature range and producing said UNSAFE signal when said lamp housing temperature exceeds said safe temperature range, (d) a submerged lamp housing sensing circuit including optical means mounted on and projecting above said lamp housing and having a first optical characteristic when said optical means is submerged in water and a second optical characteristic when said optical means is exposed to air, and means responsive to said optical characteristic for producing said SAFE signal in response to said first optical characteristic and said UNSAFE signal in response to said second optical characteristic, (e) a lamp housing leak sensing circuit for detecting water in said lamp housing, and means for producing said SAFE signal in the absence of water in the housing and producing said UNSAFE signal in response to water in the lamp housing, (f) a pool water electrification sensing circuit including means for detecting an electrical potential of said pool water relative to ground, and means for producing said SAFE signal when said potential of said pool water relative to ground is within a certain safe potential range and producing said UNSAFE signal when said potential of said pool water relative to ground is above said last mentioned safe potential range range.

12. The combination of claim 11 wherein:

said lamp housing leak sensing means for detecting water in said lamp housing comprises two electrodes located within a lower portion of said lamp housing in close proximity to one another such that any water in the housing completes an electrical circuit between said electrodes, means for applying a second reduced voltage less than said full voltage to said electrodes, and means for detecting electrical current flow between the electrodes while said second reduced voltage is applied to said electrodes, and said means for detecting an electrical potential of the swimming pool water relative to ground includes a pool water electrode to be placed in contact with the pool water, and means for sensing an electrical postential between said pool water electrode and ground.

13. The combination of claim 1 wherein:

said shock risk sensing means comprises means for detecting each shock risk condition during periodic shock risk sensing cycles, and said switch control means includes means for placing said switch means in its conductive state for a brief period of time during each cycle in which only a SAFE signal is produced and placing said switch means in its non-conductive state during each cycle in which an UNSAFE signal is produced.

14. The combination of claim 2 wherein:

said shock risk sensing means comprises means for (a) activating said shock risk detection circuits in a predetermined sequence during periodic shock risk sensing cycles in such manner as to detect said certain shock risk conditions in a predetermined sequence during each periodic shock risk sensing cycle and (b) producing an UNSAFE signal in response to each detection of a shock risk condition during each cycle and a SAFE signal in response to each absence of a shock risk condition during each cycle, and said switch control means includes means for placing said switch means in its conductive state for a brief period of time in each cycle in which only SAFE signals are produced and placing said switch means in its non-conductive state in each cycle in which at least one UNSAFE signal is produced.

15. The combination of claim 2 wherein:

said electrical device is a swimming pool light to operate submerged in pool water and including a normally water tight lamp housing, and an electrical lamp within said lamp housing, said shock prevention system includes a high voltage lead and a common lead for connection to said power source, and an electrical ground, said shock risk conditions comprise certain of the following shock risk conditions: (a) electrical potential of said common lead relative to ground exceeding a certain safe potential range, (b) broken lamp, (c) lamp housing temperature exceeding a certain safe temperature range, (d) exposure of the lamp housing to air, (e) water in the lamp housing, (f) electrification of the swimming pool water exceeding a certain safe electrification range, said shock risk sensing means comprise means for activating said shock risk sensing circuits in a predetermined sequence during periodic shock risk sensing cycles to detect said certain shock risk conditions and produce an UNSAFE signal in response to each detection of a shock risk condition during each cycle and produce a SAFE signal in response to each absence of a shock risk condition during each cycle, and said switch control means includes means for placing said switch means in its conductive state for a brief period of time during each cycle in which only SAFE signals are produced and placing said switch means in its non-conductive state during each cycle in which at least one UNSAFE signal is produced.

16. The combination of claim 2 wherein:

said electrical device is a swimming pool light to operate submerged in pool water and including a normally water tight lamp housing, and an electrical lamp within said lamp housing, said shock prevention system includes a high voltage lead and a common lead for connection to said power source, and an electrical ground, said shock risk conditions comprise certain of the following shock risk conditions: (a) electrical potential of said common lead relative to ground exceeding a certain safe potential range, (b) broken lamp, (c) lamp housing temperature exceeding a certain safe temperature range, (d) exposure of the lamp housing to air, (e) water in the lamp housing, (f) electrification of the swimming pool water exceeding a certain safe electrification range, said shock risk sensing means comprises a microcontroller including an output port conncected to said switch control mean, input ports each having an input circuit having a SAFE logic state and an UNSAFE logic state, and firmware for monitoring the logic states of said input circuits in a predetermined sequence during periodic shock risk sensing cycles and operating said switch control means to (a) place said switch means in its conductive state for a brief period of time and thereby electrify said pool light at said full voltage for said brief period of time during each cycle in which all of said input circuits are in their SAFE logic states and (b) place said switch means in its non-conductive state to prevent electrification of said pool light at said full voltage during any cycle in which at least one of said input circuits is in its UNSAFE logic state, and each shock risk sensing circuit is connected to a microcontroller input circuit for placing the respective input circuit in its UNSAFE logic state in response to detection of the shock risk condition associated with the respective sensing circuit and placing the respective input circuit in its SAFE logic state in the absence of the shock risk condition associated with the respective sensing circuit.

17. The combination according to claim 16 wherein:

said shock prevention system comprises a sealed safety module including said leads, ground, microcontroller, input means, output means, switch means, and switch control means, said module includes input terminals connected to said leads and accessible externally of said module for connection to said power source and output terminals accessible externally of the module and connected to said lamp.

18. The combination of claim 17 wherein:

said safety module is mounted within said lamp housing.

19. The combination of claim 5 wherein:

said safety module is mounted within said lamp housing.

20. The combination of claim 6 wherein:

said safety module is mounted within said lamp housing.

21. An electrical shock prevention system for use with an electrical device comprising a lamp within a sealed housing, said electrical device to be electrified at a certain full voltage and operated in an environment in which said device, when electrified at said full voltage, may present at least one hazardous electrical shock risk condition, said shock prevention system comprising:

electrical input means for receiving electrical power from an electrical power source, electrical output means for connection to said device, shock risk sensing means mounted in said housing for detecting each shock risk condition and providing an UNSAFE signal when the respective shock risk condition exists and a SAFE signal when the respective shock risk condition does not exist, electrical switch means having a conductive state in which said switch means electrically connects said input means to said output means for electrification of said output means at said full voltage by electrical power to said input means, and said switch means having a non-conductive state in which said switch means blocks electrification of said output means at said full voltage by electrical power to said input means, and switch control means responsive to said signals for placing said switch means in said conductive state in the absence of an UNSAFE signal and placing said switch means in its non-conductive state in response to an UNSAFE signal.

22. The electrical shock prevention system of claim 21 wherein:

said shock risk sensing means includes electrical shock risk sensing circuits for detecting several different electrical shock risk conditions, respectively, whereby each shock risk sensing circuit is associated with a particular shock risk condition, each sensing circuit provides an UNSAFE signal when the shock risk condition associated with the respective sensing circuit exists, and each sensing circuit provides a SAFE signal when the shock risk condition associated with the respective sensing circuit does not exist, and said switch control means places said switch means in said conductive state to electrically connect said input means to said output means for electrification of said device at said full voltage by electrical power to said input means in response to SAFE signals from all of said sensing circuits, and switch control means places said switch means in its non-conductive state to block electrification of said output means at said full voltage by electrical power to said input means in response to an UNSAFE signal from at least one of said sensing circuits.

23. The shock prevention system of claim 21 wherein:

the electrical device with which said shock prevention system is intended to be used is a swimming pool light to be operated submerged in pool water and including a normally water tight lamp housing containing an electrical lamp, said shock prevention system includes a high voltage lead and a common lead for connection to said power source, and an electrical ground, said output means includes a pair of output leads for connection to said lamp, and said shock risk sensing means comprises at least one of the following sensing means: (a) faulty wiring sensing means including means for sensing an electrical potential between said common lead and ground, and means for producing a SAFE signal when said potential is within a certain safe potential range and an UNSAFE signal when said potential exceeds said safe potential range, (b) broken lamp sensing means including means for applying a first reduced voltage less than said full voltage to said output leads, means for sensing current flow through said output leads when said reduced voltage is applied, and means for producing a SAFE signal in response to current flow through said output leads when said reduced voltage is applied and an UNSAFE signal in the absence of current flow through said output leads when said reduced voltage is applied, (c) lamp housing temperature sensing means including a temperature sensor, and means for producing a SAFE signal in response to a sensor temperature within a certain safe temperature range and an UNSAFE signal in response to a sensor temperature exceeding said safe temperature range, (d) submerged lamp housing sensing means including an optical sensor having a first optical characteristic when said optical sensor is submerged in water and a second optical characteristic when said optical sensor is exposed to air, and means responsive to said optical characteristics for producing a SAFE signal in response to said first optical characteristic and an UNSAFE signal in response to said second optical characteristic, (e) lamp housing leak sensing means including a pair of electrodes, means for applying a second reduced voltage less than said full voltage to said pair of electrodes, means for sensing current flow between said pair of electrodes when said second reduced voltage is applied, and means for producing an UNSAFE signal in response to current flow between said pair of electrodes when said second reduced voltage is applied and a SAFE signal in the absence of current flow between said pair of electrodes when said second reduced voltage is applied, (f) pool water electrification sensing means including a pool water electrode, means for sensing an electrical potential between said pool water electrode and ground, and means for producing a SAFE signal when said last mentioned potential is within a certain second safe potential range and an UNSAFE signal when said last mentioned potential exceeds said second safe potential range.

24. The shock prevention system of claim 22 wherein:

said electrical device with which said shock prevention system is intended to be used is a swimming pool light to be operated submerged in pool water and including a normally water tight lamp housing containing a lamp, said shock prevention system includes a high voltage lead and a common lead for connection to said power source, and an electrical ground, said output means includes a pair of output leads for connection to said lamp, and said shock risk sensing circuits comprise certain of the following sensing circuits: (a) a faulty wiring sensing circuit including means for sensing an electrical potential between said common lead and ground, and means for producing a SAFE signal when said potential is within a certain safe potential range and an UNSAFE signal when said potential exceeds said safe potential range, (b) a broken lamp sensing circuit including means for applying a reduced voltage less than said full voltage to said output leads, means for sensing electrical current flow through said output leads when said reduced voltage is applied, and means for producing a SAFE signal in response to current flow through said output leads when said reduced voltage is applied and an UNSAFE signal in the absence of current flow through said output leads when said reduced voltage is applied, (c) a lamp housing temperature sensing circuit including a temperature sensor, and means for producing a SAFE signal in response to a sensor temperature within a certain safe temperature range and an UNSAFE signal in response to a sensor temperature exceeding said safe temperature range, (d) a submerged lamp housing sensing circuit including an optical sensor having a first optical characteristic when said optical sensor is submerged in water and a second optical sensor when said optical sensor is exposed to air, and means responsive to said optical characteristics for producing a SAFE signal in response to said first optical characteristic and an UNSAFE signal in response to said second optical characteristic, (e) a lamp housing leak sensing circuit including a pair of electrodes, means for applying a second reduced voltage less than said full voltage to said pair of electrodes, means for sensing current flow between said pair of electrodes when said second reduced voltage is applied, and means for producing an UNSAFE signal in response to current flow between said pair of electrodes when said second reduced voltage is applied and a SAFE signal in the absence of current flow between said pair of electrodes when said second reduced voltage is applied, (f) a pool water electrification sensing circuit including a pool water electrode, means for sensing an electrical potential between said pool water electrode and ground, and means for producing a SAFE signal when said last mentioned potential is within a certain safe potential range and an UNSAFE signal when said last mentioned potential exceeds said last mentioned safe potential range.

25. The shock prevention system of claim 21 wherein:

said shock prevention system includes a high voltage lead, a common lead, an electrical ground, and a sealed safety module including said leads, said ground, said input means, said output means, said switch means, and said switch control means, said input means includes input terminals connected to said leads and ground and accessible externally of said safety module for connection to said power source, and said output means includes output terminals accessible externally of said safety module for connection to said electrical device, and said shock risk sensing means comprises an external shock risk sensing circuit located externally of said safety module for detecting each shock risk condition and having a first state when the respective shock risk condition exists and a second state when the respective shock risk condition does not exist, and internal circuit means within said module connected to said external circuit for producing said UNSAFE signal in response to said first state and producing said SAFE signal in response to said second state.

26. The shock prevention system of claim 22 wherein:

said shock prevention system includes a high voltage lead, a common lead, an electrical ground, and a sealed safety module including said leads, said ground, said input means, said output means, said switch means, and said switch control means, said input means includes input terminals connected to said leads and ground and accessible externally of said safety module for connection to said power source, and said output means includes output terminals accessible externally of said safety module for connection to said device, and each shock risk sensing circuit includes an external circuit located externally of said safety module for detecting the shock risk condition associated with the respective shock risk sensing circuit and having a first state when the associated shock risk condition exists and a second state when the associated shock risk condition does not exist, and internal circuit means within said module connected to said external circuit for producing said UNSAFE signal in response to said first state and producing said SAFE signal in response to said second state.

27. The shock risk prevention system of claim 25 wherein:

said electrical device with which said shock prevention system is intended to be used is a swimming pool light to be operated submerged in pool water and including a normally water tight lamp housing containing an electrical lamp, and said shock risk sensing means comprise at least one of the following sensing means: (a) faulty wiring sensing means including means for sensing an electrical potential between said common lead and ground, and means for producing a SAFE signal when said potential is within a certain safe potential range and an UNSAFE signal when said potential exceeds said certain safe potential range, (b) broken lamp sensing means including means for applying a reduced voltage less than said full voltage to said output leads, means for sensing electrical current flow through said output leads, and means for producing a SAFE signal in response to current flow through said output leads and an UNSAFE signal in the absence of current flow through said output leads, (c) lamp housing temperature sensing means including a temperature sensor, and means for producing a SAFE signal in response to exposure of said temperature sensor to a temperature within a certain safe temperature range and an UNSAFE signal in response to exposure of said temperature sensor to a temperature exceeding said safe temperature range, (d) submerged lamp housing sensing means including an optical sensor, and means for producing a SAFE signal when said optical sensor is submerged in water and an UNSAFE signal when said optical sensor is exposed to air, (e) lamp housing leak sensing means including a pair of electrodes, means for applying a reduced voltage less than said full voltage to said pair of electrodes, means for sensing current flow between said pair of electrodes, and means for producing an UNSAFE signal in response to current flow between said pair of electrodes and a SAFE signal in the absence of current flow between said pair of electrodes, (f) pool water electrification sensing means including a pool water electrode, means for sensing an electrical potential between said pool water electrode and ground, and means for producing a SAFE signal when said last mentioned potential is within a certain safe potential range and an UNSAFE signal when said last mentioned potential exceeds said last mentioned safe potential range.

28. The shock risk prevention system of claim 26 wherein:

said electrical device with which said shock prevention system is intended to be used is a swimming pool light to be operated submerged in pool water and including a normally water tight lamp housing containing an electrical lamp, and said shock risk sensing circuits comprises certain of the following sensing circuits: (a) a faulty wiring sensing circuit including means for sensing an electrical potential between said common lead and ground, and means for producing a SAFE signal when said potential is than a certain safe potential range and an UNSAFE signal when said potential exceeds said safe potential range, (b) a broken lamp sensing circuit including means for applying a reduced voltage less than said full voltage to said output leads, means for sensing electrical current flow through said output leads while said reduced voltage is applied, and means for producing a SAFE signal in response to current flow through said output leads while said reduced voltage is applied and an UNSAFE signal in the absence of current flow through said output leads while said reduced voltage is applied, (c) a lamp housing temperature sensing circuit including a temperature sensor, and means for producing a SAFE signal in response to a sensor temperature within a certain safe temperature range and an UNSAFE signal in response to a sensor temperature exceeding said safe temperature range, (d) a submerged lamp housing sensing circuit including an optical sensor having a first optical characteristic when said optical sensor is submerged in water and a second optical characteristic when said optical sensor is exposed to air, and means responsive to said characteristics for producing a SAFE signal in response to said first characteristic and an UNSAFE signal in response to said second characteristic, (e) a lamp housing leak sensing circuit including a pair of electrodes, means for applying a second reduced voltage less than said full voltage to said pair of electrodes, means for sensing current flow between said pair of electrodes while said second reduced voltage is applied, and means for producing an UNSAFE signal in response to current flow between said pair of electrodes while said second reduced voltage is applied and a SAFE signal in the absence of current flow between said pair of electrodes while said second reduced voltage is applied, (f) a pool water electrification sensing means including a pool water electrode, means for sensing an electrical potential between said pool water electrode and ground, and means for producing a SAFE signal when said last mentioned potential is within a certain safe potential range and an UNSAFE signal when said last mentioned potential exceeds said last mentioned safe potential range.

29. The shock prevention system of claim 27 wherein:

said electrical device with which said shock prevention system is intended to be used is a swimming pool light to be operated submerged in pool water and including a normally water tight lamp housing containing an electrical lamp, said shock prevention system includes a high voltage lead and a common lead for connection to said power source, and an electrical ground, said shock risk sensing means comprises faulty wiring sensing means including means for sensing an electrical potential between said common lead and ground, and means for producing said SAFE signal when said electrical potential is within a certain safe range and producing said UNSAFE signal when said electrical potential exceeds said safe range.

30. The shock prevention system of claim 21 wherein:

said shock risk sensing means comprises means for detecting each shock risk condition during periodic shock risk sensing cycles, and said switch control means includes means for placing said switch means in its conductive state for a brief period of time during each cycle in which only a SAFE signal is produced and placing said switch means in its non-conductive state during each cycle in which an UNSAFE signal is produced.

31. The shock prevention system of claim 22 wherein:

said shock risk sensing means comprises means for (a) activating said sensing circuits in a predetermined sequence during periodic shock risk sensing cycles in such manner as to detect said certain shock risk conditions in a predetermined sequence during each periodic shock risk sensing cycle and (b) producing an UNSAFE signal in response to each detection of a shock risk condition during each cycle and a SAFE signal in the absence of each shock risk condition during each cycle, and said switch control means includes means for placing said switch means in its conductive state for a brief period of time during each cycle in which only SAFE signals are produced and placing said switch means in its non-conductive state during each cycle in which at least one UNSAFE signal is produced.

32. The shock prevention system of claim 22 wherein:

said electrical device is a swimming pool light to operate submerged in pool water and including a normally water tight lamp housing, and an electrical lamp within said lamp housing, said shock prevention system includes a high voltage lead and a common lead for connection to said power source, and an electrical ground, said shock risk sensing circuits comprises certain of the following sensing circuits: (a) a faulty wiring sensing circuit including means for sensing an electrical potential between said common lead and ground, and means for producing a SAFE signal when said potential is than a certain safe potential range and an UNSAFE signal when said potential exceeds said safe potential range, (b) a broken lamp sensing circuit including means for applying a reduced voltage less than said full voltage to said output leads, means for sensing electrical current flow through said output leads while said reduced voltage is applied, and means for producing a SAFE signal in response to current flow through said output leads while said reduced voltage is applied and an UNSAFE signal in the absence of current flow through said output leads while said reduced voltage is applied, (c) a lamp housing temperature sensing circuit including a temperature sensor, and means for producing a SAFE signal in response to a sensor temperature within a certain safe temperature range and an UNSAFE signal in response to a sensor temperature exceeding said safe temperature range, (d) a submerged lamp housing sensing circuit including an optical sensor having a first optical characteristic when said optical sensor is submerged in water and a second optical characteristic when said optical sensor is exposed to air, and means responsive to said characteristics for producing a SAFE signal in response to said first characteristic and an UNSAFE signal in response to said second characteristic, (e) a lamp housing leak sensing circuit including a pair of electrodes, means for applying a second reduced voltage less than said full voltage to said pair of electrodes, means for sensing current flow between said pair of electrodes while said second reduced voltage is applied, and means for producing an UNSAFE signal in response to current flow between said pair of electrodes while said second reduced voltage is applied and a SAFE signal in the absence of current flow between said pair of electrodes while said second reduced voltage is applied, (f) a pool water electrification sensing means including a pool water electrode, means for sensing an electrical potential between said pool water electrode and ground, and means for producing a SAFE signal when said last mentioned potential is within a certain safe potential range and an UNSAFE signal when said last mentioned potential exceeds said last mentioned safe potential range, said shock risk sensing means comprise means for (a) activating said shock risk sensing circuits in a predetermined sequence during periodic shock risk sensing cycles to detect said certain shock risk conditions in a predetermined sequence during each cycle and (b) producing an UNSAFE signal in response to each detection of a shock risk condition during each cycle and a SAFE signal in response to each absence of a shock risk condition during each cycle, and said switch control means includes means for placing said switch means in its conductive state for a brief period of time during each cycle in which only SAFE signals are produced and placing said switch means in its non-conductive state during each cycle in which at least one UNSAFE signal is produced.

33. The shock prevention system of claim 22 wherein:

said electrical device is a swimming pool light to operate submerged in pool water and including a normally water tight lamp housing, and an electrical lamp within said lamp housing, said shock prevention system includes a high voltage lead and a common lead for connection to said power source, and an electrical ground, said shock risk sensing circuits comprises certain of the following sensing circuits: (a) a faulty wiring sensing circuit including means for sensing an electrical potential between said common lead and ground, and means for producing a SAFE signal when said potential is than a certain safe potential range and an UNSAFE signal when said potential exceeds said safe potential range, (b) a broken lamp sensing circuit including means for applying a reduced voltage less than said full voltage to said output leads, means for sensing electrical current flow through said output leads while said reduced voltage is applied, and means for producing a SAFE signal in response to current flow through said output leads while said reduced voltage is applied and an UNSAFE signal in the absence of current flow through said output leads while said reduced voltage is applied, (c) a lamp housing temperature sensing circuit including a temperature sensor, and means for producing a SAFE signal in response to a sensor temperature within a certain safe temperature range and an UNSAFE signal in response to a sensor temperature exceeding said safe temperature range, (d) a submerged lamp housing sensing circuit including an optical sensor having a first optical characteristic when said optical sensor is submerged in water and a second optical characteristic when said optical sensor is exposed to air, and means responsive to said characteristics for producing a SAFE signal in response to said first characteristic and an UNSAFE signal in response to said second characteristic, (e) a lamp housing leak sensing circuit including a pair of electrodes, means for applying a second reduced voltage less than said full voltage to said pair of electrodes, means for sensing current flow between said pair of electrodes while said second reduced voltage is applied, and means for producing an UNSAFE signal in response to current flow between said pair of electrodes while said second reduced voltage is applied and a SAFE signal in the absence of current flow between said pair of electrodes while said second reduced voltage is applied, (f) a pool water electrification sensing means including a pool water electrode, means for sensing an electrical potential between said pool water electrode and ground, and means for producing a SAFE signal when said last mentioned potential is within a certain safe potential range and an UNSAFE signal when said last mentioned potential exceeds said last mentioned safe potential range, said shock risk sensing means comprises a microcontroller including an output port conncected to said switch control mean, input ports each having an input circuit having a SAFE logic state and an UNSAFE logic state, and firmware for monitoring the logic states of said input circuits in a predetermined sequence during periodic shock risk sensing cycles and operating said switch control means to (a) place said switch means in its conductive state for a brief period of time and thereby electrify said pool light at said full voltage for said brief period of time during each cycle in which all of said input circuits are in their SAFE logic states and (b) place said switch means in its non-conductive state to prevent electrification of said pool light at said full voltage during any cycle in which at least one of said input circuits is in its UNSAFE logic state, and each shock risk sensing circuit is connected to a microcontroller input circuit for placing the respective input circuit in its UNSAFE logic state in response to detection of the shock risk condition associated with the respective sensing circuit and placing the respective input circuit in its SAFE logic state in the absence of the shock risk condition associated with the respective sensing circuit.

34. The shock prevention system of claim 33 wherein:

said shock prevention system comprises a sealed safety module including said leads, said ground, said microcontroller, said input means, said output means, said switch means, and said switch control means, and said module includes input terminals connected to said leads and accessible externally of said module for connection to said power source and output terminals connected to said output means and accessible externally of the module for connection to said lamp.

35. An electrical shock prevention system for use with a swimming pool light operable submerged in the pool water and including a normally water tight lamp housing and a lamp within the housing, and wherein said pool light may present several different electrical shock risk conditions when operating at said full voltage, said shock prevention system comprising:

electrical power input leads including a high voltage lead and a common lead for receiving electrical power at a certain full voltage, an electrical ground, and output leads for connection to said lamp, a microcontroller having power input means and input ports, a regulated elecrical power supply circuit connected to input leads and to said microcontroller power input means for supplying a regulated voltage to the microcontroller, electrical shock risk sensing circuits connected to said microcontroller input ports, respectively, for detecting said shock risk conditions, respectively, whereby each sensing circuit is associated with a particular shock risk condition, and each sensing circuit providing a UNSAFE signal to its respective microcontroller input port when its associated shock risk condition exists and a SAFE signal to its respective microcontroller input port when its associated shock risk condition does not exist, electrical switch means operable to a conductive state in which said switch means connects said input leads to said output leads for electrification of said output leads at said full voltage from said input leads and to a non-conductive state in which said switch means blocks electrification of output leads at said full voltage from said input leads, and wherein said microcontroller includes firmware responsive to said signals and connected to said switch means for placing said switch means in its conductive state in response to SAFE signals from all of said shock risk sensing circuits and placing said switch means in its non-conductive state in response to an UNSAFE signal from at least one shock risk sensing circuit.

36. The shock prevention system of claim 35 wherein:

each microcontroller input port includes an input circuit which assumes a SAFE logic state in response to a SAFE signal from the respective shock sensing circuit and an UNSAFE logic state in response to an UNSAFE signal from the respective shock sensing circuit, and said firmware monitors the logic states of said input ports in a predetermined sequence during periodic shock sensing cycles and places said switch means in said conductive state for a brief period of time during each cycle in which all of said microcontroller input circuits are in their SAFE logic states, and said firmware places said switch means in said non-conductive state during each cycle in which at least one microcontroller input circuit is in said UNSAFE state.

37. The shock prevention system of claim 36 wherein:

said shock risk sensing circuits include certain of the following sensing circuits: (a) a faulty wiring sensing circuit including means for sensing an electrical potential between said common lead and ground, and means for providing the a SAFE signal to the respective microcontroller imput port when said potential is within a certain safe potential range and an UNSAFE signal to the microcontroller when said potential exceeds said safe potential range, (b) a broken lamp sensing circuit including means for applying a reduced voltage less than said full voltage to said output leads, means for sensing electrical current flow through said output leads when said reduced voltage is applied, and means for providing a SAFE signal to the respective microcontroller input port in response to current flow through said output leads when said reduced voltage is applied and an UNSAFE signal to the respective microcontroller input port in the absence of current flow through said output leads when said reduced voltage is applied, (c) a lamp housing temperature sensing circuit including a temperature sensor, and means for providing a SAFE signal to the respective microcontroller input port in response to a sensor temperature within a certain safe temperature range and an UNSAFE signal to the respective microcontroller input port in response to a sensor temperature exceeding said safe temperature range, (d) a submerged lamp housing sensing circuit including an optical sensor having a first optical characteristic when said optical sensor is submerged in water and a second optical sensor when said optical sensor is exposed to air, and means responsive to said optical characteristics for providing a SAFE signal to the respective microcontroller input port in response to said first optical characteristic and an UNSAFE signal to the respective microcontroller input port in response to said second optical characteristic, (e) a lamp housing leak sensing circuit including a pair of electrodes, means for applying a second reduced voltage less than said full voltage to said pair of electrodes, means for sensing current flow between said pair of electrodes when said second reduced voltage is applied, and means for providing an UNSAFE signal to the respective microcontroller input port in response to current flow between said pair of electrodes when said second reduced voltage is applied and a SAFE signal in the absence of current flow between said pair of electrodes when said second reduced voltage is applied, (f) a pool water electrification sensing circuit including a pool water electrode, means for sensing an electrical potential between said pool water electrode and ground, and means for providing a SAFE signal to the respective microcontroller input port when said last mentioned potential is within a certain safe potential range and an UNSAFE signal to the respective microcontroller input port when said last mentioned potential exceeds said last mentioned safe potential range.

38. The shock prevention system of claim 35 wherein:

said shock prevention system comprises a sealed safety module including said input leads, said output leads, said power supply circuit, said switch means, said microcontroller, electrical input terminals connected to said input leads and ground and adapted for connection to an electrical power source, and electrical output terminals connected to said output leads and adapted for connection to said lamp.

39. The shock prevention system of claim 37 wherein:

said shock prevention system comprises a sealed safety module including said high voltage lead, said common lead, said output leads, said power supply circuit, said switch means, said microcontroller, electrical input terminals connected to high voltage lead, said common lead, and said ground and adapted for connection to an electrical power source, and electrical output terminals connected to said output leads and adapted for connection to said lamp.

40. The shock prevention system of claim 35 wherein:

said input leads are adapted to receive A.C. electrical power, each microcontroller input port includes an input circuit which assumes a SAFE logic state in response to a SAFE signal from the respective shock sensing circuit and an UNSAFE logic state in response to an UNSAFE signal from the respective shock sensing circuit, said firmware performs the following functions in response to initial application of A.C. power to said input leads: (a) initializes the microcontroller, (b) applies a reduced voltage less than said full voltage to said output leads for a brief period of time, (c) senses electrical current flow through said output leads while said reduced voltage is applied, (d) cuts A.C. power to said input leads in the absence of current flow through said output leads, said firmware detects the positive and negative half cycles of said A.C. power and performs the following functions during each positive half cycle: (a) initializes the microcontroller at the start of the respective positive half cycle, (b) performs a series positive half cycle sequences during the remainder of each positive half cycle wherein each positive half cycle sequence involves monitoring the logic states of said input ports in a predetermined sequence, (c) places said switch means in its conductive state for a brief period of time less than the time duration of a positive half cycle during each positive half cycle sequence in which all of said microcontroller input circuits are in their SAFE logic states, and (d) places said switch means in its non-conductive state during each positive half cycle sequence in which at least one microcontroller input circuit is in said UNSAFE state, and said firmware performs the following functions during each negative half cycle of said A.C. power: (a) initializes the microcontroller at the start of the respective negative half cycle, (b) determines whether all of said microcontroller input circuits are in their SAFE logic states, (c) places said switch means in its conductive state for a brief period of time less than the time duration of a negative half cycle if all of said microcontroller input circuits are in their SAFE logic states, and (d) places said switch means in its non-conductive state if all of said microcontroller input circuits are not in their SAFE logic states.

41. The shock prevention system of claim 40 wherein:

said shock risk sensing circuits include certain of the following sensing circuits: (a) a faulty wiring sensing circuit including means for sensing an electrical potential between said common lead and ground, and means for providing the a SAFE signal to the respective microcontroller imput port when said potential is within a certain safe potential range and an UNSAFE signal to the microcontroller when said potential exceeds said safe potential range, (b) a broken lamp sensing circuit including means for applying a reduced voltage less than said full voltage to said output leads, means for sensing electrical current flow through said output leads when said reduced voltage is applied, and means for providing a SAFE signal to the respective microcontroller input port in response to current flow through said output leads when said reduced voltage is applied and an UNSAFE signal to the respective microcontroller input port in the absence of current flow through said output leads when said reduced voltage is applied, (c) a lamp housing temperature sensing circuit including a temperature sensor, and means for providing a SAFE signal to the respective microcontroller input port in response to a sensor temperature within a certain safe temperature range and an UNSAFE signal to the respective microcontroller input port in response to a sensor temperature exceeding said safe temperature range, (d) a submerged lamp housing sensing circuit including an optical sensor having a first optical characteristic when said optical sensor is submerged in water and a second optical sensor when said optical sensor is exposed to air, and means responsive to said optical characteristics for providing a SAFE signal to the respective microcontroller input port in response to said first optical characteristic and an UNSAFE signal to the respective microcontroller input port in response to said second optical characteristic, (e) a lamp housing leak sensing circuit including a pair of electrodes, means for applying a second reduced voltage less than said full voltage to said pair of electrodes, means for sensing current flow between said pair of electrodes when said second reduced voltage is applied, and means for providing an UNSAFE signal to the respective microcontroller input port in response to current flow between said pair of electrodes when said second reduced voltage is applied and a SAFE signal in the absence of current flow between said pair of electrodes when said second reduced voltage is applied, (f) a pool water electrification sensing circuit including a pool water electrode, means for sensing an electrical potential between said pool water electrode and ground, and means for providing a SAFE signal to the respective microcontroller input port when said last mentioned potential is within -a certain safe potential range and an UNSAFE signal to the respective microcontroller input port when said last mentioned potential exceeds said last mentioned safe potential range, and said shock prevention system comprises a sealed safety module including said input leads, said output leads, said power supply circuit, said switch means, said microcontroller, electrical input terminals connected to said input leads and ground and adapted for connection to an electrical power source, and electrical output terminals connected to said output leads and adapted for connection to said lamp.

42. A swimming pool lighting system comprising:

electrical power input means including main electrical leads including a main high power lead, a main common lead, and a main electrical ground lead, and a main power switch for connecting said high power lead and said common lead to a source of A.C. electrical power at a certain full voltage, a plurality of pool lights operable submerged in the pool water and each including a normally water tight lamp housing and a lamp within the housing, and wherein each pool light may present several different electrical shock risk conditions when operating at said full voltage, an electrical shock prevention system connecting said main leads to each pool light, wherein the shock prevention system for each pool light comprises:

electrical power input leads including a high voltage lead, a common lead, and an electrical ground lead connected to said main high voltage lead, main common lead, and main ground lead, respectively, and output leads connected to the respective pool lamp, a microcontroller having power input means and input ports, a regulated elecrical power supply circuit connected to high power and common input leads and to said microcontroller power input means for supplying a regulated voltage to the microcontroller, electrical shock risk sensing circuits connected to said microcontroller input ports, respectively, for detecting said shock risk conditions, respectively, whereby each sensing circuit is associated with a particular shock risk condition, and each sensing circuit providing a UNSAFE signal to its respective microcontroller input port when its associated shock risk condition exists and a SAFE signal to its respective microcontroller input port when its associated shock risk condition does not exist, electrical switch means operable to a conductive state in which said switch means connects said input leads to said output leads for electrification of the respecive pool lamp at said full voltage when said main switch is closed and to a non-conductive state in which said switch means blocks electrification of output leads at said full voltage, and wherein said microcontroller includes firmware responsive to said signals and connected to said switch means for placing said switch means in its conductive state in response to SAFE signals from all of said shock risk sensing circuits and placing said switch means in its non-conductive state in response to an UNSAFE signal from at least one shock risk sensing circuit.

43. The pool lighting system of claim 42 wherein:

each microcontroller input port includes an input circuit which assumes a SAFE logic state in response to a SAFE signal from the respective shock sensing circuit and an UNSAFE logic state in response to an UNSAFE signal from the respective shock sensing circuit, and said firmware monitors the logic states of said input ports in a predetermined sequence during periodic shock sensing cycles and places said switch means in said conductive state for a brief period of time during each cycle in which all of said microcontroller input circuits are in their SAFE logic states, and said firmware places said switch means in said non-conductive state during each cycle in which at least one microcontroller input circuit is in said UNSAFE state.

44. The pool lighting system of claim 43 wherein:

said shock risk sensing circuits include certain of the following sensing circuits: (a) a faulty wiring sensing circuit including means for sensing an electrical potential between said input common lead and said imput ground lead, and means for providing a SAFE signal to the respective microcontroller imput port when said potential is within a certain safe potential range and an UNSAFE signal to the microcontroller when said potential exceeds said safe potential range, (b) a broken lamp sensing circuit including means for applying a reduced voltage less than said full voltage to said lamp, means for sensing electrical current flow through said lamp when said reduced voltage is applied, and means for providing a SAFE signal to the respective microcontroller input port in response to current flow through said lamp when said reduced voltage is applied and an UNSAFE signal to the respective microcontroller input port in the absence of current flow through said lamp when said reduced voltage is applied, (c) a lamp housing temperature sensing circuit including a temperature sensor disposed in efficient heat transfer relation to said lamp housing, and means for providing a SAFE signal to the respective microcontroller input port in response to a sensor temperature within a certain safe temperature range and an UNSAFE signal to the respective microcontroller input port in response to a sensor temperature exceeding said safe temperature range, (d) a submerged lamp housing sensing circuit including an optical sensor mounted on an upper portion of said lamp housing and having a first optical characteristic when said optical sensor is submerged in water and a second optical sensor when said optical sensor is exposed to air, and means responsive to said optical characteristics for providing a SAFE signal to the respective microcontroller input port in response to said first optical characteristic and an UNSAFE signal to the respective microcontroller input port in response to said second optical characteristic, (e) a lamp housing leak sensing circuit including a pair of electrodes positioned within a lower portion of said lamp housing, means for applying a second reduced voltage less than said full voltage to said pair of electrodes, means for sensing current flow between said pair of electrodes when said second reduced voltage is applied, and means for providing an UNSAFE signal to the respective microcontroller input port in response to current flow between said pair of electrodes when said second reduced voltage is applied and a SAFE signal in the absence of current flow between said pair of electrodes when said second reduced voltage is applied, (f) a pool water electrification sensing circuit including a pool water electrode to be disposed in contact with the pool water, means for sensing an electrical potential between said pool water electrode and said input ground lead, and means for providing a SAFE signal to the respective microcontroller input port when said last mentioned potential is within -a certain safe potential range and an UNSAFE signal to the respective microcontroller input port when said last mentioned potential exceeds said last mentioned safe potential range.

45. The pool lighting system of claim 42 wherein:

said shock prevention system comprises a sealed safety module including said input leads, said output leads, said power supply circuit, said switch means, said microcontroller, electrical input terminals connected to said input leads and ground and adapted for connection to an electrical power source, and electrical output terminals connected to said output leads and adapted for connection to said lamp.

46. The pool lighting system of claim 45 wherein:

said safety module is mounted within said lamp housing.

47. The pool lighting system of claim 44 wherein:

said shock prevention system comprises a sealed safety module including said high voltage lead, said common lead, said output leads, said power supply circuit, said switch means, said microcontroller, electrical input terminals connected to high voltage lead, said common lead, and said ground and adapted for connection to an electrical power source, and electrical output terminals connected to said output leads and adapted for connection to said lamp.

48. The pool lighting system of claim 47 wherein:

said safety module is mounted within said lamp housing.

49. The pool lighting system of claim 42 wherein:

each microcontroller input port includes an input circuit which assumes a SAFE logic state in response to a SAFE signal from the respective shock sensing circuit and an UNSAFE logic state in response to an UNSAFE signal from the respective shock sensing circuit, said firmware performs the following functions in response to initial application of A.C. power to said input leads by closure of said main power switch: (a) initializes the microcontroller, (b) applies a reduced voltage less than said full voltage to said output leads for a brief period of time, (c) senses electrical current flow through said output leads while said reduced voltage is applied, (d) cuts A.C. power to said input leads in the absence of current flow through said output leads, said firmware detects the positive and negative half cycles of said A.C. power and performs the following functions during each positive half cycle: (a) initializes the microcontroller at the start of the respective positive half cycle, (b) performs a series positive half cycle sequences during the remainder of each positive half cycle wherein each positive half cycle sequence involves monitoring the logic states of said input ports in a predetermined sequence, (c) places said switch means in its conductive state for a brief period of time less than the time duration of a positive half cycle during each positive half cycle sequence in which all of said microcontroller input circuits are in their SAFE logic states, and (d) places said switch means in its non-conductive state during each positive half cycle sequence in which at least one microcontroller input circuit is in said UNSAFE state, and said firmware performs the following functions during each negative half cycle of said A.C. power: (a) initializes the microcontroller at the start of the respective negative half cycle, (b) determines whether all of said microcontroller input circuits are in their SAFE logic states, (c) places said switch means in its conductive state for a brief period of time less than the time duration of a negative half cycle if all of said microcontroller input circuits are in their SAFE logic states, and (d) places said switch means in its non-conductive state if all of said microcontroller input circuits are not in their SAFE logic states.

50. The shock prevention system of claim 49 wherein:

said shock risk sensing circuits include certain of the following sensing circuits: (a) a faulty wiring sensing circuit including means for sensing an electrical potential between said input common lead and said input ground lead, and means for providing the a SAFE signal to the respective microcontroller imput port when said potential is within a certain safe potential range and an UNSAFE signal to the microcontroller when said potential exceeds said safe potential range, (b) a broken lamp sensing circuit including means for applying a reduced voltage less than said full voltage to the respective pool lamp, means for sensing electrical current flow through the respective pool lamp when said reduced voltage is applied, and means for providing a SAFE signal to the respective microcontroller input port in response to current flow through the respective pool lamp when said reduced voltage is applied and an UNSAFE signal to the respective microcontroller input port in the absence of current flow through the respective pool lamp when said reduced voltage is applied, (c) a lamp housing temperature sensing circuit including a temperature sensor disposed in efficient heat transfer relation to the respective lamp housing, and means for providing a SAFE signal to the respective microcontroller input port in response to a sensor temperature within a certain safe temperature range and an UNSAFE signal to the respective microcontroller input port in response to a sensor temperature exceeding said safe temperature range, (d) a submerged lamp housing sensing circuit including an optical sensor mounted on an upper portion of the respective lamp housing having a first optical characteristic when said optical sensor is submerged in water and a second optical sensor when said optical sensor is exposed to air, and means responsive to said optical characteristics for providing a SAFE signal to the respective microcontroller input port in response to said first optical characteristic and an UNSAFE signal to the respective microcontroller input port in response to said second optical characteristic, (e) a lamp housing leak sensing circuit including a pair of electrodes positioned in a lower portion of the respective lamp housing, means for applying a second reduced voltage less than said full voltage to said pair of electrodes, means for sensing current flow between said pair of electrodes when said second reduced voltage is applied, and means for providing an UNSAFE signal to the respective microcontroller input port in response to current flow between said pair of electrodes when said second reduced voltage is applied and a SAFE signal in the absence of current flow between said pair of electrodes when said second reduced voltage is applied, (f) a pool water electrification sensing circuit including a pool water electrode, means for sensing an electrical potential between said pool water electrode and said input ground lead, and means for providing a SAFE signal to the respective microcontroller input port when said last mentioned potential is within -a certain safe potential range and an UNSAFE signal to the respective microcontroller input port when said last mentioned potential exceeds said last mentioned safe potential range, and said shock prevention system comprises a sealed safety module including said input leads, said output leads, said power supply circuit, said switch means, said microcontroller, electrical input terminals connecting said input leads said main leads, and electrical output terminals connecting said output leads to said lamp.

51. The pool lighting system of claim 50 wherein:

said safety module is mounted in the respective lamp housing.

52. A method of operating an electrical device at a certain full voltage in an environment in which the device may present at least one hazardous electrical shock risk condition, comprising the steps of:

providing a safety sensor within a sealed housing containing said electrical device, sensing each shock risk condition and producing an UNSAFE signal if the respective shock risk condition exists and a SAFE signal if the respective shock risk does not exist, and electrifying said device at said full voltage only when each signal is a SAFE signal.

53. The method of claim 52 wherein:

said device, when electrified at said full voltage, may present several different hazardous electrical shock risk conditions, whereby said step of sensing each shock risk condition produces several signals, and said step of electrifying said device comprises electrifying said device at said full voltage only when all of said signals are SAFE signals.

54. The method of claim 53 wherein:

said step of sensing each shock risk condition comprises sensing said several shock risk conditions in a predetermined sequence during periodic shock risk sensing cycles, and electrifying said device at said full voltage for a brief period of time during each sensing cycle in which all of said signals are safe signals.

55. The method of claim 52 wherein:

said electrical device is a swimming pool light to operate submerged in pool water and including a normally water tight lamp housing, an electrical lamp within said lamp housing, a high voltage lead and a common lead through which electrical power is supplied to said lamp, and an electrical ground, and each shock risk condition comprises one of the following shock risk conditions: (a) electrical potential of said common lead relative to ground exceeding a certain safe potential range, (b) broken lamp, (c) lamp housing temperature exceeding a certain safe temperature range, (d) exposure of the lamp housing to air, (e) water in the lamp housing, (f) electrification of the swimming pool water exceeding a certain safe electrification range.

56. The method of claim 55 wherein:

said pool light, when electrified at said full voltage, may present several of said shock risk conditions (a)–(f), whereby said step of sensing each shock risk condition produces several signals, and said step of electrifying said device comprises electrifying said lamp at said full voltage only when all of said signals are SAFE signals.

57. The method of claim 56 wherein:

said step of sensing each shock risk condition comprises sensing said several shock risk conditions in a predetermined sequence during periodic shock risk sensing cycles, and said step of electrifying said device comprises electrifying said lamp at said full voltage for a brief period of time during each sensing cycle in which all of said signals are safe signals.

* * * * *